United States Patent
Jafari et al.

(10) Patent No.: US 11,088,764 B2
(45) Date of Patent: Aug. 10, 2021

(54) OUT-OF-BAND COMMUNICATION CHANNEL FOR SUB-CARRIER-BASED OPTICAL COMMUNICATION SYSTEMS

(71) Applicant: Infinera Corporation, Sunnyvale, CA (US)

(72) Inventors: Amir Jafari, Ottawa (CA); Steven J. Hand, Los Gatos, CA (US); Mohamed Osman, Ottawa (CA)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 16/578,169

(22) Filed: Sep. 20, 2019

(65) Prior Publication Data

US 2020/0366378 A1    Nov. 19, 2020

Related U.S. Application Data

(60) Provisional application No. 62/847,651, filed on May 14, 2019.

(51) Int. Cl.
  *H04B 10/00*    (2013.01)
  *H04B 10/61*    (2013.01)
  (Continued)

(52) U.S. Cl.
  CPC ......... *H04B 10/614* (2013.01); *G02B 6/2938* (2013.01); *G02B 6/29395* (2013.01);
  (Continued)

(58) Field of Classification Search
  USPC .................................................. 398/139–172
  See application file for complete search history.

(56) References Cited

U.S. PATENT DOCUMENTS 4,483,000 A    11/1984   Yamamoto et al.
4,528,565 A     7/1985   Hauptmann
(Continued)

FOREIGN PATENT DOCUMENTS

EP    0512642    11/1992
EP    3208957     8/2017
(Continued)

OTHER PUBLICATIONS

J. Leuthold et al., "Super Channels Based on Nyquist Multiplexing," 2012 17th Opto-Electronics and Communications Conference (OECC 2012) Technical Digest, Jul. 2012, Busan, Kor.
(Continued)

*Primary Examiner* — Agustin Bello
(74) *Attorney, Agent, or Firm* — David L. Soltz

(57) ABSTRACT

Techniques are described for implementing an out-of-band communication channel used to exchange control channel information in sub-carrier-based optical communication systems. In an example implementation, a transmitter includes a laser operable to supply an optical signal, a digital signal processor operable to supply first electrical signals based on first data input to the digital signal processor and second data input to the digital signal processor, digital-to-analog conversion circuitry operable to output second electrical signals based on the first electrical signals, modulator driver circuitry is operable to output third electrical signals based on the second electrical signals, and an optical modulator operable to supply first and second modulated optical signals based on the third electrical signals. The first modulated optical signal includes a plurality of optical subcarriers carrying user data. The second modulated optical signal is polarization modulated based on the second data.

25 Claims, 26 Drawing Sheets

(51) Int. Cl.
*H04B 10/40* (2013.01)
*H04J 14/02* (2006.01)
*H04B 10/54* (2013.01)
*H04B 10/548* (2013.01)
*H04B 10/50* (2013.01)
*G02B 6/293* (2006.01)
*H04B 10/532* (2013.01)
*H01S 3/067* (2006.01)

(52) U.S. Cl.
CPC .......... *H04B 10/40* (2013.01); *H04B 10/503* (2013.01); *H04B 10/532* (2013.01); *H04B 10/541* (2013.01); *H04B 10/548* (2013.01); *H04J 14/0298* (2013.01); *H01S 3/06708* (2013.01)

(56) References Cited

U.S. PATENT DOCUMENTS

| | | |
|---|---|---|
| 5,153,762 A | 10/1992 | Huber |
| 5,208,692 A | 5/1993 | McMahon |
| 5,596,436 A | 1/1997 | Sargis |
| 5,822,094 A | 10/1998 | O'Sullivan |
| 5,825,857 A | 10/1998 | Reto |
| 6,046,838 A | 4/2000 | Kou |
| 6,362,913 B2 | 3/2002 | Ooi et al. |
| 6,525,857 B1 | 2/2003 | Way |
| 6,563,880 B1 | 5/2003 | Hunsinger et al. |
| 6,580,544 B1 | 6/2003 | Lin et al. |
| 6,687,044 B2 | 2/2004 | Paquet |
| 7,266,306 B1 | 9/2007 | Harley et al. |
| 7,466,919 B1 | 2/2008 | Birk et al. |
| 7,346,284 B2 * | 3/2008 | Wan .................. H04B 10/5161 398/202 |
| 7,376,358 B2 | 5/2008 | Roberts et al. |
| 7,447,436 B2 * | 11/2008 | Yee ........................ H04B 10/50 398/152 |
| 7,701,842 B2 | 4/2010 | Roberts et al. |
| 7,715,710 B2 | 5/2010 | Wan |
| 7,729,621 B2 | 6/2010 | Nahapetian et al. |
| 7,756,421 B2 * | 7/2010 | Roberts .............. H04B 10/2543 398/158 |
| 7,826,752 B1 * | 11/2010 | Zanoni ............... H04B 10/5055 398/186 |
| 8,184,992 B2 | 5/2012 | Kikuchi |
| 8,203,777 B2 | 6/2012 | Smith et al. |
| 8,412,047 B2 * | 4/2013 | Tanaka ............... H04B 10/5053 398/102 |
| 8,437,645 B2 | 5/2013 | Boffi et al. |
| 8,472,810 B2 * | 6/2013 | Akiyama .......... H04B 10/5053 398/184 |
| 8,477,056 B2 | 7/2013 | Sun et al. |
| 8,477,656 B2 | 7/2013 | O'Mahony |
| 8,478,137 B2 | 7/2013 | Komaki et al. |
| 8,655,190 B2 | 2/2014 | Wu et al. |
| 8,682,180 B1 | 3/2014 | Nimon et al. |
| 8,730,079 B2 | 5/2014 | Tudose |
| 8,768,177 B2 | 7/2014 | Wu et al. |
| 8,861,977 B2 | 10/2014 | McNicol |
| 8,929,750 B2 | 1/2015 | Ishihara |
| 8,965,203 B1 | 2/2015 | Vandat |
| 8,971,723 B2 * | 3/2015 | Le Taillandier De Gabory .......... H04B 10/0775 398/182 |
| 8,989,593 B2 | 3/2015 | Sun et al. |
| 9,020,363 B2 * | 4/2015 | Yasuda ................ H04B 10/548 398/183 |
| 9,048,957 B2 | 6/2015 | Nakashima |
| 9,112,609 B2 | 8/2015 | Kim et al. |
| 9,154,231 B2 * | 10/2015 | Kaneda ............... H04B 10/63 |
| 9,166,692 B1 | 10/2015 | Felderman |
| 9,197,320 B2 * | 11/2015 | Vassilieva .......... H04B 10/0775 |
| 9,244,328 B2 * | 1/2016 | Nishimoto ....... H04B 10/50572 |
| 9,244,928 B1 | 1/2016 | Nishimoto |
| 9,270,379 B2 | 2/2016 | Huang et al. |
| 9,281,915 B2 * | 3/2016 | Kaneda ................ H04B 10/614 |
| 9,363,585 B2 * | 6/2016 | Carpini .............. H04Q 11/0062 |
| 9,419,720 B2 * | 8/2016 | Akiyama .............. G02F 1/0123 |
| 9,461,749 B2 | 10/2016 | Jansen et al. |
| 9,485,554 B1 * | 11/2016 | Kim .................. H04B 10/07957 |
| 9,553,675 B2 | 1/2017 | Karar et al. |
| 9,608,866 B2 | 3/2017 | Nagarajan |
| 9,673,907 B1 | 6/2017 | Vassilieva |
| 9,686,020 B2 | 6/2017 | Mochizuki et al. |
| 9,705,592 B1 * | 7/2017 | Schmogrow .......... G02F 1/2255 |
| 9,735,881 B1 | 8/2017 | Agazzi et al. |
| 9,991,953 B1 * | 6/2018 | Fludger ................ H04B 10/541 |
| 10,014,975 B2 | 7/2018 | Krause et al. |
| 10,027,424 B2 | 7/2018 | Zhuge et al. |
| 10,243,653 B2 | 3/2019 | Wiswell |
| 10,243,688 B2 | 3/2019 | Vassilieva |
| 10,348,410 B1 | 7/2019 | Charlton |
| 10,374,623 B1 * | 8/2019 | Oveis Gharan ........ H03M 1/662 |
| 10,374,721 B2 | 8/2019 | Awdalla |
| 10,389,447 B1 * | 8/2019 | Khandani .......... H04L 25/03006 |
| 10,397,190 B2 | 8/2019 | Akhavain Mohammadi |
| 10,491,302 B1 | 11/2019 | Morris |
| 10,523,315 B2 * | 12/2019 | Jiang .................. H04B 10/0775 |
| 10,547,388 B2 * | 1/2020 | Ikeda ................. H04B 10/516 |
| 10,574,362 B2 * | 2/2020 | Chen .................. H04B 10/6164 |
| 10,587,358 B1 | 3/2020 | Ebrahimzad |
| 2002/0003641 A1 * | 1/2002 | Hall ...................... H04J 14/08 398/65 |
| 2002/0005971 A1 | 1/2002 | Sasai |
| 2002/0034194 A1 | 3/2002 | Shattil |
| 2002/0067883 A1 | 6/2002 | Lo |
| 2002/0114038 A1 | 8/2002 | Arnon |
| 2002/0122518 A1 | 9/2002 | Yasuda et al. |
| 2002/0145783 A1 | 10/2002 | Chang |
| 2003/0020995 A1 | 1/2003 | Harasawa |
| 2003/0223751 A1 | 12/2003 | Shimizu |
| 2004/0016874 A1 | 1/2004 | Rao |
| 2004/0019459 A1 | 1/2004 | Dietz |
| 2004/0032643 A1 | 2/2004 | Chimfwembe |
| 2004/0033074 A1 | 2/2004 | Hsu |
| 2004/0105682 A1 * | 6/2004 | Roberts ............ H04B 10/25137 398/147 |
| 2004/0197103 A1 | 7/2004 | Roberts |
| 2004/0151109 A1 | 8/2004 | Batra |
| 2004/0198265 A1 | 10/2004 | Wallace |
| 2004/0208614 A1 | 10/2004 | Price |
| 2004/0252996 A1 | 12/2004 | McNicol |
| 2005/0008085 A1 | 1/2005 | Lee |
| 2005/0074037 A1 | 4/2005 | Rickard |
| 2005/0111789 A1 | 5/2005 | Hayes |
| 2005/0147415 A1 | 7/2005 | Fee |
| 2005/0169585 A1 | 8/2005 | Aronson |
| 2005/0175112 A1 | 8/2005 | Pisani |
| 2005/0175339 A1 | 8/2005 | Herskowits |
| 2006/0078336 A1 | 4/2006 | McNicol et al. |
| 2006/0093052 A1 | 5/2006 | Cho |
| 2006/0159454 A1 * | 7/2006 | Bjornstad .............. H04J 14/02 398/51 |
| 2006/0215540 A1 | 9/2006 | Krishnamoorthi |
| 2006/0233147 A1 | 10/2006 | Karabinis |
| 2006/0269295 A1 | 11/2006 | Way |
| 2006/0280510 A1 | 12/2006 | Onaka |
| 2007/0004465 A1 | 1/2007 | Papasakellariou |
| 2007/0025421 A1 | 2/2007 | Shattil |
| 2007/0092263 A1 | 4/2007 | Agazzi |
| 2008/0063409 A1 | 3/2008 | Toliver |
| 2008/0085125 A1 | 4/2008 | Frankel |
| 2008/0232816 A1 * | 9/2008 | Hoshida ................ H04J 14/06 398/152 |
| 2008/0267630 A1 | 10/2008 | Qian |
| 2009/0110033 A1 | 4/2009 | Shattil |
| 2009/0154336 A1 | 6/2009 | Green |
| 2009/0190929 A1 | 7/2009 | Khurgin |
| 2009/0196603 A1 | 8/2009 | Zhou |
| 2009/0214224 A1 | 8/2009 | Cho |
| 2009/0232234 A1 | 9/2009 | Du |
| 2009/0238578 A1 | 9/2009 | Taylor |
| 2009/0238580 A1 | 9/2009 | Kikuchi |

(56) References Cited

U.S. PATENT DOCUMENTS

| | | |
|---|---|---|
| 2009/0257344 A1 | 10/2009 | Huang |
| 2009/0257755 A1* | 10/2009 | Buelow ............... H04L 27/2096 |
| | | 398/184 |
| 2009/0092389 A1 | 11/2009 | Wei |
| 2010/0021163 A1 | 1/2010 | Shieh |
| 2010/0021166 A1 | 1/2010 | Way |
| 2010/0028002 A1 | 2/2010 | Qian |
| 2010/0086303 A1 | 4/2010 | Qian |
| 2010/0142964 A1 | 6/2010 | Chang et al. |
| 2010/0142967 A1 | 6/2010 | Perez |
| 2010/0178057 A1 | 7/2010 | Shieh |
| 2010/0189445 A1* | 7/2010 | Nakashima ........ H04B 10/6165 |
| | | 398/152 |
| 2010/0215368 A1 | 8/2010 | Qian |
| 2010/0246581 A1 | 9/2010 | Henry |
| 2010/0254707 A1 | 10/2010 | Peng |
| 2010/0329671 A1* | 12/2010 | Essiambre ........... H04B 10/677 |
| | | 398/44 |
| 2010/0329683 A1* | 12/2010 | Liu .................... H04B 10/2513 |
| | | 398/81 |
| 2011/0097092 A1 | 4/2011 | Wagner et al. |
| 2011/0135301 A1 | 6/2011 | Myslinski |
| 2011/0142450 A1 | 6/2011 | Tanzi et al. |
| 2011/0150475 A1 | 6/2011 | Soto et al. |
| 2011/0176813 A1 | 7/2011 | Kim |
| 2011/0182577 A1 | 7/2011 | Wu |
| 2011/0249978 A1 | 10/2011 | Sasaki |
| 2011/0255870 A1* | 10/2011 | Grigoryan .......... H04B 10/6166 |
| | | 398/65 |
| 2012/0002703 A1 | 1/2012 | Yamashita |
| 2012/0033965 A1 | 2/2012 | Zhang |
| 2012/0045209 A1 | 2/2012 | Boyd |
| 2012/0082466 A1 | 4/2012 | Wu |
| 2012/0093510 A1 | 4/2012 | Zhang |
| 2012/0099864 A1 | 4/2012 | Ishihara |
| 2012/0141130 A1* | 6/2012 | Nakashima .......... H04B 10/505 |
| | | 398/82 |
| 2012/0141135 A1 | 6/2012 | Yang |
| 2012/0148264 A1 | 6/2012 | Liu |
| 2012/0219285 A1* | 8/2012 | Dahan ............... H04B 10/07953 |
| | | 398/26 |
| 2012/0251119 A1* | 10/2012 | McNicol ............. H04J 14/026 |
| | | 398/91 |
| 2012/0251121 A1* | 10/2012 | McNicol ............. H04J 14/06 |
| | | 398/91 |
| 2012/0263471 A1 | 10/2012 | Buchali |
| 2012/0269510 A1 | 10/2012 | Hui |
| 2012/0269515 A1 | 10/2012 | Cvijetic |
| 2013/0070785 A1 | 3/2013 | Liu |
| 2013/0070786 A1 | 3/2013 | Liu |
| 2013/0101296 A1* | 4/2013 | Nishimoto ....... H04B 10/50575 |
| | | 398/79 |
| 2013/0108271 A1 | 5/2013 | Tang et al. |
| 2013/0136449 A1* | 5/2013 | Liu .................. H04B 10/25137 |
| | | 398/65 |
| 2013/0170834 A1 | 7/2013 | Cho et al. |
| 2013/0191877 A1 | 7/2013 | Rakib |
| 2013/0195452 A1 | 8/2013 | Hui |
| 2013/0202303 A1 | 8/2013 | Wilkinson |
| 2013/0251364 A1 | 9/2013 | Pachnicke |
| 2013/0286847 A1 | 10/2013 | Schmidt |
| 2014/0010543 A1 | 1/2014 | Lee |
| 2014/0056371 A1 | 2/2014 | Ji |
| 2014/0072303 A1 | 3/2014 | Pfau |
| 2014/0079390 A1* | 3/2014 | Kim .................... H04B 10/0773 |
| | | 398/30 |
| 2014/0079391 A1* | 3/2014 | Kim .................... H04B 10/532 |
| | | 398/30 |
| 2014/0092924 A1 | 4/2014 | Krause et al. |
| 2014/0099116 A1 | 4/2014 | Bai |
| 2014/0126916 A1 | 5/2014 | Ota |
| 2014/0153925 A1 | 6/2014 | Nishihara et al. |
| 2014/0205286 A1 | 7/2014 | Ji et al. |
| 2014/0233963 A1* | 8/2014 | Le Taillandier De Gabory .......... |
| | | H04B 10/541 |
| | | 398/183 |
| 2014/0241727 A1 | 8/2014 | Lim et al. |
| 2014/0270759 A1 | 9/2014 | Djordjevic |
| 2014/0270761 A1 | 9/2014 | Xu |
| 2014/0270803 A1* | 9/2014 | Olsson ................. H04B 10/532 |
| | | 398/152 |
| 2014/0294381 A1 | 10/2014 | McNicol |
| 2014/0314411 A1 | 10/2014 | Huang |
| 2014/0314416 A1 | 10/2014 | Vassilieva |
| 2014/0341587 A1* | 11/2014 | Nakashima ............. H04J 14/06 |
| | | 398/115 |
| 2014/0363164 A1 | 12/2014 | Kim |
| 2014/0376930 A1 | 12/2014 | Shiba |
| 2015/0063808 A1* | 3/2015 | Xia ........................ H04J 14/06 |
| | | 398/65 |
| 2015/0071642 A1 | 3/2015 | Tanaka |
| 2015/0093118 A1* | 4/2015 | Jia ........................... H04J 14/06 |
| | | 398/140 |
| 2015/0098700 A1 | 4/2015 | Zhu |
| 2015/0117860 A1 | 4/2015 | Braun |
| 2015/0125160 A1 | 5/2015 | Wen |
| 2015/0188637 A1* | 7/2015 | Tanimura ............. H04B 10/532 |
| | | 398/184 |
| 2015/0188642 A1* | 7/2015 | Sun .................... H04B 10/6165 |
| | | 398/202 |
| 2015/0229332 A1 | 8/2015 | Yuan |
| 2015/0229401 A1* | 8/2015 | Tanaka ................. H04L 7/0004 |
| | | 398/135 |
| 2015/0280853 A1 | 10/2015 | Sun |
| 2015/0288456 A1 | 10/2015 | Zhu |
| 2015/0289035 A1 | 10/2015 | Mehrvar |
| 2015/0296278 A1 | 10/2015 | Liu |
| 2015/0333860 A1 | 11/2015 | Rahn |
| 2016/0013881 A1 | 1/2016 | Rejaly et al. |
| 2016/0029403 A1 | 1/2016 | Roy et al. |
| 2016/0050021 A1 | 2/2016 | Hua |
| 2016/0057516 A1 | 2/2016 | Hochberg |
| 2016/0094292 A1 | 3/2016 | Mochizuki |
| 2016/0099777 A1* | 4/2016 | Liu ...................... H04B 10/614 |
| | | 398/159 |
| 2016/0112141 A1* | 4/2016 | Rahn .................... H04B 10/572 |
| | | 398/79 |
| 2016/0142150 A1 | 5/2016 | Lyubomirsky |
| 2016/0191168 A1* | 6/2016 | Huang ................. H04B 10/613 |
| | | 398/45 |
| 2016/0192042 A1 | 6/2016 | Mitchell |
| 2016/0197681 A1* | 7/2016 | Sun .................... H04B 10/6161 |
| | | 398/81 |
| 2016/0218812 A1 | 7/2016 | Okabe |
| 2016/0233963 A1 | 8/2016 | Zhuge et al. |
| 2016/0261347 A1* | 9/2016 | Karar ................. H04B 10/5055 |
| 2016/0277816 A1 | 9/2016 | Yuang |
| 2016/0316281 A1 | 10/2016 | Keyworth |
| 2016/0323039 A1 | 11/2016 | Sun et al. |
| 2017/0005747 A1* | 1/2017 | Kim ................. H04B 10/07957 |
| 2017/0019168 A1 | 1/2017 | Menard |
| 2017/0033864 A1 | 2/2017 | Nagarajan |
| 2017/0033999 A1 | 2/2017 | Nagarajan |
| 2017/0041691 A1 | 2/2017 | Rickman |
| 2017/0054513 A1 | 2/2017 | Guo |
| 2017/0070313 A1* | 3/2017 | Kato .................... H04J 14/0204 |
| 2017/0078028 A1* | 3/2017 | Zhang ................ H04B 10/0795 |
| 2017/0078044 A1 | 3/2017 | Hino |
| 2017/0104535 A1* | 4/2017 | Hoshida ............. H04B 10/2504 |
| 2017/0134836 A1 | 5/2017 | Sindhy |
| 2017/0149507 A1* | 5/2017 | Le Taillandier De Gabory .......... |
| | | H04L 27/2623 |
| 2017/0163347 A1* | 6/2017 | Akiyama ............. H04B 10/564 |
| 2017/0222716 A1 | 8/2017 | Nakashima |
| 2017/0237500 A1* | 8/2017 | Nishimoto ........... H04B 10/572 |
| | | 398/184 |
| 2017/0250775 A1* | 8/2017 | Kato .................... H04J 14/0298 |
| 2017/0324480 A1 | 11/2017 | Elmirghani |
| 2017/0366267 A1* | 12/2017 | Campos ................. G06Q 10/10 |
| 2017/0367061 A1 | 12/2017 | Kim |
| 2018/0034555 A1 | 2/2018 | Goh |

(56) References Cited

U.S. PATENT DOCUMENTS

| | | | |
|---|---|---|---|
| 2018/0115407 | A1 | 4/2018 | Melikyan |
| 2018/0120520 | A1 | 5/2018 | Kelly |
| 2018/0145761 | A1* | 5/2018 | Zhuge ................. H04B 10/616 |
| 2018/0198547 | A1 | 7/2018 | Mehrvar |
| 2018/0219632 | A1* | 8/2018 | Yoshida ............. H04B 10/5561 |
| 2018/0234285 | A1 | 8/2018 | Djordjevic |
| 2018/0241476 | A1* | 8/2018 | Johnson ................. H04J 14/06 |
| 2018/0278331 | A1 | 9/2018 | Cao |
| 2018/0324717 | A1 | 11/2018 | Zhou |
| 2018/0359047 | A1 | 12/2018 | Vassilieva |
| 2019/0020409 | A1* | 1/2019 | Le Taillandier De Gabory .......... H04J 14/02 |
| 2019/0097728 | A1 | 3/2019 | Frankel |
| 2019/0123819 | A1 | 4/2019 | Jiang |
| 2019/0149242 | A1* | 5/2019 | Torbatian ............. H04L 1/0057 398/185 |
| 2019/0149389 | A1 | 5/2019 | Torbatian |
| 2019/0253153 | A1* | 8/2019 | Sun ..................... H04B 10/532 |
| 2019/0260493 | A1* | 8/2019 | Chimfwembe ...... H04B 10/077 |
| 2019/0288777 | A1* | 9/2019 | Ishimura ............. H04B 10/516 |
| 2019/0312640 | A1 | 10/2019 | Binkai |
| 2020/0076508 | A1 | 3/2020 | Jia |
| 2020/0177525 | A1 | 6/2020 | Morris |

FOREIGN PATENT DOCUMENTS

| | | |
|---|---|---|
| WO | WO 2012100714 | 8/2012 |
| WO | WO 2014114332 | 7/2014 |

OTHER PUBLICATIONS

S. Watanabe et al., "Optical Coherent Broad-Band Transmission for Long-Haul and Distribution Systems Using Subcarrier Multiplexing," Journal of Lightwave Technology, vol. 11, No. 1, Jan. 1993, pp. 116-127.
M. Jinno et al., "Demonstration of Novel Spectrum-Efficient Elastic Optical Path Network with Per-Channel Variable Capacity of 40 Gb/s to Over 400 Gb/s," ECOC 2008, Sep. 21-25, 2008, Brussels, Belgium, Th.3.F.6.
Y. Chen Et Al., "Experimental Demonstration of Roadm Functionality on an Optical Scfdm Superchannel," IEEE Photonics Technology Letters, vol. 24, No. 3, Feb. 1, 2012, pp. 215-217.
Adaptive Software Defined Terabit Transceiver for Flexible Optical Networks, Public executive summary of the Final Project Periodic Report, Jun. 16, 2016.
Hillerkus, Single-Laser Multi-Terabit/s Systems, KIT Scientific Publishing, 2013, Chapters 1, 3, and 6.
Hu et al., "Flexible and Concurrent All-Optical VPN in OFDMA PON," IEEE Photonics Technology Journal, vol. 5, No. 6, Dec. 2013.
Bosco et al., "On the Performance of Nyquist-WDM Terabit Superchannels Based on PM-BPSK, PM-QPSK, PM-8QAM or PM-16QAM Subcarriers," Journal of Lightwave Technology, vol. 29, No. 1, Jan. 1, 2011, pp. 53-60.
K. Roberts et al., "Flexible Transceivers," ECOC Technical Digest, 2012, We.3.A.3.
K. Roberts et al., "High Capacity Transport—100G and Beyond," Journal of Lightwave Technology, vol. 33, No. 3, Feb. 1, 2015, pp. 563-578.
J. Reis et al., "Performance Optimization of Nyquist Signaling for Spectrally Efficient Optical Access Networks [Invited]," J. Opt. Commun. Netw./vol. 7, No. 2, Feb. 2015, pp. A200-A208.
R. Ferreira et al, Coherent Nyquist UDWDM-PON With Digital Signal Processing in Real Time, Journal of Lightwave Technology, vol. 34, No. 2, Jan. 15, 2016, pp. 826-833.
A. Shahpari et al., "Coherent Access: A Review", Journal of Lightwave Technology, vol. 35, No. 4, Feb. 15, 2017, pp. 1050-1058.
P. Layec et al., "Rate-Adaptable Optical Transmission and Elastic Optical Networks," Chapter 15, Enabling Technologies for High Spectral-efficiency Coherent Optical Communication Networks, First Edition, 2016 John Wiley & Sons, Inc. Published 2016, pp. 507-545.
J. Altabas, "Cost-effective Transceiver based on a RSOA and a VCSEL for Flexible uDWDM Networks," IEEE Photonics Technology ( vol. 28, Issue: 10, May 15, 2016, pp. 1111-1114.
K. Roberts et al., "Beyond 100 Gb/s: Capacity, Flexibility, and Network Optimization," J. Opt. Commun. Netw./vol. 9, No. 4/Apr. 2017, pp. C12-C24.
Lavery et al., "Digital Coherent Receivers for Long-Reach Optical Access Networks," Journal of Lightwave Technology, vol. 31, No. 4, Feb. 15, 2013, pp. 609-620.
V. Vujicic, "Optical Multicarrier Sources for Spectrally Efficient Optical Networks," A Dissertation submitted in fulfilment of the requirements for the award of Doctor of Philosophy (Ph.D.) to the Dublin City University, Dec. 2015, Chapters 1, 2, and 6.
Straullu et al., "Single-Wavelength Downstream FDMA-PON at 32 Gbps and 34 dB ODN Loss," IEEE Photonics Technology Letters, vol. 27, No. 7, Apr. 1, 2015, pp. 774-777.
Y. Zhang et al., "Digital subcarrier multiplexing for flexible spectral allocation in optical transport network," Oct. 24, 2011 / vol. 19, No. 22, / Optics Express 21882.
R. Schmogrow et al., "Nyquist Frequency Division Multiplexing for Optical Communications," CLEO Technical Digest, OSA 2012, CTh1H.2.
P Khodashenas. "Investigation of Spectrum Granularity for Performance Optimization of Flexible Nyquist-WDM-Based Optical Networks." Journal of Lightwave Technology, vol. 33, No. 23, Dec. 1, 2015 pp. 4767-4774.
Mishra et al., "Flexible RF-Based Comb Generator," IEEE Photonics Technology Letters, vol. 25, No. 7, Apr. 1, 2013, pp. 701-704.
M. Jinno et al., "Multiflow Optical Transponder for Efficient Multilayer Optical Networking," IEEE Communications Magazine • May 2012, pp. 56-65.
Kim Roberts, "100G and Beyond," OFC 2014, OSA 2014, Tu3J.1.
J. Fischer, "Digital signal processing for coherent UDWDM passive optical networks," ITG-Fachbericht 248: Photonische Netze 05.— May 6, 2014 in Leipzig, VDE VERLAG GMBH • Berlin • Offenbach, Germany, ISBN 978-3-8007-3604-1.
Kottke et al., "Coherent UDWDM PON with joint subcarrier reception at OLT," Optics Express, Jul. 2, 2014.
Lavery et al., "Reduced Complexity Equalization for Coherent Long-Reach Passive Optical Networks," J. Opt. Commun. Netw./ vol. 7, No. 1/Jan. 2015, pp. A16-A27.
Lazaro et al., "Flexible PON Key Technologies: Digital Advanced Modulation Formats and Devices," 2014 16th International Conference on Transparent Optical Networks (ICTON), Tu.B3.2.
Optical Internetworking Forum—Technology Options for 400G Implementation OIF-Tech-Options-400G-01.0, Jul. 2015.
Riccardi et al., "Sliceable bandwidth variable transponder: the IDEALIST vision," 2015 European Conference on Networks and Communications (EuCNC), pp. 330-334.
Sambo et al., "Next Generation Sliceable Bandwidth Variable Transponders," IEEE Communications Magazine, Feb. 2015, pp. 163-171.
P. Schindler et al., "Colorless FDMA-PON With Flexible Bandwidth Allocation and Colorless, Low-Speed ONUs [Invited]," J. Opt. Commun. Netw./vol. 5, No. 10/Oct. 2013, pp. A204-A212.
Schmogrow et al., "Real-time Nyquist signaling with dynamic precision and flexible non-integer oversampling," Jan. 13, 2014 | vol. 22, No. 1 | DOI:10.1364/OE.22.000193 | Optics Express 193.
Schmogrow et al., "Real-Time Digital Nyquist-WDM and OFDM Signal Generation: Spectral Efficiency Versus DSP Complexity," ECOC Technical Digest, 2012 OSA, Mo.2.A.4.
Boutaba et al., "Elastic Optical Networking for 5G Transport," J Netw Syst Manage (2017) 25m pp. 819-847 123.
S. Smolorz et al., "Demonstration of a Coherent UDWDM-PON with Real-Time Processing," OFC/NFOEC 2011, PDPD4.
H. Rohde et al. "Coherent Ultra Dense WDM Technology for Next Generation Optical Metro and Access Networks," Journal of Lightwave Technology, vol. 32, No. 10, May 15, 2014 pp. 2041-2052.

(56) References Cited

OTHER PUBLICATIONS

Ze Dong et al., "Very-High-Throughput Coherent Ultradense WDM-PON Based on Nyquist-ISB Modulation," IEEE Photonics Technology Letters, vol. 27, No. 7, Apr. 1, 2015, pp. 763-766.
Rohde et al., "Digital Multi-Wavelength Generation and Real Time Video Transmission in a Coherent Ultra Dense WDM PON," OFC/NFOEC Technical Digest, 2013 OSA, OM3H.3.
International Search Report issued in connection with PCT/US2020/023871 dated Sep. 24, 2020.
Guo-Wei Lu et al., " Optical subcarrier processing for Nyquist SCM signals via coherent spectrum overlapping in four-wave mixing with coherent multi-tone pump", Optics Express, vol. 26, No. 2, Jan. 22, 2018.
International Search Report issued in connection with PCT/US2020/018180 dated Sep. 18, 2020.
International Search Report issued in connection with PCT/US2020/036209 dated Oct. 1, 2020.
International Search Report issued in connection with PCT/US2020/018292 dated Jun. 4, 2020.
International Search Report issued in connection with PCT/US2020/021024 dated Aug. 3, 2020.
Wei et al: Mac Protocols for Optical Orthogonal Frequency Division Multiple Access (OFDMA)-based Passive Optical Networks, OFC/NFOEC 2008, paper JWA82, Feb. 24-28, 2008 (Year: 2008).
Cerisola et al., "Subcarrier multiplex of packet headers in a WDM optical network and a nouvel ultrafast header clock-recovery technique", 1995, OFC '95 Technical Digest, pp. 273-274 (Year: 1995).
Michael G. Taylor, "Coherent Detection Method Using DSP for Demodulation of Signal and Subsequent Equalization of Propagation Impairments," IEEE Photonics Technology Letters, vol. 16, No. 2, Feb. 2004, pp. 674-676.
K. Roberts, et al., "Performance of dual-polarization QPSK for optical transport system," JLT, vol. 27, No. 16, pp. 3546-3559, Aug. 2009.
S.J. Savory et al., "Digital equalisation of 40Gbit/s per wavelength transmission over 2480km of standard fibre without optical dispersion compensation, " European Conference on Optical Communications (ECOC) 2006, paper Th2.5.5.
H. Sun et al., "Real-time measurements of a 40 Gb/S coherent system," Jan. 21, 2008, vol. 16, No. 2, Optics Express, pp. 873-879.
Greshishchev et al., "A 56GS/s 6b DAC in 65nm CMOS with 256x6b Memory", ISSCC 2011/Session 1 0/Nyquist-Rate Converters/1 0.8, 2011 IEEE International Solid-State Circuits Conference, 3 pages.
Bingham, "Multicarrier Modulator for Data Transmission: An Idea Whose Time Has Come", IEEE Communications Magazine, pp. 5-14, May 1990, 8 pages.
Yan et al. "Experimental Comparison of No-Guard-Interval-OFDM and Nyquist-WDM Superchannels", OFC/NFOEC Techincal Digest, Jan. 23, 20212, 4 pages.
Zhuge et al., "Comparison of Intra-Channel Nonlinearity Tolerance Between Reduced-Guard-Interval CO-OFDM Systems and Nyquist Single Carrier Systems", OFC/NFOEC Technical Digest, Jan. 23, 2012, 4 pages.
Zhang et al., "3760km, 100G SSMF Transmission over Commercial Terrestrial DWDM ROADM Systems using SD-FEC", OFC/NFOEC Postdeadline Papers, Mar. 2012, 3 pages.
Rahn et al., "250Gb/s Real-Time PIC-based Super-Channel Transmission Over a Gridless 6000km Terrestrial Link", OFC/NFOEC Posteadline Papers, Mar. 2012,3 pages.

* cited by examiner

OUT-OF-BAND COMMUNICATION CHANNEL FOR SUB-CARRIER-BASED OPTICAL COMMUNICATION SYSTEMS

CROSS REFERENCE TO RELATED APPLICATIONS

This application claims the benefit of U.S. Provisional Patent Application No. 62/847,651, filed May 14, 2019, which is incorporated herein by reference in its entirety.

BACKGROUND

Optical communication systems typically include a first node that outputs optical carriers to one or more second nodes. The first and second nodes are connected to each other by one or more segments of optical fiber. The nodes in an optical communication system may include an internet protocol (IP) router, for example, as well as, a transceiver module that often plugs into the router and connects to the optical communication system fibers. In many circumstances, the transceiver modules and other node equipment, such as the router, are provided by the same vendor. As such, monitoring, status, and control information associated with the transceiver modules is communicated to a user's central software through the router or other node equipment. An optical service channel or ethernet connection, for example, may be coupled to an external port to provide the monitoring, status, and control information to the central software. The central software, however, typically cannot access or manage the transceiver modules independently of the node equipment. Moreover, transceivers typically do not communicate directly with other equipment in the communication system, such as equipment coupled along the optical fibers ("line system components") in the system as well as other transceivers. That is, transceivers are typically not separately addressable managed entities from the node equipment and lack a direct data path for communicating control information to/from the transceiver. Since such data paths traditionally are made through the node equipment, transceivers purchased from a vendor other than the node equipment vendor may be incompatible with the node equipment, such that a control information data path may not be made directly to the transceiver. Accordingly, such transceivers may not be adequately monitored or controlled.

Without a capability of communicating control information directly with the transceivers, customers may be precluded from purchasing transceivers from vendors other than the vendor that also supplies the node equipment. Such customers, therefore, may not realize cost savings that would otherwise be achieved by purchasing node equipment and transceivers from different vendors.

SUMMARY

In an aspect, a transmitter includes a laser, a digital signal processor, digital-to-analog conversion circuitry, modulator driver circuitry, and an optical modulator. The laser is operable to supply an optical signal. The digital signal processor is operable to supply first electrical signals based on first data input to the digital signal processor and second data input to the digital signal processor. The digital-to-analog conversion circuitry is operable to output second electrical signals based on the first electrical signals. The modulator driver circuitry is operable to output third electrical signals based on the second electrical signals. The optical modulator is operable to supply first and second modulated optical signals based on the third electrical signals. The first modulated optical signal includes a plurality of optical subcarriers carrying user data. The second modulated optical signal is polarization modulated based on the second data.

Implementations of this aspect can include one or more of the following features.

In some implementations, the second data is control data including information associated with at least one of the transmitter or a receiver operable to receive the second modulated optical signal.

In some implementations, each of the plurality of subcarriers has a corresponding one of a plurality of first frequencies, and the second modulated optical signal has a second frequency different than each of said plurality of first frequencies.

In some implementations, the second frequency of the second modulated optical signal is between adjacent ones of the plurality of first frequencies.

In some implementations, the second modulated optical is modulated to be in a first polarization state corresponding to a first portion of the control data or a second polarization state corresponding to a second portion of the control data.

In some implementations, the first portion of the data is a '1' bit and the second portion of the data is a '0' bit.

In some implementations, the control data is first control data. The digital signal processor is operable to receive second control data, and the modulator is further operable to amplitude modulate the first and second modulated optical signals based on the second control data.

In some implementations, the transmitter is operable such that the first and second modulated optical signals are supplied to an optical communication path. An optical component is coupled to the optical communication path, the second control data being associated with a parameter of the optical component.

In some implementations, the transmitter is disposed in a first node, and the first and second modulated optical signals are supplied to an optical communication path. A second node is optically coupled to the optical communication path. The first control data is associated with a parameter of the second node.

In some implementations, the second control data is associated with an optical component optically coupled to the optical communication path between the first and second nodes.

In some implementations, the control data is first control data. The modulator driver circuitry is operable to receive second control data. The modulator is further operable to amplitude modulate the first and second modulated optical signals based on the second control data.

In another aspect, a receiver includes a polarization beam splitter, an optical hybrid circuit, photodiode circuitry, analog-to-digital conversion circuitry, and a digital signal processor. The polarization beam splitter has an input and first and second outputs. The input is configured to receive first and second modulated optical signals. The first modulated optical signal carries information indicative of user data and including a plurality of optical subcarriers, and second modulated optical signal is polarization modulated based on control data, such that the first output supplies a first portion of the first and second modulated optical signals and the second output supplies a second portion of the first and second modulated optical signals. The optical hybrid circuit is operable to provide optical mixing products based on the first portion of the first and second modulated optical signals, the second portion of the first and second modulated optical signals, and a local oscillator signal. The photodiode circuitry is operable to provide first electrical signals based on the optical mixing products. The analog-to-digital conversion circuitry is operable to provide second electrical signals based on the first electrical signals. The digital signal processor is operable to provide the user data and the control data based on the second electrical signals.

Implementations of this aspect can include one or more of the following features.

In some implementations, the receiver further includes a local oscillator laser operable to supply the local oscillator signal.

In some implementations, each of the plurality of subcarriers has a corresponding one of a plurality of first frequencies, the second modulated optical signal having a second frequency different than each of said plurality of first frequencies.

In some implementations, the second frequency of the second modulated optical signal is between adjacent ones of the plurality of first frequencies.

In some implementations, the second modulated optical is modulated to be in a first polarization state corresponding to first portion of the control data or a second polarization state signal corresponding to a second portion of the control data.

In some implementations, the first portion of the data is a 1' bit and a second portion of the data is a '0' bit.

In some implementations, the user data is associated with a subset of the plurality of optical subcarriers.

In some implementations, the control data is first control data, and the first and second modulated optical signals are further amplitude modulated based on second control data.

In some implementations, the receiver further includes a mean square detector circuit operable to output a signal indicative of the second control data.

In some implementations, the mean square detector is coupled to the analog-to-digital conversion circuitry.

In some implementations, the receiver further includes trans-impedance amplifier circuitry coupled to the photodiode circuitry. The trans-impedance amplifier circuitry is operable to supply a signal indicative of the second control data.

In some implementations, the receiver is disposed in a first node, and the first and second modulated optical signals are received from an optical communication path. A second node is optically coupled to the optical communication path to supply the first and second modulated optical signals. The first control data is associated with a parameter of the second node.

In some implementations, the second control data is associated with an optical component optically coupled to the optical communication path between the first and second nodes.

In another aspect, a transceiver includes a first digital signal processor, a modulator, a photodiode circuit, and a second digital processor. The first digital signal processor is operable to supply first electrical signals. The modulator is operable to supply a first optical signal based on the first electrical signals, the first optical signal including a first plurality of optical subcarriers, the first plurality of optical subcarriers not overlapping one another in frequency, and a second optical signal that carries first control information. The first optical signal is modulated to carry second control information. The first control information is associated with another transceiver remote from the modulator. The second control information is associated with an optical component connected to an optical communication path that optically couples the transceiver to said another transceiver. The photodiode circuit is operable to receive a third optical signal including a second plurality of optical subcarriers, the second plurality of optical subcarriers not overlapping one another in frequency, and a fourth optical signal that carries third control information. The third optical signal is modulated to carry fourth control information. The photodiode circuit supplies a second electrical signal based on the third optical signal. The second digital processor is operable to supply data indicative of the control third and fourth control information based on the second electrical signal. The third control information is associated with said another transceiver remote. The fourth control information is associated with the optical component connected to the optical communication path.

In another aspect, an apparatus includes an optical tap, a photodiode, an analog-to-digital conversion circuit, and clock and data recovery circuitry. The optical tap is configured to be coupled to an optical communication path. The optical communication path is operable to carry a modulated optical signal carrying a plurality of optical subcarriers. The plurality of optical subcarriers do not spectrally overlap one another. The optical tap has first and second outputs, the first output configured to supply a first portion of the modulated optical signal and the second output configured to supply a second portion of the modulated optical signal. An optical power associated with the first portion of the modulated optical signal is less than an optical power associated with a second portion of the modulated optical signal. The plurality of optical subcarriers are amplitude modulated based on control data at a first frequency, and each of the plurality of optical subcarriers is modulated to carry user data at a second frequency greater than the first frequency. The photodiode is operable to receive the first portion of the modulated optical signal. The photodiode is operable to supply an analog signal based on the received first portion of the modulated optical signal. The analog-to-digital conversion circuit is operable to generate a digital signal based on the analog signal. The clock and data recovery circuitry is operable to supply the control data based on the digital signal.

Implementations of this aspect can include one or more of the following features.

In some implementations, the control data is indicative of a parameter associated with an optical component coupled to the optical communication path.

In some implementations, the optical component is an erbium doped fiber amplifier.

In some implementations, the optical component is a wavelength selective switch.

In some implementations, the optical communication path further carries a polarization modulated optical signal.

In some implementations, the apparatus is co-located with the optical component.

In some implementations, the apparatus further includes a variable optical attenuator coupled to the optical communication path. The variable optical attenuator is operable to receive, via a first optical port, the second portion of the modulated optical signal from the optical tap. The variable optical attenuator is further operable to receive, via a second optical port, a second analog signal. The variable optical attenuator is further operable to attenuate the second portion of the modulated optical signal according to the second analog signal, and output the attenuated second portion of the modulated optical signal.

In some implementations, the optical tap is configured to be coupled to the optical communication path between a first end of the optical communication path and a second end of the optical communication path opposite the first end of the optical communication path. The first end of the optical communication path includes a transmitter, and the second end of the optical communication path includes a receiver.

In another aspect, an apparatus includes a source of control data, digital-to-analog conversion circuitry, and a variable optical attenuator. The digital-to-analog conversion circuitry is operable to receive the control data and output an analog signal. The variable optical attenuator has a first optical port and a second optical port. The first optical port is operable to receive an optical signal including a plurality of optical subcarriers transmitted on an optical communication path. The plurality of optical subcarriers do not spectrally overlap one another. The variable optical attenuator is operable to amplitude modulate the optical signal to provide an amplitude modulated optical signal based on the analog signal. The amplitude modulated optical signal includes the plurality of optical subcarriers.

Implementations of this aspect can include one or more of the following features.

In some implementations, the control data is indicative of a parameter associated with an optical component coupled to the optical communication path.

In some implementations, the optical component is an erbium doped fiber amplifier.

In some implementations, the optical component is a wavelength selective switch.

In some implementations, the first optical port further receives a polarization modulated optical signal transmitted on the optical communication path.

In some implementations, the variable optical attenuator is configured to be coupled to the optical communication path between a first end of the optical communication path and a second end of the optical communication path opposite the first end of the optical communication path. The first end of the optical communication path includes a transmitter, and the second end of the optical communication path includes a receiver.

In another aspect, an apparatus includes a first optical input port, a first optical output port, a first electrical circuit, a second electrical circuit, a second optical input port, and a variable optical attenuator. The first optical input port is coupled to a first optical communication path and is operable to receive a first amplitude modulated optical signal transmitted on the first optical communication path. The first amplitude modulated optical signal includes a first plurality of optical subcarriers. The first amplitude modulated optical signal is amplitude modulated based on first control data. The first optical output port is operable to output the first amplitude modulated optical signal. The first electrical circuit includes a photodiode operable to receive a portion of the first amplitude modulated optical signal and provide a first electrical signal based on the portion of the first amplitude modulated optical signal. The second electrical circuit is operable to output the first control data based on the first electrical signal. The second optical input port is coupled to a second optical communication path operable to receive a second optical signal including a second plurality of optical subcarriers transmitted on the second optical communication path. The variable optical attenuator is operable to receive the second plurality of optical subcarriers and amplitude modulate the second plurality of optical subcarriers based on second control data to provide a second amplitude modulated optical signal.

Implementations of this aspect can include one or more of the following features.

In some implementations, the second control data is indicative of a parameter associated with an optical component coupled to the second optical communication path.

In some implementations, the optical component is an erbium doped fiber amplifier.

In some implementations, the optical component is a wavelength selective switch.

In some implementations, the first amplitude modulated optical signal includes a first polarization modulated optical signal and the second amplitude modulated optical signal includes a second polarization modulated optical signal.

In some implementations, the first electrical circuit is configured to be coupled to the first optical communication path between a first end of the first optical communication path and a second end of the first optical communication path opposite the first end of the first optical communication path. The first end of the first optical communication path includes a first transmitter, and the second end of the first optical communication path includes a first receiver. The variable optical attenuator is configured to be coupled to the second optical communication path between a first end of the second optical communication path and a second end of the second optical communication path opposite the first end of the second optical communication path. The first end of the second optical communication path includes a second transmitter, and the second end of the second optical communication path includes a second receiver.

In another aspect, an apparatus includes a laser, a digital signal processor, digital to analog circuitry, driver circuitry, and a modulator. The laser is operable to supply an optical signal. The digital signal processor is operable to supply digital signals. The digital to analog circuitry is operable to provide analog signals based on the digital signals. The driver circuitry is coupled to the digital to analog circuitry, and is operable to supply at least one drive signal. The modulator operable to receive said at least one drive signal, modulate the optical signal based on said at least one drive signal to provide a plurality of optical subcarriers, amplitude modulate the plurality of optical subcarriers at a first frequency to carry first control information, and modulate the plurality of subcarriers at a second frequency to carry second control information.

Implementations of this aspect can include one or more of the following features.

In some implementations, each of the optical subcarriers is a Nyquist subcarrier.

In some implementations, the first frequency is in a range of 3 MHz to 4 MHz and the second frequency is in a range of 6 MHz to 7 MHz.

In some implementations, the plurality of optical subcarriers is a first plurality of optical subcarriers. The apparatus further includes a receiver operable to receive a second plurality of optical subcarriers, each of which is amplitude modulated at a third frequency.

In some implementations, the first frequency is within a first band and the second frequency is within a second band. The third frequency is within the first band or the second band.

In some implementations, the second plurality of optical subcarriers is further amplitude modulated at a fourth frequency different than the third frequency.

In some implementations, the first frequency is within a first band and the second frequency is within a second band. The third frequency is within the first band and the fourth frequency being within the second band.

In another aspect, an apparatus includes an optical hybrid circuit, a photodiode circuit, analog to digital conversion circuitry, and a digital signal processor. The optical hybrid circuit is operable to receive a plurality of optical subcarriers. The plurality of optical subcarriers is amplitude modulated at a first frequency to carry first control information and amplitude modulated at a second frequency to carry second control information. The optical hybrid circuit is also operable to receive a local oscillator signal, and provide mixing products based on the local oscillator signal and the plurality of optical subcarriers. The photodiode circuit operable to provide first electrical signals based on the mixing products. The analog to digital conversion circuitry is operable to output digital signals based on the first electrical signals. The digital signal processor is operable to provide data associated with the plurality of optical subcarriers. The apparatus also includes circuitry operable to receive second electrical signals based on first electrical signals and output the first and second control information based on the first electrical signals.

Implementations of this aspect can include one or more of the following features.

In some implementations, each of the optical subcarriers is a Nyquist subcarrier.

In some implementations, the first frequency is in a range of 3 MHz to 4 MHz and the second frequency is in a range of 6 MHz to 7 MHz.

In some implementations, the plurality of optical subcarriers is a first plurality of optical subcarriers. The apparatus further includes a receiver operable to receive a second plurality of optical subcarriers, each of which is amplitude modulated at a third frequency.

In some implementations, the first frequency is within a first band and the second frequency is within a second band. The third frequency is within the first band or the second band.

In some implementations, the second plurality of optical subcarriers is further amplitude modulated at a fourth frequency different than the third frequency.

In some implementations, the first frequency is within a first band and the second frequency is within a second band. The third frequency is within the first band and the fourth frequency being within the second band.

In some implementations, the apparatus further includes a plurality of filter circuits, each of which has a corresponding one of a plurality of passbands. The plurality of optical subcarriers is further amplitude modulated at a third frequency different than the first and second frequencies. The plurality of filter circuits block signals being associated with the third frequency.

In another aspect, an apparatus includes a transmitter and a receiver. The transmitter includes a laser, a digital signal processor, digital to analog circuitry, driver circuitry, and a modulator. The laser is operable to supply an optical signal. The digital signal processor is operable to supply digital signals. The digital to analog circuitry is operable to provide analog signals based on the digital signals. The driver circuitry is coupled to digital to analog circuitry, and is operable to supply at least one drive signal. The modulator is operable to receive said at least one drive signal, modulate the optical signal based on said at least one drive signal to provide a first plurality of optical subcarriers, amplitude modulate the first plurality of subcarriers at a first frequency to carry first control information, and modulate the first plurality of subcarriers at a second frequency to carry second control information. The receiver includes an optical hybrid circuit, a photodiode circuit, analog to digital conversion circuitry, and a digital signal processor. The optical hybrid circuit is operable to receive a second plurality of optical subcarriers. The second plurality of optical subcarriers are amplitude modulated at a third frequency to carry third control information and amplitude modulated at a fourth frequency to carry fourth control information. The optical hybrid circuit is also operable to receive a local oscillator signal, and provide mixing products based on the local oscillator signal and the plurality of optical subcarriers. The photodiode circuit is operable to provide first electrical signals based on the mixing products. The analog to digital conversion circuitry is operable to output digital signals based on the first electrical signals. The digital signal processor is operable to provide data associated with the plurality of optical subcarriers, The receive also includes circuitry operable to receive second electrical signals based on first electrical signals and output the third and fourth control information based on the first electrical signals.

Implementations of this aspect can include one or more of the following features.

In some implementations, the laser is further operable to supply the local oscillator signal.

In some implementations, each of the optical subcarriers is a Nyquist subcarrier.

In some implementations, the first frequency is in a range of 3 MHz to 4 MHz and the second frequency is in a range of 6 MHz to 7 MHz.

In some implementations, the second plurality of optical subcarriers is further amplitude modulated at a third frequency.

In some implementations, the first frequency is within a first band and the second frequency is within a second band. The third frequency is within the first band or the second band.

In some implementations, the second plurality of optical subcarriers is further amplitude modulated at a fourth frequency different than the third frequency.

In some implementations, the first frequency is within a first band and the second frequency is within a second band. The third frequency is within the first band and the fourth frequency being within the second band.

In another aspect, an optical communication system includes a primary transceiver, a component, and a plurality of secondary transceivers. The primary transceiver is operable to supply a first plurality of optical subcarriers to a optical communication path, the first plurality of optical subcarriers being amplitude modulated at a first frequency to carry first control information and being amplitude modulated at a second frequency to carry second control information. The component is operable to be coupled to the optical communication path. The component includes circuitry operable to detect the first control information. The plurality of secondary transceivers is coupled to a terminal end of the optical communication path. At least one of the plurality of secondary transceivers is operable to detect the second control information and block the first control information.

Implementations of this aspect can include one or more of the following features.

In some implementations, each of the plurality of subcarriers is a Nyquist subcarrier.

In another aspect, an optical communication system includes a primary transceiver, a plurality of secondary transceivers, a network management system, a component, a first data path, and a second data path. The primary transceiver is coupled to an optical communication path and is operable to supply a plurality of optical subcarriers to the optical communication path. The plurality of secondary transceivers is coupled to the optical communication path.

The network management system includes software. The component is coupled to the optical communication path. The first data path is operable to carry first control information, the first data path extending from the primary transceiver to the software via the component. The second data path is operable to carry second control information, the second data path extending from the primary transceiver to at least one of the secondary transceivers via the optical component.

Implementations of this aspect can include one or more of the following features.

In some implementations, the optical communication system includes a third data path operable to carry third control information, the third data path extending from at least one of the secondary transceivers to the primary transceiver, the third data path supplying the third control information to the primary transceiver.

In some implementations, the optical communication system includes a fourth data path operable to carry fourth control information, the fourth data path extending from the central software to the primary transceiver, the fourth data path supplying the fourth control information to the primary transceiver.

In some implementations, the optical communication system includes a fifth data path operable to carry fifth control information, the fifth data path extending from the central software to at least one of the secondary transceivers, the fifth data path supplying the fifth control information to said at least one of the secondary transceivers.

In some implementations, the optical communication system includes a sixth data path operable to carry sixth control information, the sixth data path extending from at least one of the plurality of secondary transceivers to the central software, the sixth data path supplying the sixth control information to the central software.

In some implementations, the first data path is associated with an amplitude modulation of the plurality of optical subcarriers.

In some implementations, the second data path is associated with a polarization modulated signal transmitted from the primary transceiver onto the optical communication path.

In some implementations, the first data path is associated with a first amplitude modulation of the plurality of optical subcarriers at a first frequency and a second amplitude modulation of the second plurality of optical subcarriers at a second frequency different than the first frequency.

In some implementations, each of the plurality of optical subcarriers is a Nyquist subcarrier.

In another aspect, a communication method is performed with respect to an optical communication system including a primary transceiver and a plurality of secondary transceivers. The method includes generating a plurality of optical subcarriers, amplitude modulating the plurality of optical subcarriers at a first frequency to carry first control information, amplitude modulating the plurality of optical subcarriers at a second frequency to carry second control information, and transmitting the plurality of subcarriers on a first optical communication path. The method also includes receiving the plurality of optical subcarriers from the first optical communication path at a receiver, detecting the first and second control information at the receiver, generating a second plurality of optical subcarriers, amplitude modulating the second plurality of optical subcarriers based on the second control information, transmitting the second plurality of optical subcarriers on a second optical communication path, and detecting the second control information at an optical component coupled to the second optical communication path.

Implementations of this aspect can include one or more of the following features.

In some implementations, the method further includes forwarding the second control information from the optical component to a network management system.

In some implementations, the method further includes providing a portion of each of the second plurality of optical subcarriers with an optical tap.

In some implementations, said detecting the second control information at the optical component is based on the portion of the second plurality of optical subcarriers.

In some implementations, the method further includes amplitude modulating the first plurality of optical subcarriers at a third frequency.

In some implementations, the method further includes filtering signals, at the receiver, associated with the third frequency.

In some implementations, each of the first plurality of optical subcarriers is a Nyquist subcarrier.

In some implementations, third control information is associated with the third frequency and the optical component is a first optical component. The method further includes transmitting the first plurality of subcarriers to a second optical component, and detecting the third control information at the third optical component.

In another aspect, one or more non-transitory computer readable media stores instructions that, when executed by one or more processors, cause the one or more processors to perform a number of operations. The operations include generating a plurality of optical subcarriers, amplitude modulating the plurality of optical subcarriers at a first frequency to carry first control information, amplitude modulating the plurality of optical subcarriers at a second frequency to carry second control information, and transmitting the plurality of subcarriers on a first optical communication path. The operations also includes receiving the plurality of optical subcarriers from the first optical communication path at a receiver, detecting the first and second control information at the receiver, generating a second plurality of optical subcarriers, amplitude modulating the second plurality of optical subcarriers based on the second control information, transmitting the second plurality of optical subcarriers on a second optical communication path, and detecting the second control information at an optical component coupled to the second optical communication path.

Implementations of this aspect can include one or more of the following features.

In some implementations, the method further includes forwarding the second control information from the optical component to a network management system.

In some implementations, the method further includes providing a portion of each of the second plurality of optical subcarriers with an optical tap.

In some implementations, said detecting the second control information at the optical component is based on the portion of the second plurality of optical subcarriers.

In some implementations, the method further includes amplitude modulating the first plurality of optical subcarriers at a third frequency.

In some implementations, the method further includes filtering signals, at the receiver, associated with the third frequency.

In some implementations, each of the first plurality of optical subcarriers is a Nyquist subcarrier.

In some implementations, third control information is associated with the third frequency and the optical component is a first optical component. The method further includes transmitting the first plurality of subcarriers to a second optical component, and detecting the third control information at the third optical component.

In some implementations, the method further includes transmitting the third control information to a network management system.

BRIEF DESCRIPTION OF THE DRAWINGS

Like reference numbers and designations in the various drawings indicate like elements.

DETAILED DESCRIPTION

Figure 1:
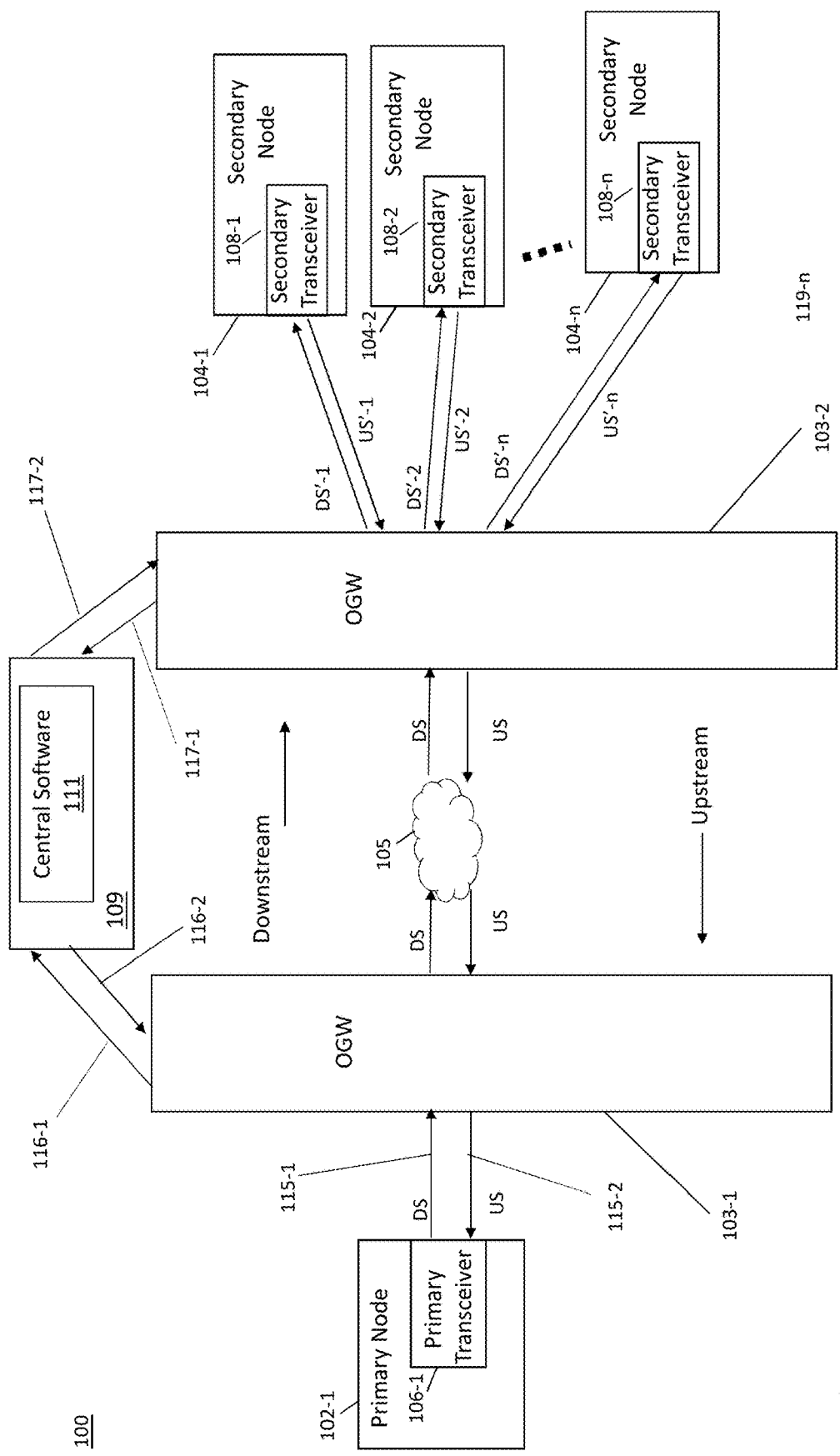
FIG. 1 is a diagram illustrating an example of an optical communication system consistent with the present disclosure.

Consistent with the present disclosure, control or communication paths are provided to transceivers installed in host equipment or added to node equipment to enable outside central software to exchange information with the transceivers directly. As a result, the central software can monitor and control the transceivers independently of and augment the control or communication signals that may be provided by the node equipment. The data paths disclosed herein also enable a line system component near a hub (or leaf) node to send to and receive directly from a transceiver located in the hub (or leaf) node also without access through the node equipment. Moreover, the data paths disclosed herein also facilitate exchange of control and management information between transceivers, such as transceivers provided in hub and leaf nodes. Further, since the data paths are independent of the node equipment bi-directional communication of control information can occur simultaneously without direct coordination between the transceivers and the node equipment. Customers may, therefore, combine transceivers or transceiver modules and node equipment from different vendors to thereby optimize performance and/or minimize costs.

The data paths may be realized through several example mechanisms that reduce or prevent interference between the data paths. In one example, a first data path between line system components and the transceivers is implemented with a low rate amplitude modulated signal that is superimposed on high data rate optical signal output from the transceivers. In addition, a second data path is implemented through polarization modulation, e.g., polarization shift keying, of an optical signal that is also output from the transceiver.

In a further example, control information is exchanged over a first data path between a transceiver (hub or leaf) and a line system component by way of a first amplitude modulation over a first band of frequencies or at a first frequency. The first amplitude modulation is superimposed on optical signals output from the transceiver module. The second data path is implemented, for example, by a second amplitude modulation over a second band of frequencies or a second frequency. The second amplitude modulation is further superimposed on the optical signals output from the transceiver along with the first amplitude modulation. The second amplitude modulation facilitates communication over a data path, for example, between transceivers.

Example data paths are discussed in greater detail below and shown in the drawings. Namely, FIGS. 1 and 2a-2c show examples of data path connections consistent with the present disclosure. FIGS. 3-17 show features of a first data path implementation example wherein transceivers or transceiver modules communicate control information or data with each other by way of a polarization modulated optical signal and communicate with line system components, such as an optical gateway, by way of amplitude modulation of the optical signals output from the transceiver.

Figure 18:
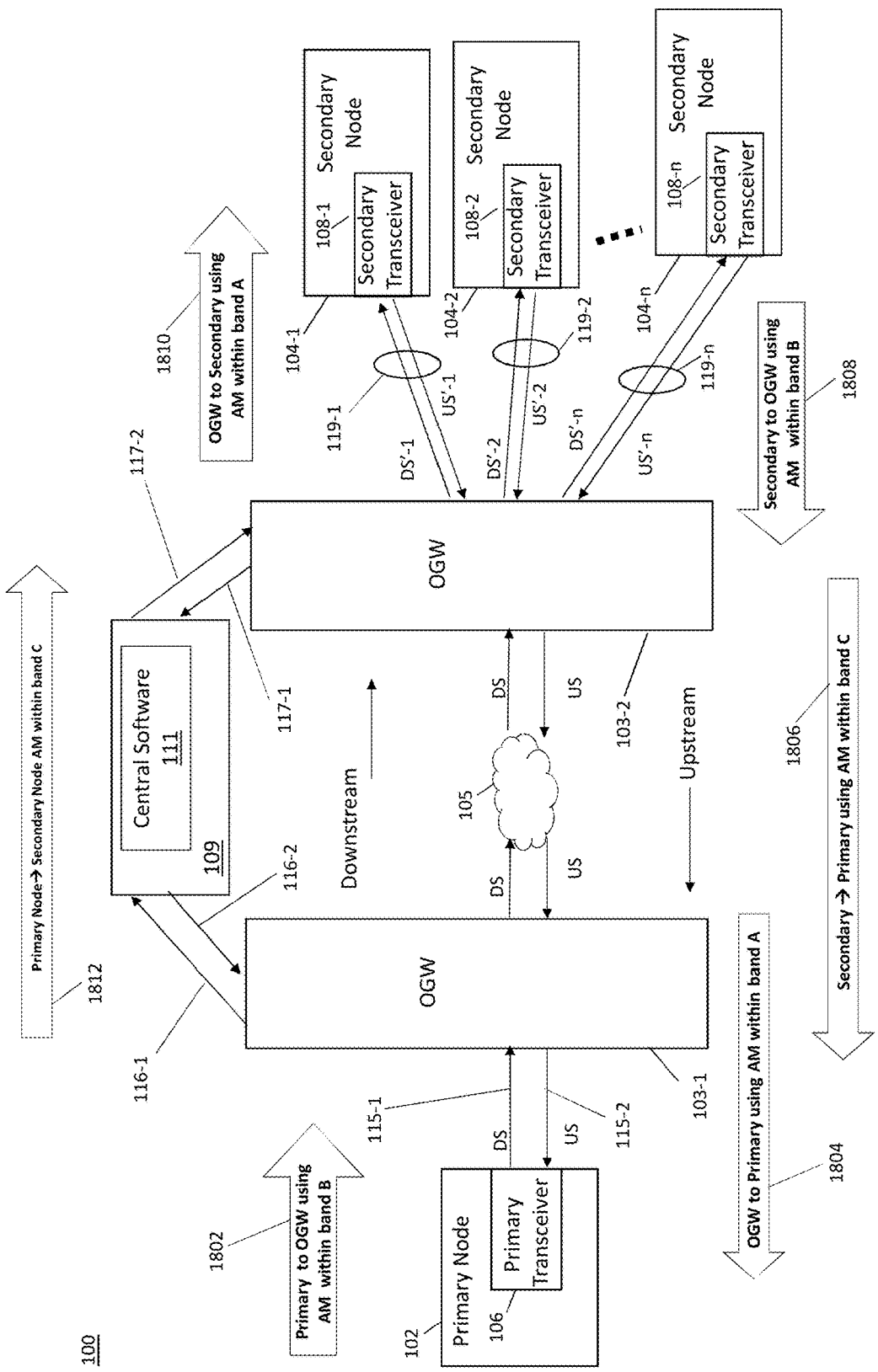
FIG. 18 shows an example of an optical communication system consistent with an additional aspect of the present disclosure.
Figure 19:
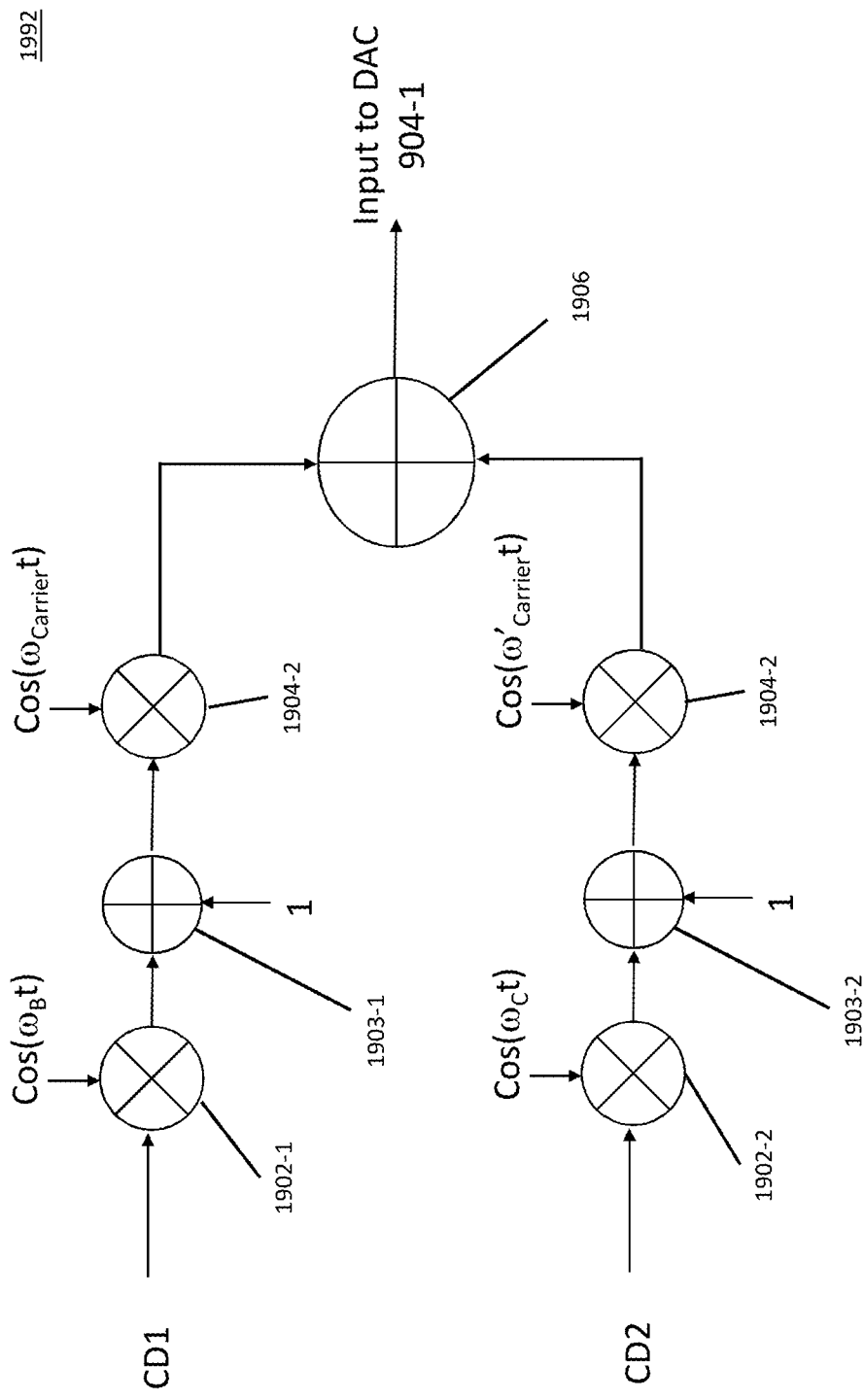
FIG. 19 shows a further example of an amplitude modulation generating circuit.
Figure 20:
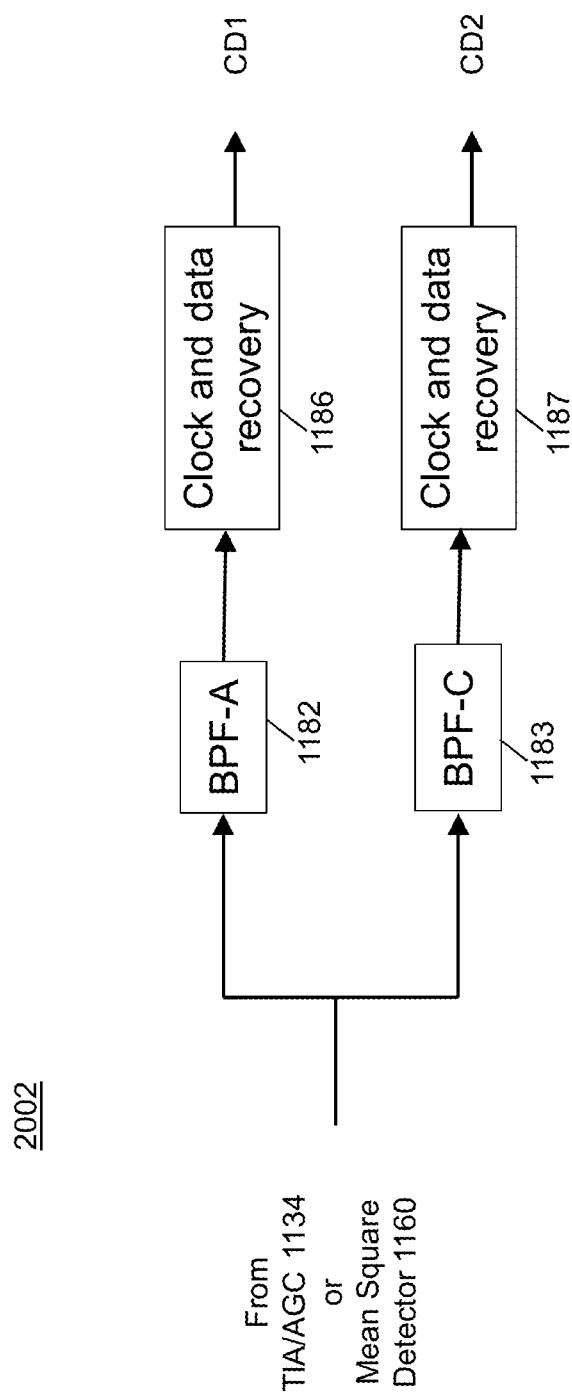
FIG. 20 shows circuitry for recovering control information from signal supplied to a transceiver.

In addition, FIGS. 18-20 show features of data path connections wherein amplitude modulation of the optical signals output from the transceiver are amplitude modulated at different frequencies associated with different components in an optical communication system. For example, in connection amplitude modulation at a first frequency or over a first band of frequencies is associated with communication between a primary or hub node and a line system component in a first direction; amplitude modulation at a second frequency or over a second band of frequencies is associated with communication between a primary node and one or more secondary or leaf nodes in the first direction; and an amplitude modulation at a third frequency or over a third band of frequencies is associated with communication between a line system component and one or more secondary or leaf nodes in the first direction. Such communication in the first direction may be carried out on a first optical communication path.

In a further example, amplitude modulation at the first frequency or over the first band of frequencies is associated with communication between a secondary or leaf node and a line system component in a second direction; amplitude modulation at the second frequency or over a second band of frequencies is associated with communication between one or more secondary node or leaf nodes and the hub or primary node in the second direction; and an amplitude modulation at the third frequency or over the third band of frequencies is associated with communication between a line system component and the primary or hub node in the second direction. Such communication in the second direction may be carried out on a second optical communication path.

I. Example Data Paths

Before describing the above noted data paths, an example optical communication system will next be described in which such data paths may be provided. In particular, FIG. 1 shows a block diagram of an optical communication system 100 consistent with an aspect of the present disclosure. Optical communication system 100 includes, for example, a primary node 102, such as a router. A primary transceiver or transceiver module 106, for example, is provided in primary node 102 that supplies downstream optical signal DS to optical fiber link 115-1, part of a first or downstream optical communication path, and receives upstream signal US from optical fiber links 115-2, part of a second or upstream optical communication path. Downstream optical signal DS is fed by fiber link 115-1 to an optical line system component, such as optical gateway OGW 103-1. As discussed in greater detail below with reference to FIG. 3, optical signals DS and US each include a plurality of optical subcarriers, such as Nyquist optical subcarriers, for example. OGW 103-1 also supplies signal US on fiber link 115-2 to primary transceiver 106.

As described below with reference to FIG. 7, OGW 103-1 includes optical and electrical components extract control channel information carried by signal DS and supply such information to central software 111, which may run on network management system 109, including one or more computers and/or processors. As shown in FIG. 1, link 116-1 may supply such control information to central software 111. As further described below with reference to FIG. 7, additional control information may be provided over link 116-2 to OGW 103-1, such that the optical and electrical circuitry in OGW 103-1 further outputs signal US with such additional control information for detection by transceiver 106.

OGW 103-1 outputs signal DS to one or more optical links, line system components, such as one or more optical amplifiers (e.g., erbium doped optical amplifiern as), wavelength selective switches (WSSs), power splitters and/or combiners, and optical multiplexers and/or demultiplexers (e.g., an arrayed waveguide grating). Such components are represented in FIG. 1 by sub-system 105. After propagating through sub-system 105, signal DS is supplied, for example, to another optical gateway (OGW) 103-2, which, in this example, may include an optical splitter in addition to the components or devices shown in FIG. 7. Accordingly, OGW 103-2 may provide a power split portion of signal DS, namely, DS'-1 to DS'-n to a respective one of secondary transceivers 108-1 to 108-$n$, each of which being provided in a respective one of secondary nodes 104-1 to 104-$n$ and at least one of the transceivers being coupled to a terminal end of the downstream optical communication path. Each secondary node 104 may have a structure similar to primary node 102 and may operate in a manner similar to that described above with respect to primary node 102.

OGW 103-2 may operate in a manner similar to that described above with respect to OGW 103-1 to supply control information on link 117-1 to control software 111 and to separately supply the same or different control information to secondary transceivers 108. In addition, OGW 103-2 may operate in a manner similar to that of OGW 103-1 to receive control information from central software 111 via link 117-2, and separately receive the same or different control information from transceivers 108. Links 117-1 and 117-2 may carry the same type of signals as links 116-1 and 116-2.

As further shown in FIG. 1, each secondary transceiver 108 may have a structure similar to and operate in manner similar to that described above with respect to primary node 106. In one example, however, each of secondary transceivers 108 may supply modulated optical signal US'-1 to US'-n in an upstream direction. Each such optical signal may include one or more optical subcarriers. Collectively, a number the optical subcarriers output from secondary transceivers 108 may be equal to, less than, or greater than the number of optical subcarriers output from primary transceiver 106.

Optical signals US'-1 to US'-n may be combined by a combiner in OGW 103-2, and output, in combined form as upstream optical signal US, to sub-system 105. Optical signal US may then be provided to OGW 103-2, which outputs optical signal US onto fiber link 115-2, which supplies optical signal US to primary transceiver 106.

Figure 2A:
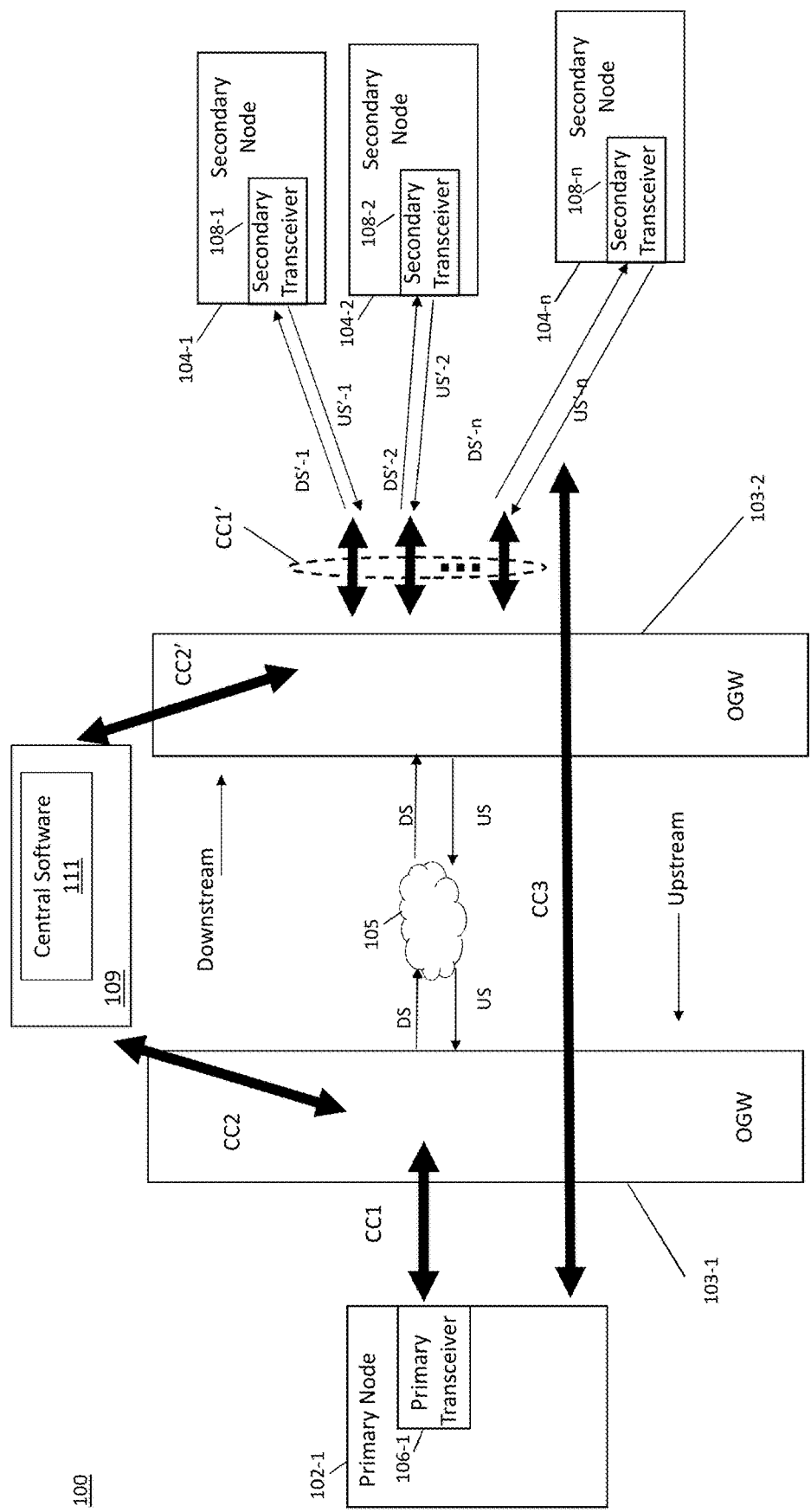
FIGS. 2a-2c are diagrams related to data paths for communicating control information in the optical communication system shown in FIG. 1.

FIG. 2a shows system 100 labeled with various data paths. For example, data path CC1 provides communication of control information between OGW 103-1 and primary transceiver 106. Data paths CC2 and CC2' facilitate control information communication between OGW 103-1 and OGW 103-2, respectively, and central software 111. In addition, data path CC3 provides communication of control information between one or more secondary transceivers 104 and primary transceiver 106, and, further, data paths CC1' provide control information between OGW 103-2 and secondary transceivers 108. As noted above, the data paths disclosed herein may provide communication between central software 111 and the transceivers and need not provide such communication with intervening node equipment, such as a router. Although FIG. 2a shows first (103-1) an second (103-2) optical gateways, it is understood that, in another example, only one such optical gateway may be provided near primary node 102, such that only OGW 103-1 is included in system 100. In that case, OGW 103-2 is replaced with an optical splitter/combiner, as discussed below with reference to FIGS. 2b and 2c. Alternatively, OGW 103-1 may be replaced with a splitter/combiner, such that, in a further example, system 100 only includes OGW 103-2 near secondary nodes 104.

Figure 2B:
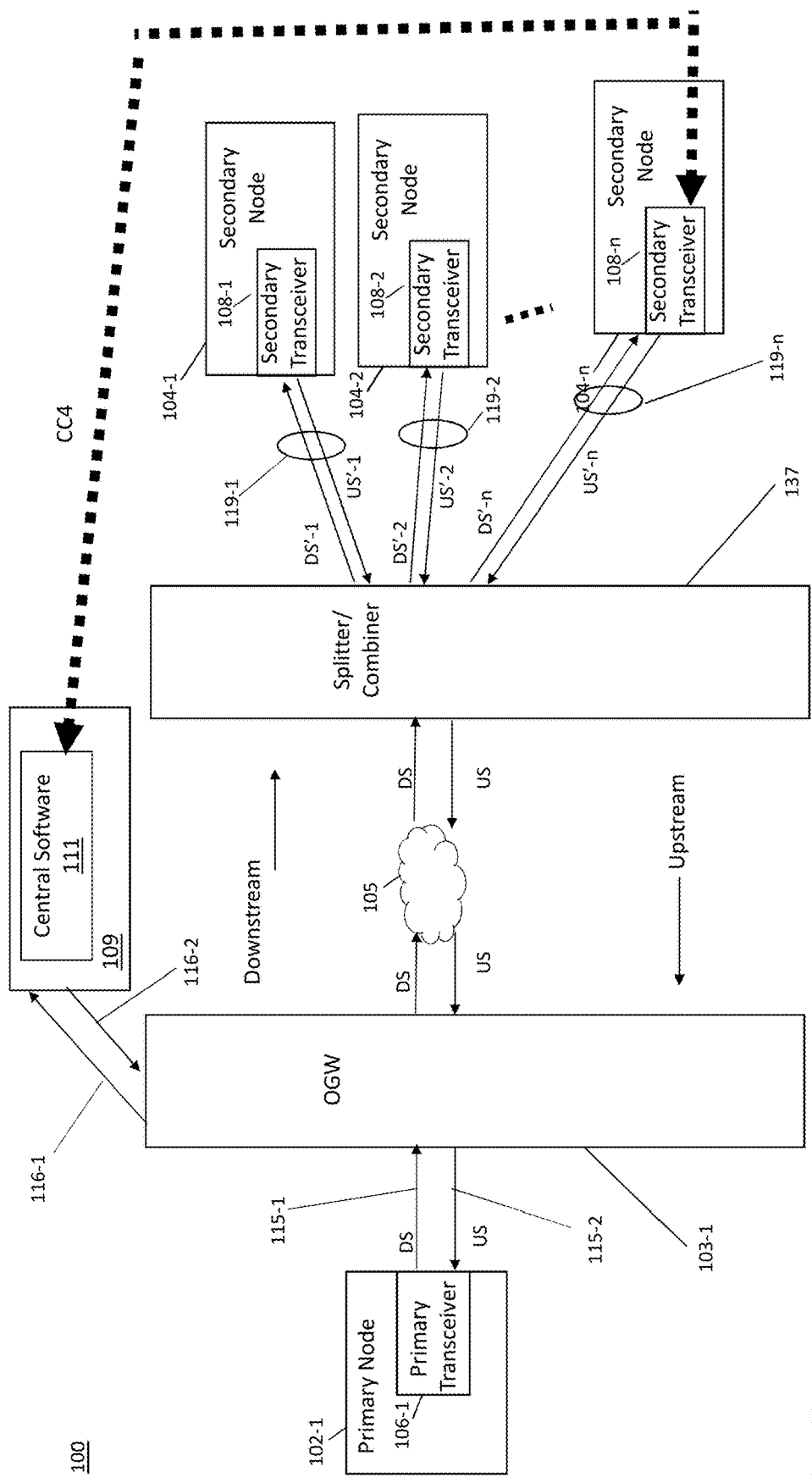

FIG. 2b, shows an example of an idealized data path CC5 between secondary transceiver 108-n and central software 111. As noted above, due to incompatibilities between the transceivers and the host node equipment, data path CC5 typically cannot be made directly to transceiver 108-n. Here, OGW 103-2 is replaced by a splitter/comber 137 (a line system component). Accordingly, data path connections by which control information may be communicated between transceiver 108-n central software 111 and network management system 109 will next be described with reference to FIG. 2c.

Figure 2C:
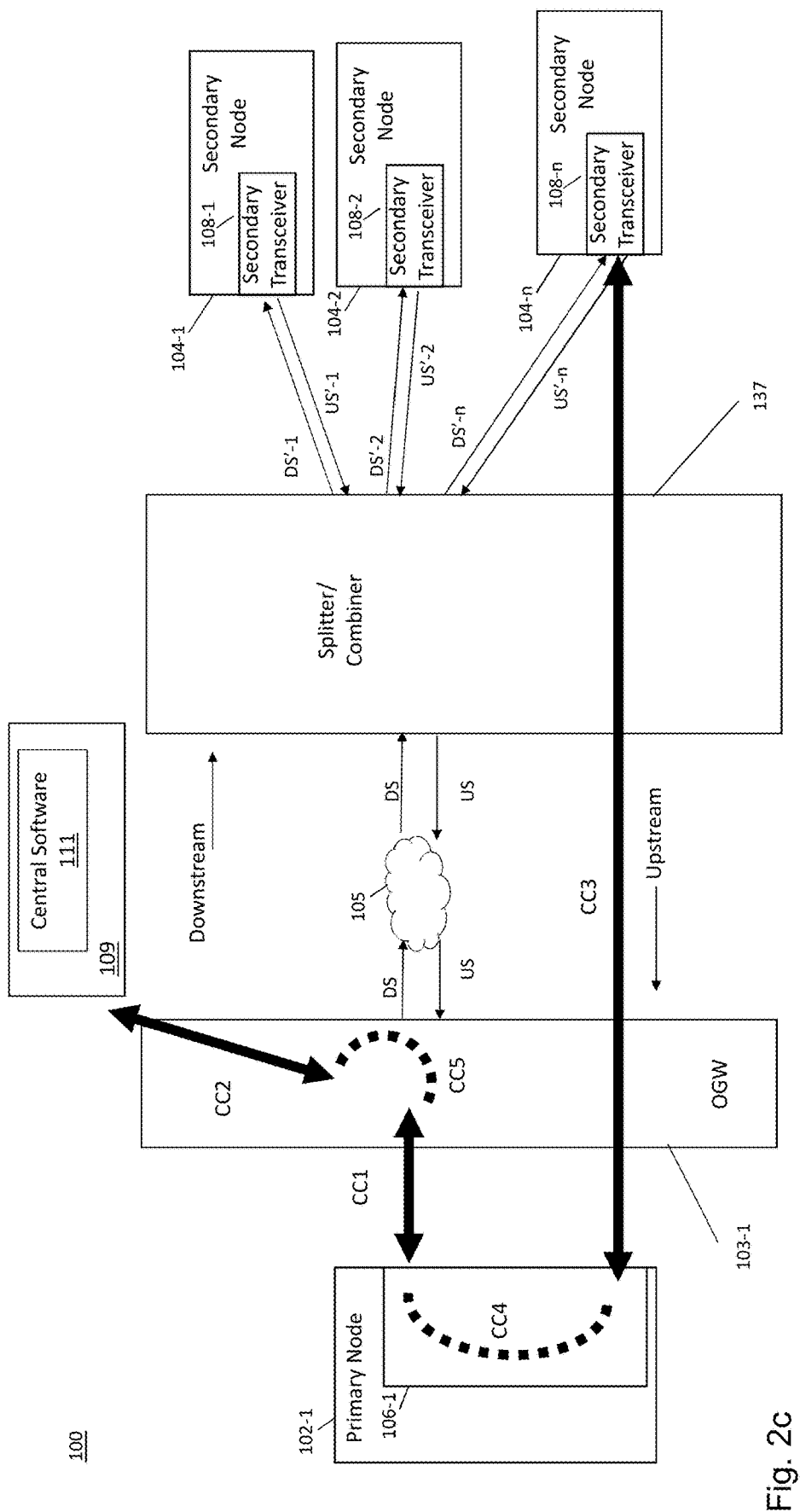

As shown in FIG. 2c, communication of control information between secondary transceiver 108-n and central software 111 can be made through data path CC3, which extends through OGW 103-1 and OGW 103-2, data path CC4 through transceiver 106, data path CC1 to OGW 103-1, data path CC3 through OGW 103-1, and through data path CC2 to central software 111. As a result, communication of control information between central software 111 and secondary transceiver 108-n may be made independent of the node equipment in secondary node 104-n. Rather, such communication is made, in this example, through upstream transmission through line system components, transceiver 106, and downstream transmission to OGW 103-1, which outputs the control information to central software 111 and network management system 109.

A first example of a data path implementation will next be described with reference to FIGS. 3-17. In the first example, groups of optical subcarriers, such as Nyquist subcarriers, are amplitude modulated to carry control information to/from the transceivers and the line system component, such as the optical gateway. Further, in the first example, additional control information is exchanged between the primary transceiver and one or more secondary transceivers by modulating a polarization of an optical signal occupying a relatively narrows spectrum, for example, between two spectrally adjacent optical subcarriers. A second example of a data implementation based on amplitude modulation at different frequencies is further described below with respect to FIGS. 18-20.

Figure 3:
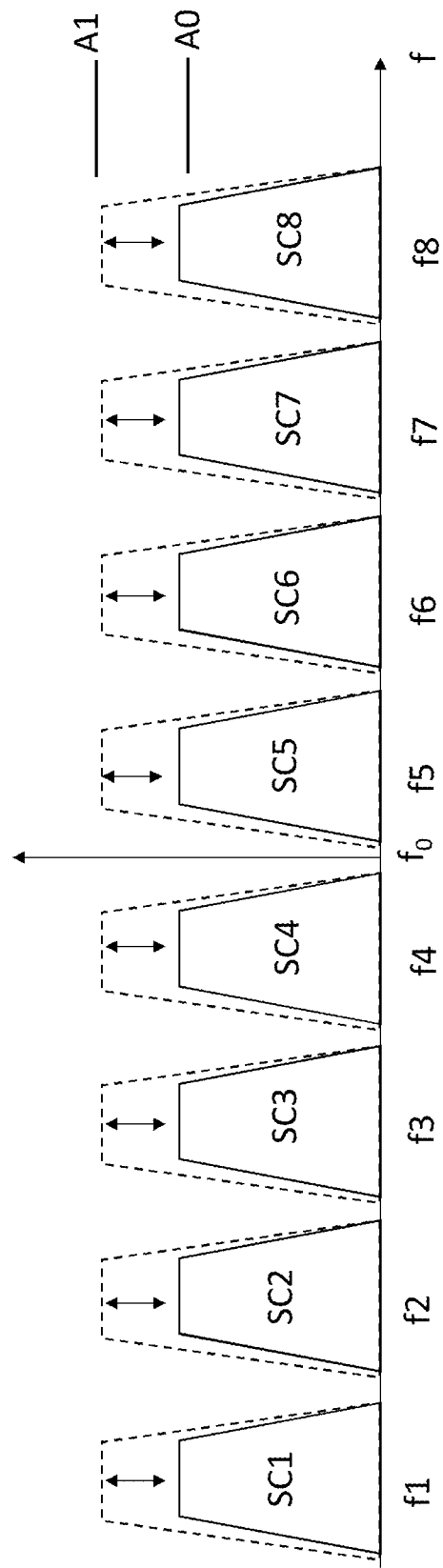
FIG. 3 depicts an example of sub-carriers of a communication channel and an out-of-band communication signal generated using an optical communication system.

II. First Data Path Implementation
Example—Communication Between Transceiver and Line System Components Based on Amplitude Modulation FIG. 3 illustrates a plurality of subcarriers, SC1 to SC8 that may be output by the transmitter of a transceiver consistent with an aspect of the present disclosure. Each of subcarriers SC1 to SC8 may have a corresponding one of a plurality of frequencies f1 to f8. In addition, each of subcarriers SC1 to SC8 may be a Nyquist subcarrier. A Nyquist subcarrier is a group of optical signals, each carrying data, wherein (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the Nyquist frequency, as determined by the baud rate of such subcarrier.

As discussed in greater detail below, optical subcarriers SC1 to SC8 are generated by modulating light output from a laser. The frequency of such laser output light is f0 and is typically a center frequency such that half the subcarrier frequencies, e.g., f5 to f8, are above f0 and half the subcarrier frequencies, e.g., f1 to f4, are below f0.

As further shown in FIG. 3, the amplitudes of subcarriers SC1 to SC8 may be collectively amplitude modulated together to vary the amplitude of each subcarrier between a first amplitude A1 and a second lower amplitude A0. When subcarriers SC1 to SC8 each have amplitude A1, a '1' bit, for example, is transmitted. On the other hand, when subcarriers SC1 to SC8 each have amplitude A0, a '0' bit, for example, is transmitted. In this manner, amplitude modulation is employed to transmit control information from primary node transceiver 106, for example, to a line system component, as well as from the line system component to primary node transceiver 106. Communication from a line system component to a secondary node transceiver 108 may be carried out by amplitude modulating an upstream optical signal (including subcarriers) at a line system component in accordance with certain control information followed by transmitting a polarization modulated signal carrying such control information from primary node transceiver 106 to the secondary node transceiver 108.

Various mechanisms may be employed to amplitude modulate optical subcarriers SC1 to SC8. Several examples of such mechanisms will next be described. First, however, a description of the operation of transmitter module 955 provided in primary transceiver 106 will next be described with reference to FIGS. 4 and 5.

Figure 4A:
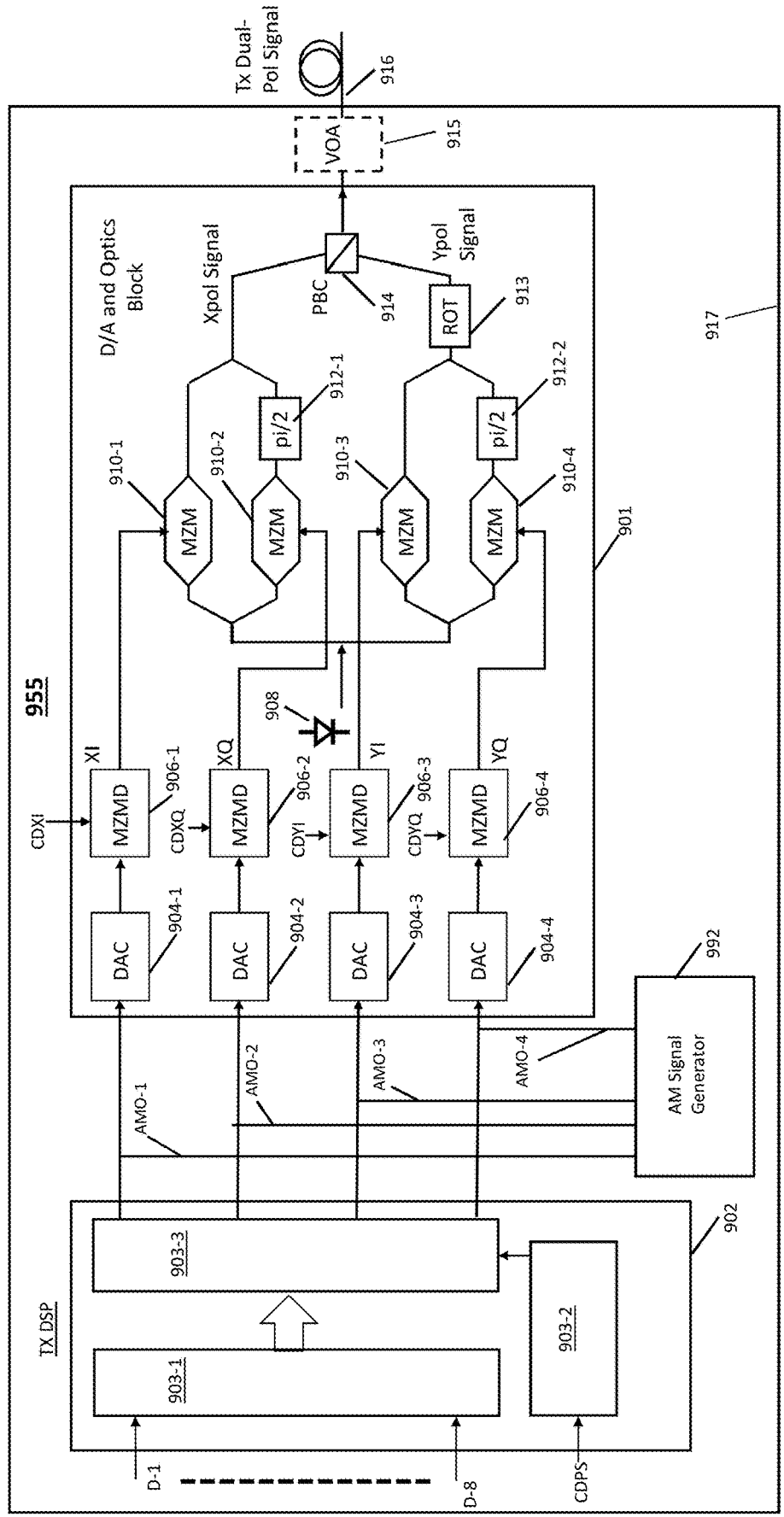
FIG. 4a is a diagram showing an example transmitter module of an optical communication system.

FIG. 4a is a diagram showing an example transmitter 955 that, for example, is included in primary transceiver 106. It is understood that transmitters in secondary transceivers 108 may have a similar configuration as that shown in FIG. 4a. Transmitter 955 includes a digital signal processor 902 including circuit blocks 903-1, 903-2, and 903-3. Circuit block 903-1 receives, in this example, first data including one or more of eight data streams D1 to D8, each carrying user data or information. Such data is processed, as discussed in greater detail with respect to FIG. 5, and the processed data is provided to circuit block 903-3. Second data, including, for example, control information, CDPS, destined for a downstream transceiver, such as transceivers 108 may be input to block 903-2, which processes such control information and supplies the control information to block 903-3. Circuit block 903-3 is discussed in greater detail below with respect to FIGS. 15 and 16.

As further shown in FIG. 4a, block 903-3 supplies digital signals to digital-to-analog conversion circuits 904-1 to 904-4 of D/A and Optics block 901.

Each of DACs 904 is operable to output second electrical signals based on the first electrical signals supplied by the Tx DSP 902. The D/A and optics block 901 also includes modulator driver circuitry 906 ("driver circuits 906") corresponding to each of Mach-Zehnder modulator driver (MZMD) 906-1, 906-2, 906-3, and 906-4. Each of driver circuits 906 is operable to output third electrical signals based on the second electrical signals output by each of the DAC 904.

The D/A and optics block 901 includes optical modulator circuitry 910 ("modulator 910") corresponding to each of MZM 910-1, 910-2, 910-3, and 910-4. Each of modulators 910 is operable to supply or output first and second modulated optical signals based on the third electrical signals. The first modulated optical signal includes multiple optical subcarriers 300 carrying user data and is modulated to include control data to be transmitted between nodes of system 100, and the second modulated optical signal is, for example, polarization modulated, such as polarization shift-keyed (PolSK), based on the second (control) data. Generation and detection of the second modulated optical signal is described in further detail below with respect to FIGS. 10-17.

Each of the modulators 910-1 to 910-4 of D/A and optics block 901 may be a Mach-Zehnder modulator (MZM) that modulates the phase and/or amplitude of the light output from laser 908. As further shown in FIG. 4a, a light beam output from laser 908 (also included in block 901) is split such that a first portion of the light is supplied to a first MZM pairing including MZMs 910-1 and 910-2 and a second portion of the light is supplied to a second MZM pairing including MZMs 910-3 and 910-4.

The first portion of the light is further split into third and fourth portions, such that the third portion is modulated by MZM 910-1 to provide an in-phase (I) component of an X (or TE) polarization component of a modulated optical signal, and the fourth portion is modulated by MZM 910-2 and fed to phase shifter 912-1 to shift the phase of such light by 90 degrees in order to provide a quadrature (Q) component of the X polarization component of the modulated optical signal.

Similarly, the second portion of the light is further split into fifth and sixth portions, such that the fifth portion is modulated by MZM 910-3 to provide an I component of a Y (or TM) polarization component of the modulated optical signal, and the sixth portion is modulated by MZM 910-4 and fed to phase shifter 912-2 to shift the phase of such light by 90 degrees to provide a Q component of the Y polarization component of the modulated optical signal.

The optical outputs of MZMs 910-1 and 910-2 are combined to provide an X polarized optical signal including I and Q components and fed to a polarization beam combiner (PBC) 914 provided in block 901. In addition, the outputs of MZMs 910-3 and 910-4 are combined to provide an optical signal that is fed to polarization rotator 913, further provided in block 901, that rotates the polarization of such optical signal to provide a modulated optical signal having a Y (or TM) polarization. The Y polarized modulated optical signal is also provided to PBC 914, which combines the X and Y polarized modulated optical signals to provide a polarization multiplexed ("dual-pol") modulated optical signal onto optical fiber 916. In some examples, optical fiber 916 may be included as a segment of optical fiber in an example optical communication path of system 100.

In some implementations, the polarization multiplexed optical signal output from D/A and optics block 901 includes subcarriers SC0-SC8 (of FIG. 3), for example, such that each data subcarrier 300 has X and Y polarization components and I and Q components. Moreover, each data subcarrier SC0 to SC8 may be associated with, or corresponds to, a respective one of the outputs of switches SW-0 to SW-8 associated with DSP 902.

Several examples of amplitude modulation of subcarriers SC1 to SC8 consistent with the present disclosure (see FIG. 3) will next be described. As shown in FIG. 4a, each of control signals CDXI, CDXQ, CSYI, and CDYQ may be supplied to respective one of Mach-Zehnder modulation driver circuits 906-1 to 906-4. These control signals are indicative of control data to be communicated with the line system components, and, based on these control signals, driver circuits 906 may further adjust the analog signals received from DACs 904 in accordance with such control data, such that modulators 910 are driven in such a manner as to collectively amplitude modulate subcarriers SC1 to SC8 to carry the control data.

In another example, a variable optical attenuator (VOA) 915 may be provided to receive an optical signal including subcarriers SC1 to SC8 output from polarization beam combiner 914. VOA 915 may operable to adjust or vary the attenuation of the subcarriers based on a control signal supplied thereto. By varying the attenuation experienced by optical subcarriers SC1 to SC8, the amplitude or intensity of such subcarriers may be adjusted or controlled, such that subcarriers SC1 to SC8 are amplitude modulated to carry control information based on the control signal supplied to VOA 915.

Transmitter 955 may be provided in module 917, which may also house a receiver portion of primary transceiver 106. Although VOA 915 is shown inside module 917, it is understood that VOA 915 may be provided outside module 917 to provide amplitude modulation of subcarriers SC1 to SC8 external to module 917.

In another example, amplitude modulation may be achieved by providing an amplitude modulation (AM) signal generator 992 which provides each of outputs AMO-1 to AMO-4 to a respective input of DACs 904-1 to 904-4. These signals are generated in such a way that DACs 904 output analog signals that include an amplitude modulation overlaying or superimposed on the data carrying DAC outputs. Based on such DAC outputs, Mach-Zehnder modulator driver circuits (MZMDs) 906, in turn, output drive signal to MZMs 910, as noted above. Accordingly, the combined MZM outputs supply optical subcarriers superimposed with an amplitude modulation based on the outputs of signal generator 992 (see also FIG. 3). Both X and Y polarization components, for example, of each optical subcarrier are subject to such amplitude modulation.

Figure 4B:
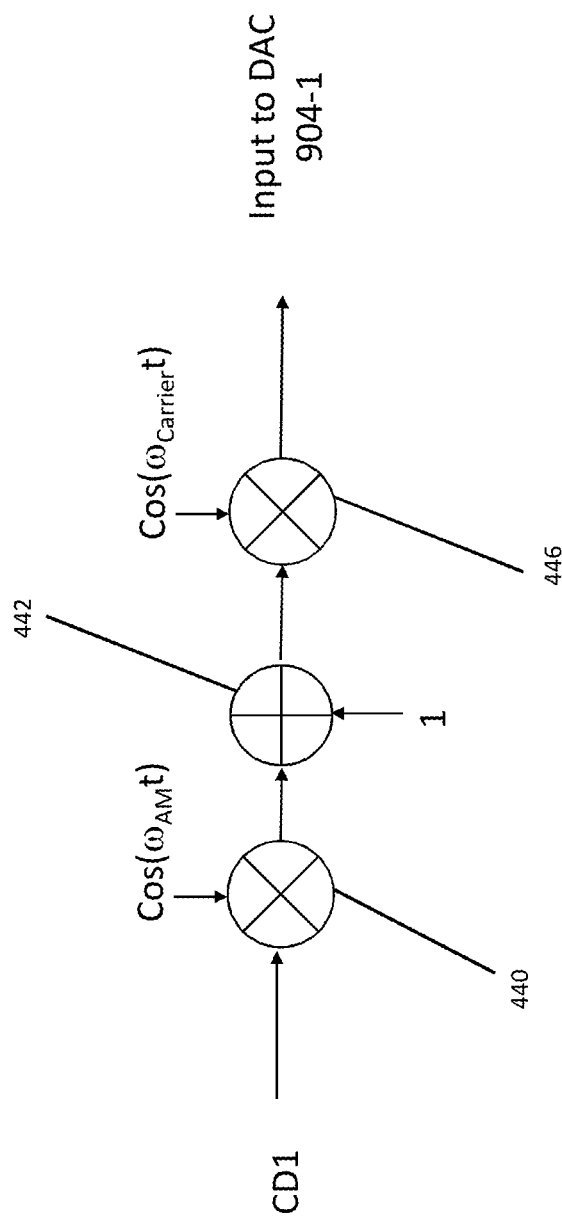
FIG. 4b is a diagram showing an example of an amplitude modulation (AM) signal generator circuit consistent with the present disclosure.

AM signal generator portion 992-1 provides an input to DAC 904-1 and is shown in detail in FIG. 4b. In this example, AM signal generator portion 992-1 receives control data CD1, which may be multiplied, with multiplier 440, by a cosine function, $\cos(\omega_{AM}t)$, where $\omega_{AM}$ is indicative of a frequency of the amplitude modulation and t is time. The resulting product is output from multiplier 440 and provided to adder circuit 442, which adds the number to the product output from multiplier 440 to insure that a positive number is obtained. The output or sum of adder 442 is next provided to multiplier circuit 446, which multiplies such sum by another cosine function, $\cos(\omega_{Carrier}t)$, where $\omega_{Carrier}$ is a carrier frequency and t is time. In one example, $\omega_{Carrier}$ is equal to zero. In other examples, $\omega_{Carrier}$ is on the order of multiple GHz. The resulting product (AMO-1) is added or combined with a corresponding output of DSP 902 and input to DAC 904-1.

It is understood that circuitry similar to that shown in FIG. 4b is also included in AM signal generator 992 to provide similar signals (AMO-2 to AMO-3) to the inputs of remaining DACs 904-2 to 904-4. As noted above, based on such inputs, MZMs 910 (collectively, the MZMs are also considered a modulator), output optical subcarriers that are collectively amplitude modulated, as shown in FIG. 3, to carry control information. The example shown in FIG. 4b may be implemented as an alternative to the other amplitude modulation examples described in connection with FIG. 4a, as well as described below in connection with FIG. 6.

Figure 5:
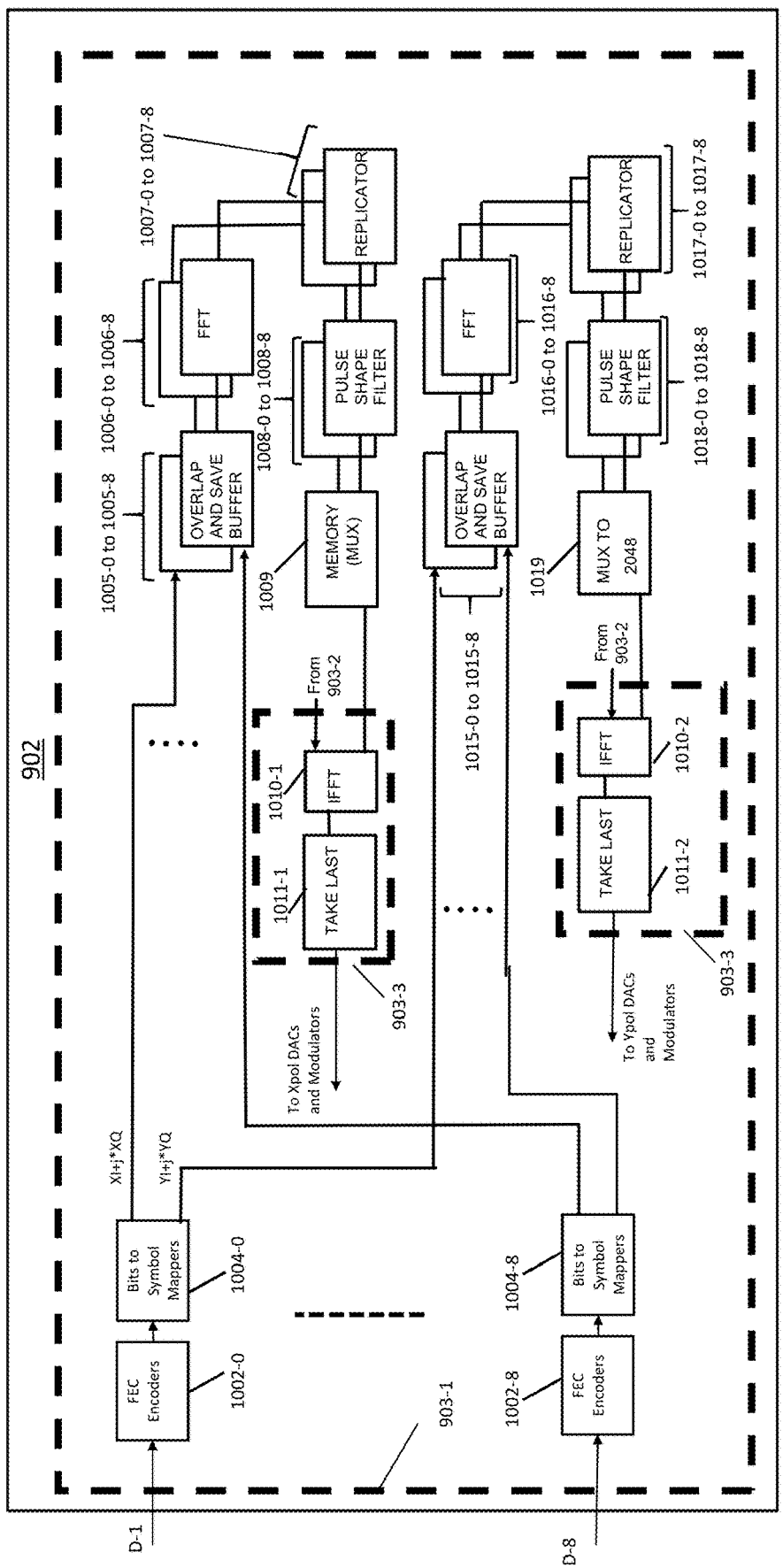
FIG. 5 is a diagram showing an example transmitter component of an optical communication system.

FIG. 5 shows blocks 903-1 and 903-3 in greater detail. Block 903-2 is described below with reference to FIG. 13. As further noted above, block 903-1 receives user data streams or inputs D1 to D8. A shown in FIG. 5, each such data stream is supplied to a respective one of forward error correction (FEC) encoders 1002-0 to 1002-8. FEC encoders 1002-0 to 1002-8 carry out forward error correction coding on a corresponding one of the switch outputs, such as, by adding parity bits to the received data. FEC encoders 1002-0 to 1002-8 may also provide timing skew between the subcarriers to correct for skew introduced during transmission over one or more optical fibers. In addition, FEC encoders 1002-0 to 1002-8 may interleave the received data.

Each of FEC encoders 1002-0 to 1002-8 provides an output to a corresponding one of multiple bits to symbol circuits, 1004-0 to 1004-8 (collectively referred to herein as "1004"). Each of bits to symbol circuits 1004 may map the encoded bits to symbols on a complex plane. For example, bits to symbol circuits 1004 may map four bits to a symbol in a dual-polarization Quadrature Phase Shift Keying (QPSK) or and m-quadrature amplitude modulation (m-QAM, m being a positive integer) constellation, such as 8-QAM, 16-QAM, and 64-QAM. Each of bits to symbol circuits 1004 provides first symbols, having the complex representation XI+j*XQ, associated with a respective one of the data input, such as D0, to DSP portion 1003. Data indicative of such first symbols may carried by the X polarization component of each subcarrier SC0-SC8.

Each of bits to symbol circuits 1004 may further provide second symbols having the complex representation YI+j*YQ, also associated with a corresponding one of data inputs D0 to D8. Data indicative of such second symbols, however, is carried by the Y polarization component of each of subcarriers SC-0 to SC-8.

As further shown in FIG. 5, each of the first symbols output from each of bits to symbol circuits 1004 is supplied to a respective one of first overlap and save buffers 1005-0 to 1005-8 (collectively referred to herein as overlap and save buffers 1005) that may buffer 256 symbols, for example. Each of overlap and save buffers 1005 may receive 128 of the first symbols or another number of such symbols at a time from a corresponding one of bits to symbol circuits 1004. Thus, overlap and save buffers 1005 may combine 128 new symbols from bits to symbol circuits 1004, with the previous 128 symbols received from bits-to-symbol circuits 1004.

Each overlap and save buffer 1005 supplies an output, which is in the time domain, to a corresponding one of fast Fourier Transform (FFT) circuits 1006-0 to 1006-8 (collectively referred to as "FFTs 1006"). In one example, the output includes 256 symbols or another number of symbols. Each of FFTs 1006 converts the received symbols to the frequency domain using or based on, for example, a fast Fourier transform. Each of FFTs 1006 may include 256 memories or registers, also referred to as frequency bins or points, that store frequency components associated with the input symbols. Each of replicator components 1007-0 to 1007-8 may replicate the 256 frequency components associated with of FFTs 1006 and store such components in 512 or another number of frequency bins (e.g., for T/2 based filtering of the subcarrier) in a respective one of the plurality of replicator components. Such replication may increase the sample rate. In addition, replicator components or circuits 1007-0 to 1007-8 may arrange or align the contents of the frequency bins to fall within the bandwidths associated with pulse shaped filter circuits 1008-0 to 1008-8 described below.

Each of pulse shape filter circuits 1008-0 to 1008-8 may apply a pulse shaping filter to the data stored in the 512 frequency bins of a respective one of the plurality of replicator components 1007-0 to 1007-8 to thereby provide a respective one of multiple filtered outputs, which are multiplexed and subject to an inverse FFT, as described below. Pulse shape filter circuits 1008-1 to 1008-8 calculate the transitions between the symbols and the desired subcarrier spectrum so that the subcarriers can be spectrally packed together for transmission, e.g., with a close frequency separation. Pulse shape filter circuits 1008-0 to 1008-8 may also be used to introduce timing skew between the subcarriers to correct for timing skew induced by links between nodes shown in FIG. 1, for example. Memory component 1009, which may include a multiplexer circuit or memory, may receive the filtered outputs from pulse shape filter circuits 1008-0 to 1008-8, and multiplex or combine such outputs together to form an element vector.

The output of memory 1009 is fed to block 903-3, which includes, in this example, IFFT circuit or component 1010-1. IFFT circuit 1010-1 may receive the element vector and provide a corresponding time domain signal or data based on an inverse fast Fourier transform (IFFT). In one example, the time domain signal may have a rate of 64 G Sample/s. Take last buffer or memory circuit 1011-1 may select the last 1024 or another number of samples from an output of IFFT component or circuit 1010-1 and supply the samples to DACs 904-1 and 904-2 at 64 G Sample/s, for example. As noted above, DAC 904-1 is associated with the in-phase (I) component of the X pol signal and DAC 904-2 is associated with the quadrature (Q) component of the Y pol signal. Accordingly, consistent with the complex representation XI+jXQ, DAC 904-1 receives values associated with XI and DAC 904-2 receives values associated with jXQ. Based on these inputs, DACs 904-1 and 904-2 provide analog outputs to MZMD 906-1 and MZMD 906-2, respectively, as discussed above.

As further shown in FIG. 5, each of bits to symbol circuits 1004-0 to 1004-8 outputs a corresponding one of symbols indicative of data carried by the Y polarization component of the polarization multiplexed modulated optical signal output on optical communication path or fiber 916. As further noted above, these symbols may have the complex representation YI+j*YQ. Each such symbol may be processed by a respective one of overlap and save buffers 1015-0 to 1015-8, a respective one of FFT circuits 1016-0 to 1016-8, a respective one of replicator components or circuits 1017-0 to 1017-8, pulse shape filter circuits 1018-0 to 1018-8, multiplexer or memory 1019 of block 903-1. Moreover, the output of multiplexer or memory 1019 may be fed to block 903-3, which further includes IFFT 1010-2, and take last buffer or memory circuit 1011-2, to provide processed symbols having the representation YI+j*YQ in a manner similar to or the same as that discussed above in generating processed symbols XI+j*XQ output from take last circuit 1011-1. In addition, symbol components YI and YQ are provided to DACs 904-3 and 904-4, respectively. Based on these inputs, DACs 904-3 and 904-4 provide analog outputs to MZMD 906-3 and MZMD 906-4, respectively, as discussed above.

Block 903-3 also receives outputs from block 903-2 as noted above and discussed in greater detail below with respect to FIG. 13.

While FIG. 5 shows Tx DSP 902 as including a particular quantity and arrangement of functional components, in some implementations, DSP 902 may include additional functional components, fewer functional components, different functional components, or differently arranged functional components. In addition, typically the number of overlap and save buffers, FFTs, replicator circuits, and pulse shape filters associated with the X component may be equal to the number of data inputs, and the number of such circuits associated with the Y component may also be equal to the number of switch outputs. However, in other examples, the number of data inputs may be different than the number of these circuits. As noted above, based on the outputs of MZMDs 906-1 to 906-4, multiple optical subcarriers SC0 to SC8 may be output onto optical fiber 916.

Figure 8:
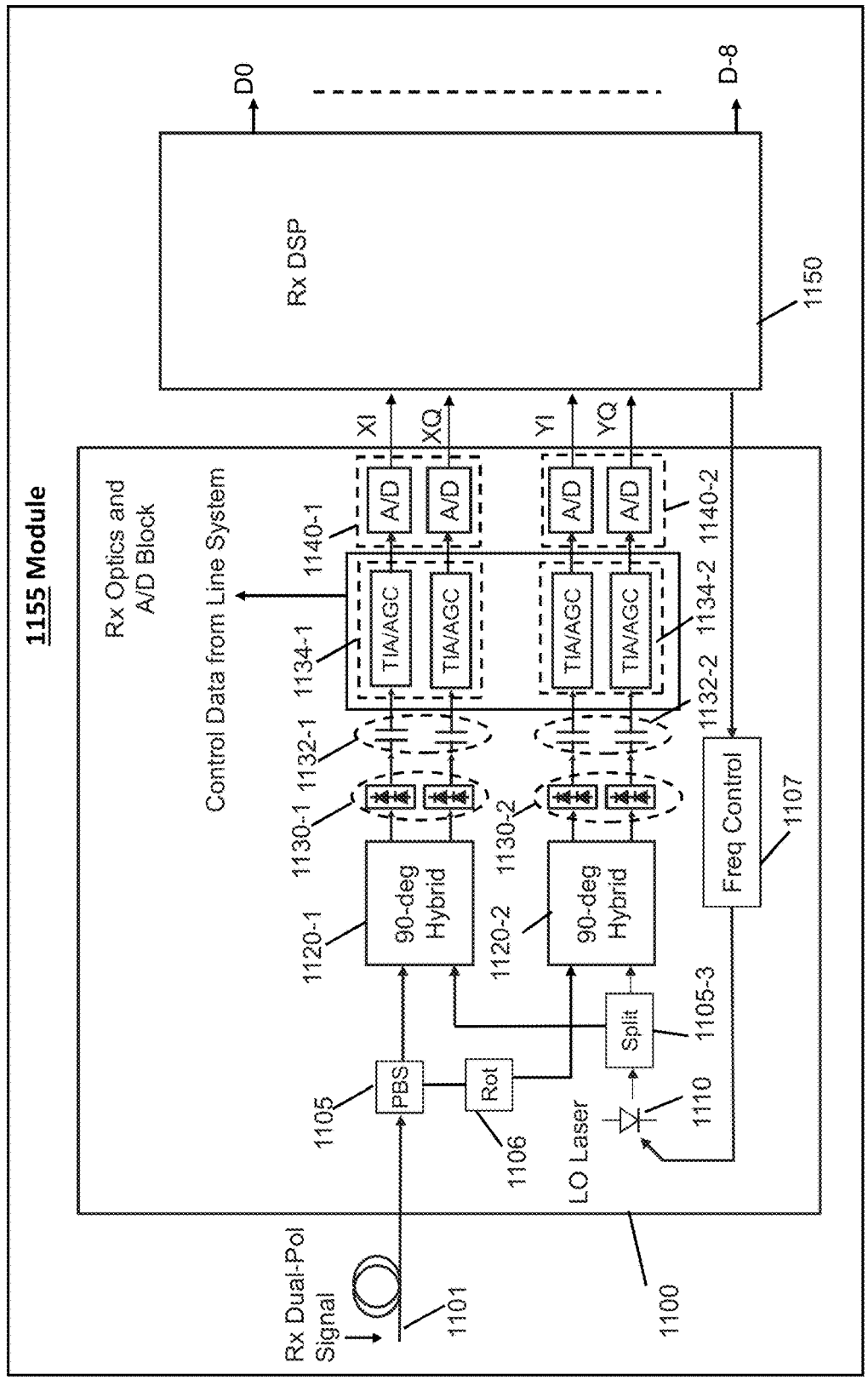
FIG. 8 and FIG. 9a are each diagrams showing example components of a receiver module of an optical communication system.

A further example of circuitry that may be employed to amplitude modulation subcarriers SC1 to SC8 to carry control information will next be described with reference to FIG. 6. Here, a plurality of multiplier circuits 1020-1 to 1020-8, which may be complex multiplier circuits, are provided within DSP 902, to receive a respective one of outputs O1 to O8 from a corresponding one of pulse shape filters 1018-1 to 1018-8. Each of multiplier circuits 1020-1 to 1020-8 receives a corresponding one of gain parameters G1 to G8, such that, in this example, each of outputs O1 to O8 is multiplied by a corresponding one of gain parameters G1 to G8. Each output O1 to O8 is associated with a respective one of subcarriers SC1 to SC8. Moreover, each is associated with a gain or amplitude of a respective one of the subcarriers. That is, the amplitude of each of optical subcarriers SC1 to SC8 output from optical modulators 910 may be based on the gain parameters G1 to G8. Thus, by varying gain parameters G1 to G8, the amplitude of optical subcarriers SC1 to SC8 may also be varied or modulated. Gain parameters G1 to G8, may therefore be adjusted or controlled to amplitude modulate subcarriers SC1 to SC8, as shown in FIG. 8, to carry control information to the line system components.

In some implementations, the gain of each multiplier 1020 is software programmable (or may be implemented in firmware) along with a frequency shaping function in a filter 1018 preceding the multiplexing performed by multiplexer or memory 1019.

Figure 6:
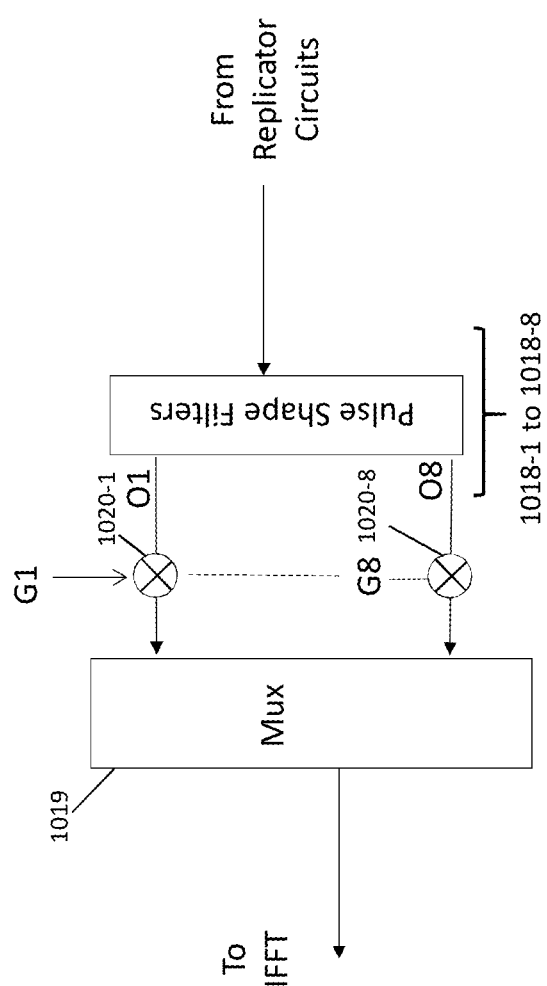
FIG. 6 is a diagram showing example devices for adjusting the gain of a signal generating using an example transmitter component.

Preferably, in the example shown in FIG. 6, the gain parameter changes or variations are synchronized to occur at the same time or substantially the same time so that the amplitudes of subcarriers SC1 to SC8 vary at the same time or substantially the same time. Moreover, the above-described multiplier circuits 1020 may be included in DSP 902 to provide amplitude modulation of the Y polarization component of each of subcarriers SC1 to SC8. It is understood that similar multiplier circuits may be provided between pulse shape filters 1008 and memory 1009 to provide corresponding amplitude modulation of the X polarization component of each subcarrier SC1 to SC8.

Reception and transmission of control information at a line system component, such as optical gateway (OGW) 103-1 will next be described with reference to FIG. 7. As noted above, the techniques described herein are used to provide communications between a hub or primary node 102 using amplitude modulation (AM) of subcarriers SC1 to SC8.

Figure 7:
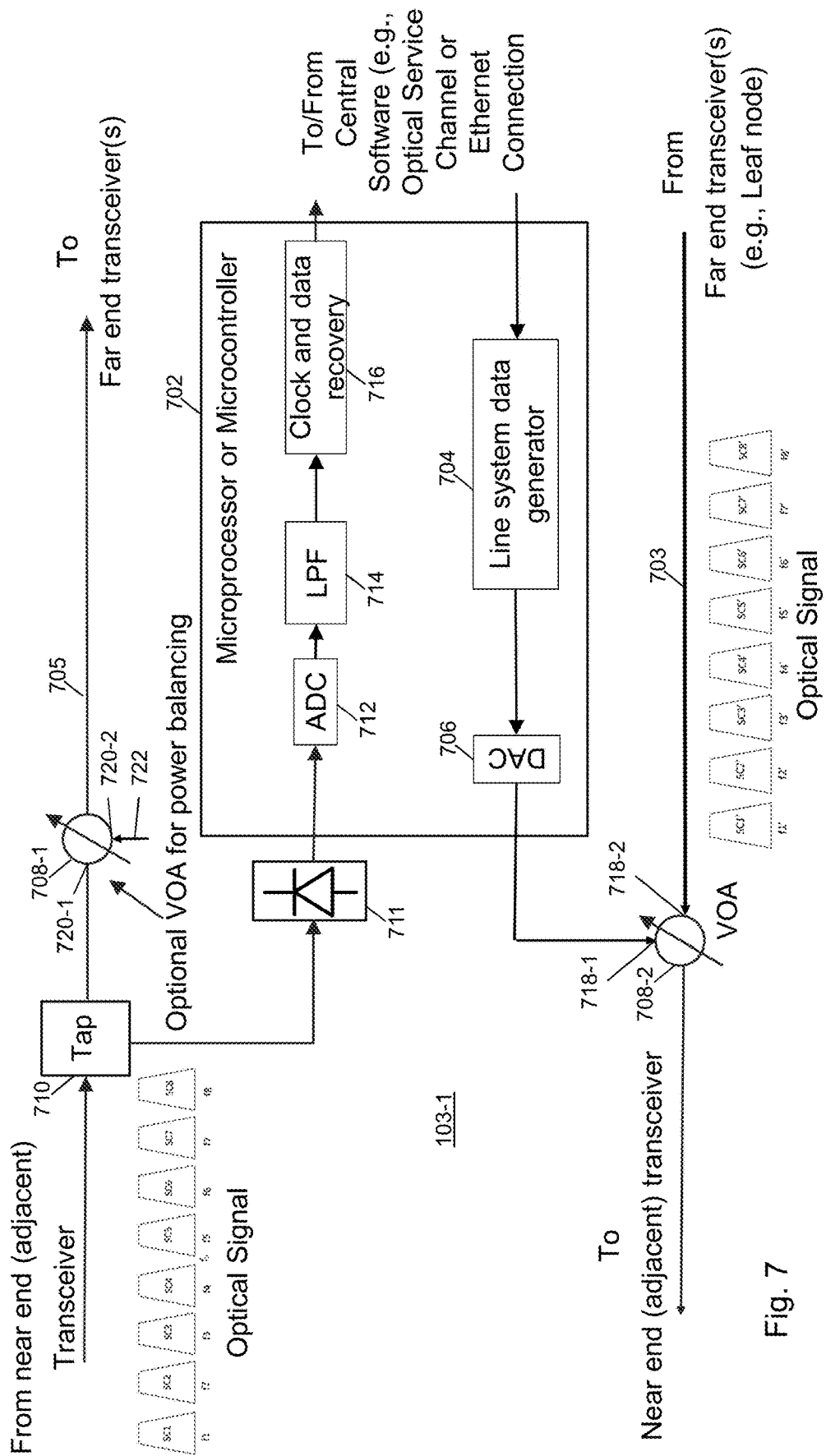
FIG. 7 is a diagram showing example devices of an example line system component in an optical communication system.

As shown in FIG. 7, OGW 103-1 generally includes a microprocessor or DSP 702, a line system data generator 704, a digital-to-analog conversion circuit 706 ("DAC 706"), and one or more variable optical attenuators (VOAs) 708-1, 708-2. In some implementations, one or more of the devices associated with OGW 103-1 can be placed at various locations along an optical communication path between an example primary or hub node 102 and an example secondary or edge/leaf node 104 of system 100. For example, one or more of the devices associated with OGW 103-1 can be placed adjacent to a splitter/combiner or in between two distinct splitters that are each intermediate a primary node 102 and a secondary node 104. OGW 103-1 may also be provided adjacent an optical amplifier.

Transmission of control information from OGW 103-1 to either transceiver 106 or one of transceivers 108 will next be described. Control information is provided based on the status of the line system component or other information associated with the line system component. Such information may include operations, administration, maintenance, and provisioning (OAM&P) information, such as, if line system component is adjacent an optical amplifier, the gain of the amplifier or which optical signals (by wavelength) are input to the amplifier. Alternatively, the control information may include an indication of which optical signals and subcarriers are input to/output from which ports of a WSS. Such information may be supplied to circuitry in microprocessor or microcontroller 702 referred to as a line system data generator 704, which control data that is to be transmitted to a near end transceiver, for example. The line system generator may provide the control data based on measured parameters associated with optical communication path or fiber links 705 and/or 703, for example. Alternatively, control information may be supplied to line system generator 704 by central software 111. In a further example, control information may be supplied directly from the central software to DAC 706. In any event, OGW 103-1 typically transmits control information to the transceiver closest to it, namely primary transceiver 106. OGW 103-2, having a similar construction as OGW 103-1, transmits control information to one or more of transceivers 108, which are closest to OGW 103-2.

Line system data generator 704 may supply the control information as a digital or binary electrical signal to a digital-to-analog conversion circuit 706, which converts the received signal to an analog signal indicative of the control information to be transmitted. The analog signal is then provided to variable optical attenuator (VOA) 708-2, for example via an optical input port 718-1 (e.g., an interface for receiving optical signals). VOA 706-2 may also receive an optical signal including a plurality of subcarriers SC1' to SC8', each having a corresponding one of frequencies f1' to f8', for example via an optical input port 718-2. In this example, subcarriers SC1' to SC8' are transmitted from one or more of secondary transceivers 108 on optical fiber or optical communication path 703. Based on the analog signal received via the input port 718-1, VOA 706-2 collectively adjusts the attenuation, and thus the amplitude or intensity, of subcarriers SC1' to SC8' based on the control information. As a result, subcarriers SC1' to SC8' are amplitude modulated to carry such control information to a receiver in either primary transceiver 106 or a receiver in one or more of secondary transceivers 108.

Detection of an optical signal including amplitude modulated subcarriers transmitted on optical communication path 705 from a near end transceiver, such as subcarriers SC1 to SC8 transmitted from primary node transceiver 106, will next be described. The optical signal is input to optical tap 710, which may provide an optical power split portion of the optical signal, e.g., 1% to 10%, to a photodiode circuit 711. A remaining portion of the optical signal continues to propagate along optical communication path 705. VOA 708-1 may optionally be provided for power balancing. For example, the VOA 708-1 can receive the signal output by the optical tap 710 via an optical input port 720-1, and attenuate the signal according to an analog signal 722 received via the optical input port 720-2 (e.g., control information received from on more sources).

As further shown in FIG. 7, the tapped portion of the optical signal is converted by photodiode circuit 711 to a corresponding analog electrical signal, e.g., a voltage or a current. The analog signal is fed to an analog-to-digital conversion circuit 712, which supplies digital signals based on the received analog signal. Such digital signals are optionally provided to a bandpass pass filter 714 and then output to conventional clock and data recovery circuitry 716, which outputs the control information to central software 111, for example by way of an optical signal, such as an optical service channel (OSC), or by way of an electrical signal, such as an ethernet signal.

A parameter associated with line system component may be adjusted or controlled based on the received control information. For example, if the line system component includes an optical amplifier, such as an erbium doped fiber amplifier, the control information may include instructions or other data for adjusting a gain of the optical amplifier. Alternatively, or in addition, the control information may include information for adjusting an attenuation of VOA 708-1.

Detection of amplitude modulated subcarriers output from OGW 103-1 will next be described with reference to FIG. 8 and FIG. 9a, which show an optical receiver that may be provided in primary transceiver 106 or one or more of secondary transceivers 108. It is understood that the structure and operation of OGW 103-2 is similar to that of OGW 103-1. Module 1155 is included as a receiver in transceiver 106, for example. It is understood that the transmitter and receiver provided in secondary transceivers 108 may have a similar structure and operate in a similar manner as the transmitter and receiver provided in primary transceiver 106. That is, such transmitters in both the primary and second transceivers may have structure similar to or the same as transmitter 955 and receiver module 1155, respectively.

Referring now to FIG. 8, as shown, optical receiver 1100 of the receiver module 1155 may include receiver (Rx) optics and A/D block 1100, which, in conjunction with Rx DSP 1150, may carry out coherent detection. Block 1100 may include a polarization splitter 1105 with first and second outputs, a local oscillator (LO) laser 1110, 90 degree optical hybrids or mixers 1120-1 and 1120-2 (referred to generally as hybrid mixers 1120 and individually as hybrid mixer 1120), detectors 1130-1 and 1130-2 (referred to generally as detectors 1130 and individually as detector 1130, each including either a single photodiode or balanced photodiode), and AC coupling capacitors 1132-1 and 1132-2.

In one example, one laser may be provided that is "shared" between the transmitter and receiver portions in transceivers 106 and/or transceivers 108. For example, a splitter 999 can provide a first portion of light output from laser 908 to the MZMs 910 in the transmitter portion of the transceiver. Further, the splitter 999 can provide a second portion of such light acting as a local oscillator signal fed to 90 degree optical hybrids 1120 in the receiver portion of the transceiver, as shown in FIG. 9c. In this example, laser 1110 may be omitted.

The block 1100 also includes trans-impedance amplifiers/automatic gain control circuits 1134 ("TIA/AGC 1134") corresponding to TIA/AGC 1134-1 and 1134-2, analog-to-digital conversion circuitry 1140 ("ADC 1140") corresponding to ADCs 1140-1 and 1140-2, and an Rx DSP 1150. ADCs 1140-1 and 1140-2 may be referred to generally as ADCs 1140 and individually as ADC 1140.

Polarization beam splitter (PBS) 1105 may include a polarization splitter that receives an input polarization multiplexed optical signal including optical subcarriers SC0 to SC8 supplied by optical fiber link 1101, which may be, for example, an optical fiber segment as part of one of optical communication paths of system 100. PBS 1105 may split the incoming optical signal into the two X and Y orthogonal polarization components. The Y component may be supplied to a polarization rotator 1106 that rotates the polarization of the Y component to have the X polarization. Hybrid mixers 1120 may combine the X and rotated Y polarization components with light from local oscillator laser 1110. For example, hybrid mixer 1120-1 may combine a first polarization signal (e.g., the component of the incoming optical signal having a first or X (TE) polarization output from a first port of PBS 1105) with light from local oscillator laser 1110, and hybrid mixer 1120-2 may combine the rotated polarization signal (e.g., the component of the incoming optical signal having a second or Y (TM) polarization output from a second port of PBS 1105) with the light from local oscillator laser 1110.

Detectors 1130 may detect mixing products output from the optical hybrids, to form corresponding voltage signals, which are subject to AC coupling by capacitors 1132-1 and 1132-2, as well as amplification and gain control by TIA/AGCs 1134-1 and 1134-2. In some implementations, the TIA/AGCs 1134 are used to smooth out or correct variations in the electrical signals output from detector 1130 and AC coupling capacitors 1132. Accordingly, in one example, since the amplitude modulation of the received subcarriers may manifest itself as such variations, the control information associated with such amplitude modulation may be derived based on the magnitude or the amount of correction of such electrical signals. Accordingly, as shown in FIG. 8, line system control data may be output from the TIA/AGC circuits.

As further shown in FIG. 8, the outputs of TIA/AGCs 1134-1 and 1134-2 are supplied to ADCs 1140, which convert the outputs of the TIA/AGCs, which are analog voltage signals, for example, to digital samples or digital signals. Namely, two detectors or photodiodes 1130-1 may detect the X polarization signals to form the corresponding voltage signals, and a corresponding two ADCs 1140-1 may convert the voltage signals to digital samples associated with the first polarization signals after amplification, gain control and AC coupling. Similarly, two detectors 1130-2 may detect the rotated Y polarization signals to form corresponding voltage signals, and a corresponding two ADCs 1140-2 may convert such voltage signals to digital samples associated with the second polarization signals (Y polarization) after amplification, gain control and AC coupling. Rx DSP 1150 may process the digital samples associated with the X and Y polarization components to output data D0 to D8 associated with subcarriers SC1 to SC8.

While FIG. 8 shows optical receiver 1100 as including a particular quantity and arrangement of components, in some implementations, optical receiver 1100 may include additional components, fewer components, different components, or differently arranged components. The quantity of detectors 1130 and/or ADCs 1140 may be selected to implement an optical receiver 1100 that is capable of receiving a polarization-multiplexed signal. In some instances, one of the components illustrated in FIG. 8 may carry out a function described herein as being carry outed by another one of the components illustrated in FIG. 8.

Consistent with the present disclosure, in order to demodulate subcarriers SC0 to SC8, local oscillator laser 1110 may be tuned to output light having a wavelength or frequency relatively close to one or more of the subcarrier wavelengths or frequencies to thereby cause a beating between the local oscillator light and the subcarriers.

In one of the example, the local oscillator laser may be a semiconductor laser, which may be tuned thermally or through current adjustment. If thermally tuned, the temperature of the local oscillator laser 1110 is controlled with a thin film heater, for example, provided adjacent the local oscillator laser. Alternatively, the current supplied to the laser may be controlled, if the local oscillator laser is current tuned. The local oscillator laser 1110 may be a semiconductor laser, such as a distributed feedback laser or a distributed Bragg reflector laser.

Figure 9A:
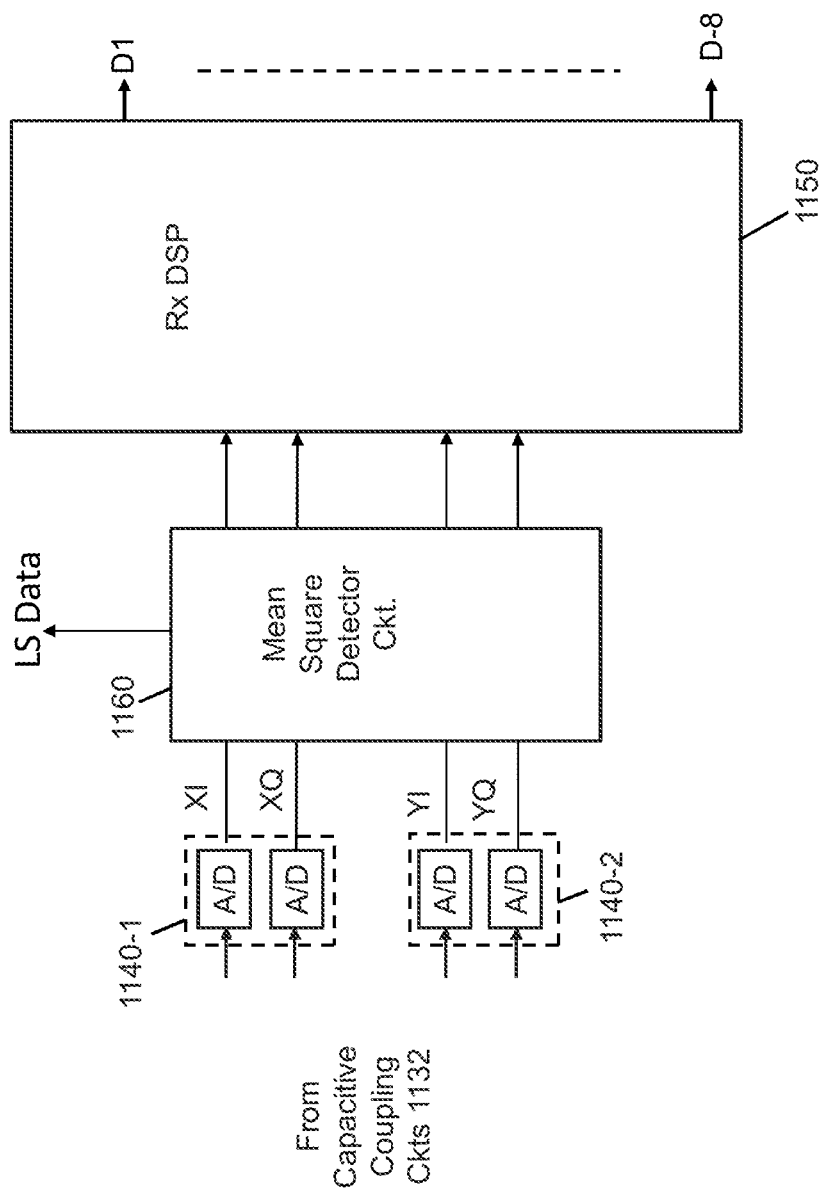

Alternatively, control information carried by the above the above-described amplitude modulation may also be detected with a mean square detector ("MSD") circuit 1160 discussed in greater detail with respect to FIG. 9*a*. For example, the MSD 1160 is coupled to the analog-to-digital conversion circuitry (ADCs 1140) and is operable to receive digital samples received from ADCs 1140 and output such digital samples to RX DSP 1150. MSD circuit 1160 is configured to measure the average power of the received signal. In one example, the average power is calculated by summing the squares of the in-phase and quadrature components of both the X and Y polarizations (average power=$I_X^2+Q_X^2+I_Y^2+Q_Y^2$). In a further example, Ix, Qx, are the outputs of ADCs 1140-1 and Iy, Qy are the outputs of ADCs 1140-2. A low pass filter may be provided if high AM frequencies are employed.

By calculating the average power, as noted above, changes in such average power may also be determined and interpreted as the above-described amplitude modulation. Convention processing of such amplitude modulation, optionally within the MDS circuit 1160, may be employed to provide the control data associated with such amplitude modulation ("LD Data" in FIG. 9*a*).

Figure 9B:
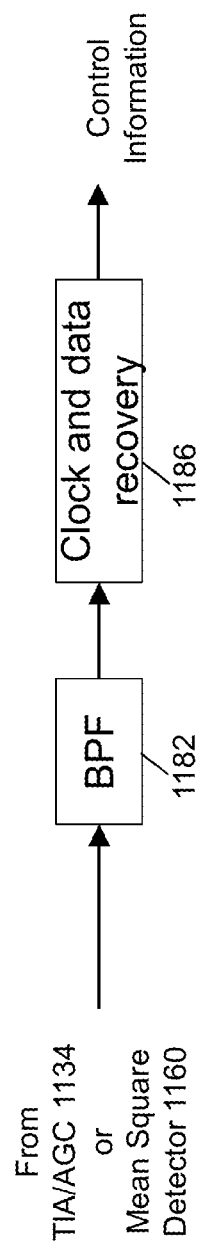
FIG. 9b shows an example of circuitry that may be provided in a receiver to output control information.
Figure 9C:
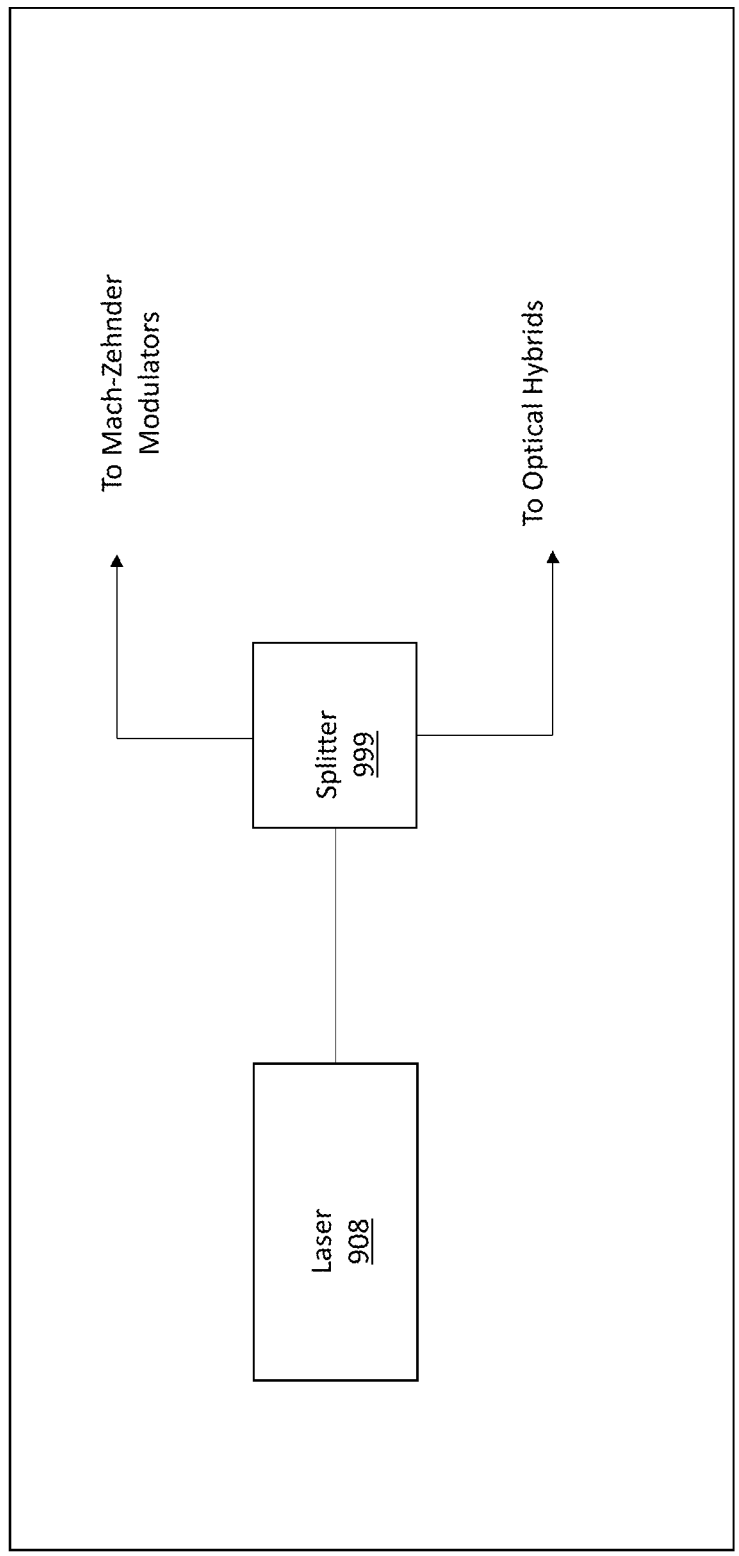
FIG. 9c shows an example of a shared laser consistent with an aspect of the present disclosure.

As shown in FIG. 9*b*, in order to supply control information based on the outputs from either TIA/AGC circuits 1134 or mean square detector 1160, the outputs from either circuit are provided to bandpass filter (BPF) 1182, for example, which passes frequency components corresponding to the amplitude modulation frequency associated with control information. The filtered output from BPF 1182 is next supplied to clock and data recovery circuit 1186, which extracts the control information from the filtered output in a known manner.

As noted above, both X and Y polarization components of each optical subcarrier are amplitude modulated. The circuitry shown in FIG. 9*b* is associated with the X polarization component. It is understood that similar circuitry is provided to extract control information from the Y polarization component, for example, to improve accuracy of the detected control information.

Returning to FIG. 9*a*, Rx DSP 1150 processes the digital samples supplied thereto to provide user data streams D1 to D8, which were input to the Tx DSP 902, as noted above in connection with FIGS. 4 and 5. Rx DSP 1150 is discussed in greater detail below with respect to FIGS. 14 and 15.

III. First Data Path Implementation Example—Communication Between Primary and Secondary Transceivers Based on Polarization Modulation As noted above, consistent with the present disclosure, control information is communicated between the transceivers in the primary (102)/secondary nodes (104) and line system components by way of amplitude modulation of the subcarriers. Communication between the primary node transceiver 106 and the secondary transceiver 108 will next be described.

Figure 10:
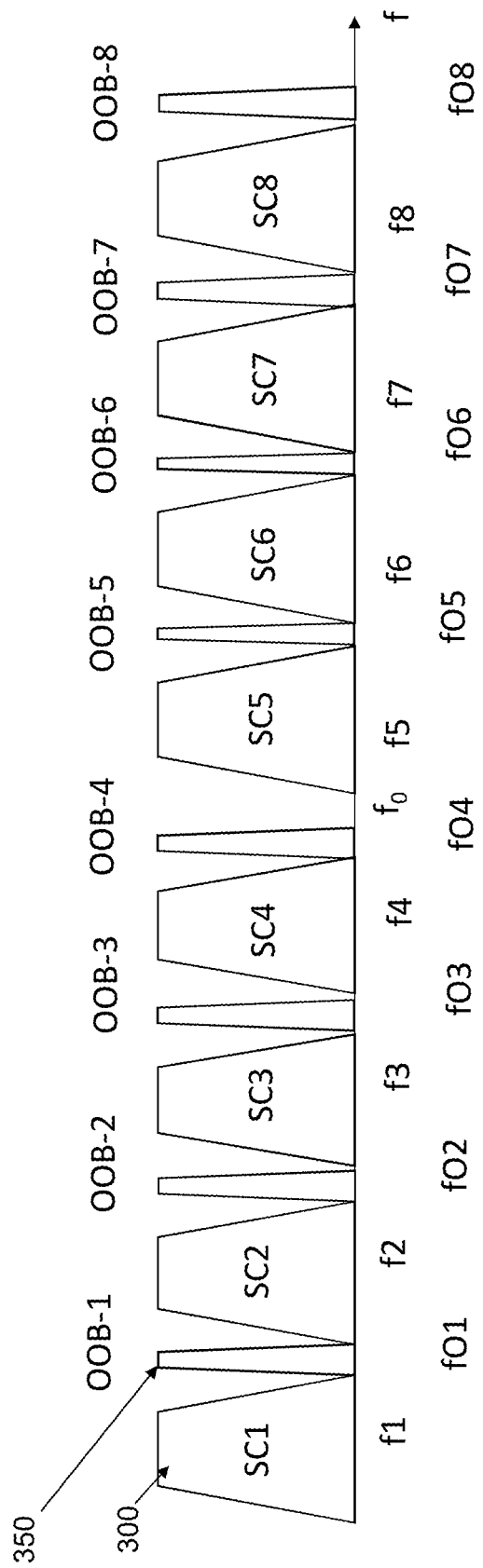
FIG. 10 depicts an example of sub-carriers and multiple out-of-band communication signals generated using an optical communication system.

FIG. 10 depicts an example of multiple subcarriers 300 (first optical signals, SC1 to SC8) and multiple communication signals 350 (second optical signals OOB-1 to OOB-8). Each of subcarriers SC1 to SC8, as noted above, are modulated to carry user data. Such modulation may be selected from the group including BPSK, QPSK, and m-amplitude quadrature modulation (m-QAM), where m is a positive integer. Each of optical signals OOB-1 to OOB-8 may carry transceiver-to-transceiver control information and may be polarization modulated. Such polarization modulation may include polarization shift-keying (PolSK). Preferably, each of optical signals OOB-1 to OOB-8 has a respective one of frequencies fO1 to fO8 that is spectrally adjacent a corresponding one of subcarrier frequencies f1 to f8, such that at least some of frequencies fO1 to fO8 are between an adjacent pair of subcarrier frequencies, e.g., frequency fO1 is between frequencies f1 and f2, and frequency fO5 is between frequencies f5 and f6. Frequency fO8, however, is adjacent frequency f8, but is not between two adjacent subcarrier frequencies in the example shown in FIG. 10.

As discussed in greater detail below, both subcarriers SC1 to SC8 and optical signals OOB1 to OOB8 may be generated in accordance with modulator drive signal based electrical signals output from DSP 902, for example. Thus, first control information associated with the above described amplitude modulation may be transmitted in parallel or concurrently with second control information carried by optical signals OOB-1 to OOB-8, as well as user data carried by subcarriers SC1 to SC8. Moreover, one laser and modulator combination may be used to generate both the subcarriers and optical signals OOB1 to OOB8. Additional lasers are not required to generate a control channel.

Figure 11:
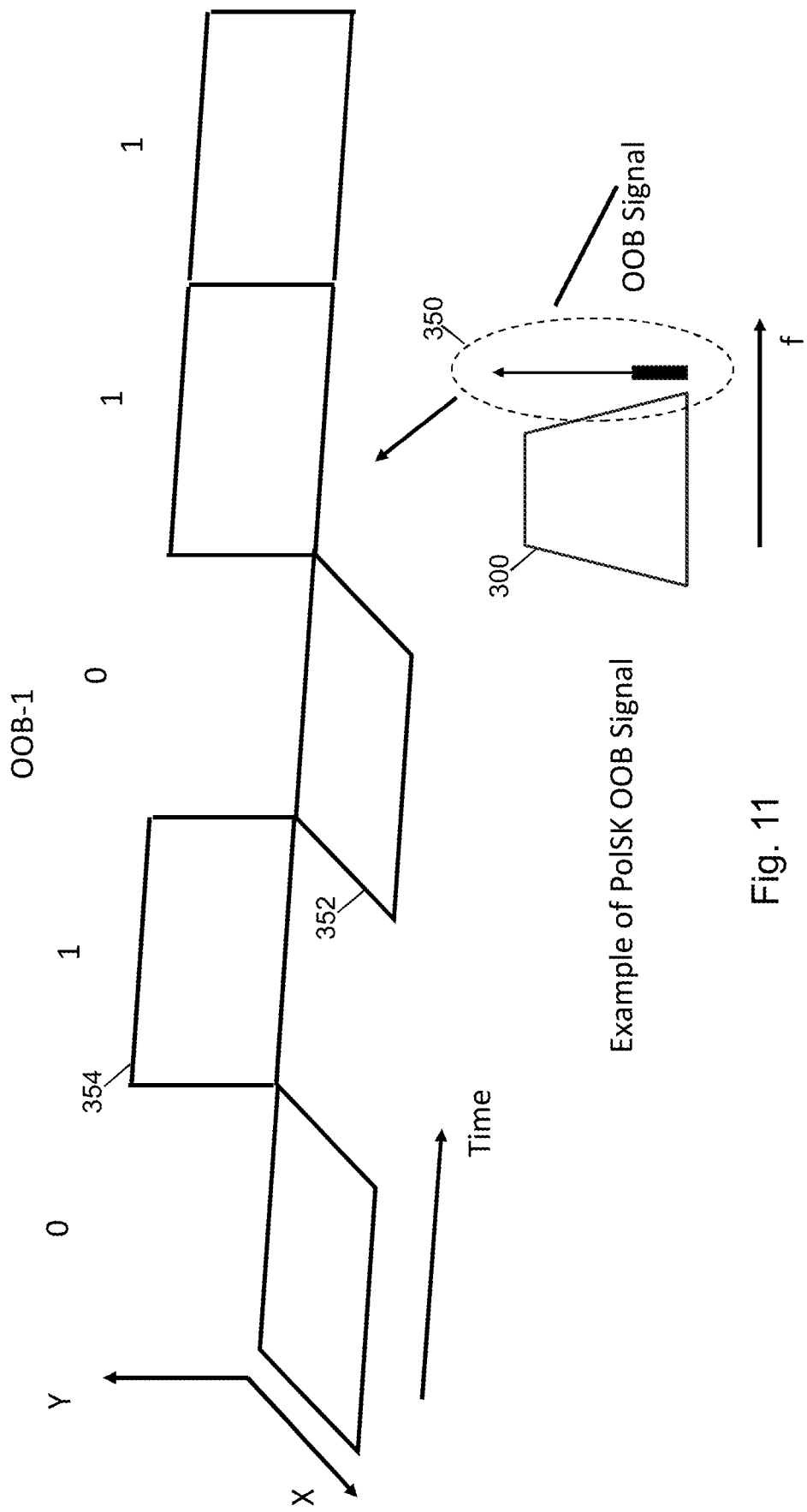
FIG. 11 depicts an example of the X polarization and the Y polarization of an example polarization shift keying (PolSK) out-of-band communication signal.
Figure 12:
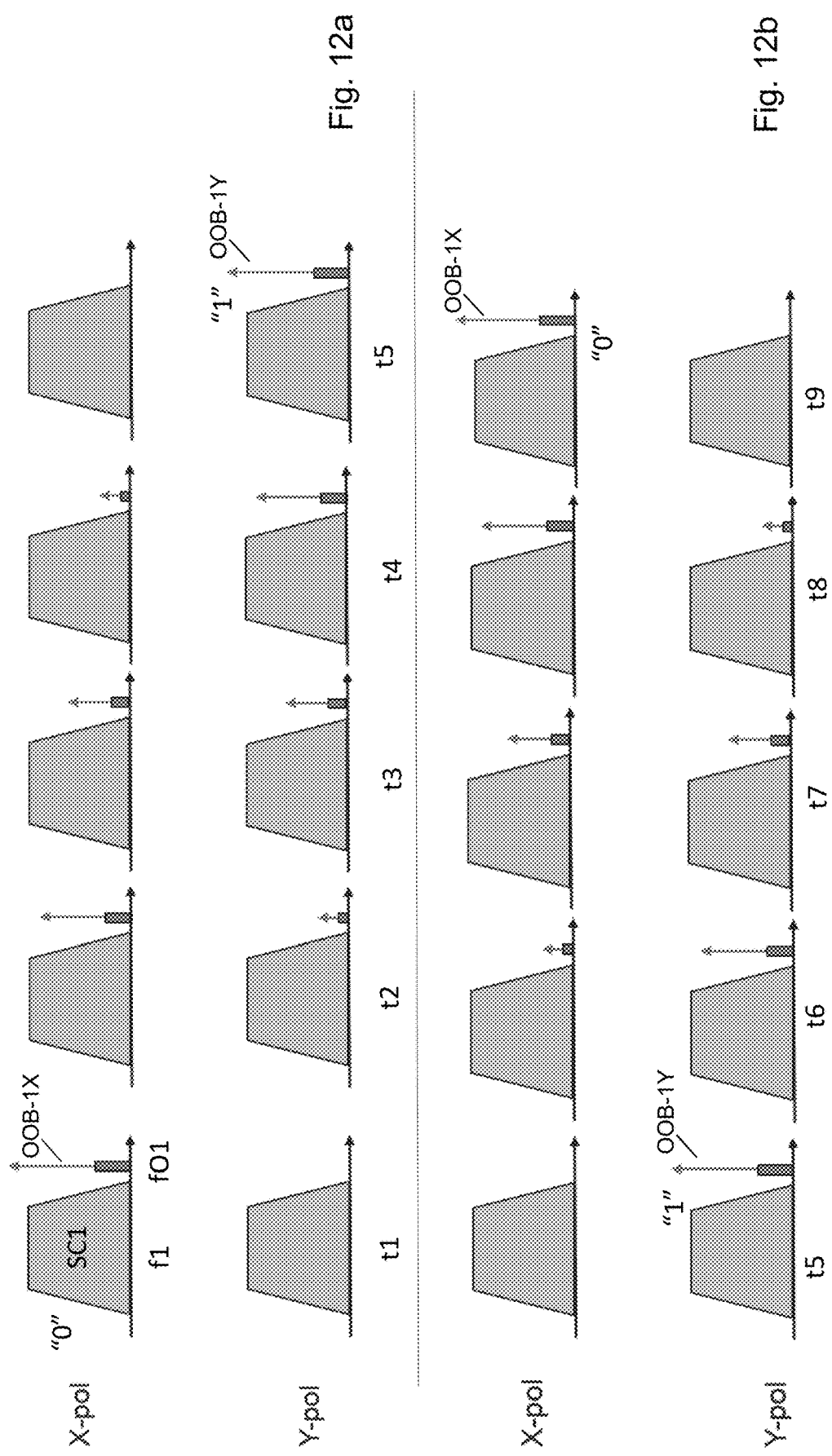
FIGS. 12a and 12b depict an example of a PolSK out-of-band communication signal shifting from the X polarization to the Y polarization.

FIG. 11 depicts an example of an X polarization component and a Y polarization component of OOB-1. In the example illustrated in FIG. 11, the OOB-1 may have either an X polarization 352 or a Y polarization 354 depending on the data to be transmitted. For example, if a '1' bit of control data is to be transmitted, OOB signal 350 is output with light primarily having the Y (e.g., transverse magnetic or TM) polarization or polarization state. On the other hand, if a '0' bit of control data is to be transmitted, OOB signal 350 is output with light primarily having the X (e.g., transverse electric or TE) polarization or polarization state. Thus, control data may be transmitted by modulating the polarization of OOB signal 350 to switch or shift between first and second polarization states.

FIG. 12*a* illustrates in greater detail a transition from a '1' bit, in which optical energy in optical signal OOB-1 is entirely (in this example) in one polarization state ("X-pol") to a '0' bit, in which optical energy is transferred to the other polarization state ("Y-pol") at time t1. In FIGS. 12*a* and 12*b*, the amount of optical energy or intensity in the X polarization component of signal OOB-1 is represented by arrow OOB-1X, and the amount of optical energy or intensity in the Y polarization component of signal OOB-1 is represented by arrow OOB-1Y. As further shown in FIG. 12*a*, at times t2 to t4, the amount of optical energy in the X polarization component of signal OOB-1 decreases, while the amount of optical energy in the Y polarization component of signal OOB-1 increases. At time t5, the X polarization component of OOB-1 has little or no optical energy, and the amount of optical energy in Y polarization component of OOB-1 is at a maximum, thereby indicating a '1' bit.

FIG. 12b illustrates a transition from the '0' bit back to the '1' bit. Namely, as noted above, a maximum amount of optical energy is present in the Y polarization at time t5. At times t6 to t8, however, the amount of optical energy in the Y polarization component of OOB-1 decreases, while the amount of optical energy in the X polarization component of OOB-1 increases. At time t9, the optical energy in the X polarization component of OOB-1 is at a maximum, thereby corresponding to a '0' bit of control data.

As seen in FIGS. 12a and 12b, at each time instant t1 to t9, the sum of the optical energy in the X (OOB-1X) and Y (OOB-1Y) polarization components of signal OOB-1 remains constant, in this example. That is, the amplitude of optical signal OOB-1 does not change. Accordingly, signal OOB-1 does not interfere with or create noise in the amplitude modulated signals described above that communicate control information between the transceivers and the line system component(s). Signal OOB-1 may therefore be transmitted concurrently with such amplitude modulated signals to provide an additional control channel, which, as noted above facilitates communication of control information between primary transceiver 106 and secondary transceiver 108.

Although polarization modulation of optical signal OOB-1 is described above, it is understood that remaining optical signals OOB-2 to OOB-8 may similarly be polarization modulated to transmit '0' and '1' bits in the same manner as that described above to provide communication of control information to secondary transceivers 108.

Transmission OOB signals will next be described in further detail with reference to FIG. 13, which shows Tx DSP block 903-2. As noted above with respect to FIG. 4a, Tx DSP block 902 includes block 903-1 and block 903-2. Block 903-1 receives data streams D-1 to D-8, which are associated with a respective one of subcarriers SC1 to SC8. Block 903-2, however, receives control data to be transmitted on one or more of the optical signals OOB-1 to OOB-8, for example. The outputs of both blocks are fed to a further DSP block, block 903-3, which, based on the received inputs from block 903-1 and 903-2, provides digital signals. These digital signals, as noted above, are converted to analog signals by DACs 904, and then further processed by driver circuits 906, which, in turn, provide drive signals to modulators 910. Based on such drive signals, modulators 910 modulate light or an optical signal output from laser 908 to provide a modulated optical signal including, in this example, subcarriers SC1 to SC8 carrying signal indicative of the user data and optical signals OOB-1 to OOB-8 carrying signal indicative of the control information to be communicated between transceivers, e.g., transceiver 106 and transceiver(s) 108.

Blocks 903-1 and 903-3 of Tx DSP 902 are described above with reference to FIGS. 4 and 5. Block 903-2 of Tx DSP 902 will next be described with reference to FIG. 13.

Figure 13:
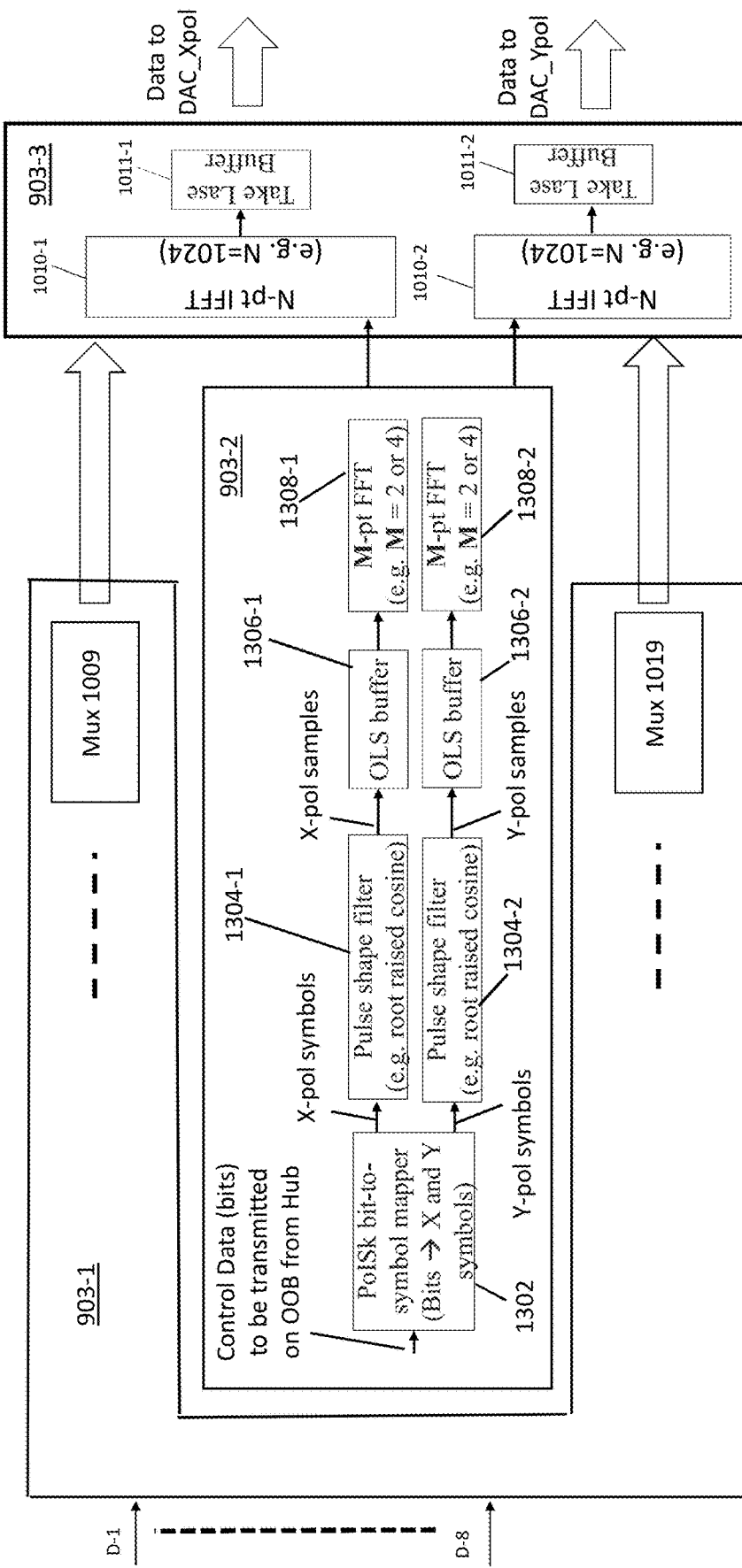
FIG. 13 is a diagram showing example devices of a transmitter component that are used to generate a PolSK out-of-band communication signal for transmitting control channel data.

As shown in FIG. 13, control data to be transmitted from primary node transceiver 106, for example, may be input to mapper circuit 1302, which maps the received bits to X and Y symbols to be carried by the X and Y components, respectively, of the OOB signals. Mapper circuit 1302 has a first output that supplies symbols to be carried by the X polarization component (X-pol symbols) to a first pulse shape filter circuit 1304-1. Mapper circuit 1302 also has a second output that supplies symbols to be carried by the X polarization component (Y-pol symbols) to a second pulse shape filter circuit 1304-2. Both filter circuits 1304-1 and 1304-2 include, in one example, root raised cosine filter circuitry. The outputs of the filter circuits 1304-1 and 1304-2 are supplied to overlap and save ("OLS") buffer circuits or memories 1306-1 and 1306-2, respectively. Buffer circuits or memories 1306-1 and 1306-2 provide outputs to corresponding Fast Fourier Transform (FFT circuits) 1308-1 and 1308-2, which convert the buffer circuit outputs to frequency domain data. Such data is stored in memories or bins, associated with the frequencies of the OOB signals. Each OOB signal has a relatively narrow bandwidth and carries control data at a rate substantially less than the data rates associated with subcarriers SC1 to SC8. Accordingly, each OOB signal has a limited number of corresponding frequency bins. In the example shown in FIG. 13, in which circuit block 903-2 provides signals for generating one of the OOB signals, such as signal OOB-1, two or four such bins are required to store the frequency domain data associated with signal OOB-1.

The outputs of FFT 1308-1 are provided to IFFT 1010-1, and the outputs of FFT 1308-2 are provided to IFFT 1010-2. Further processing by IFFT 1010-1 and IFFT-2, lake last buffers or memory circuits 1011-1 and 1011-2, DACs 904, and driver circuits 906 is described above with respect to FIGS. 4 and 5. Upon application of the drive signal outputs from driver circuits 910, optical modulators 910 outputs optical subcarriers SC1 to SC8, as well as polarization modulated optical signals OOB-1 to OOB-8.

In particular, when a '1', for example, is to be transmitted on signal OOB-1, the Y-polarization component has a maximum amount of optical energy, while the X polarization component has a minimal amount of optical energy, as noted above. To generate such X and Y components, drive signals are provided such that over frequencies associated with signal OOB-1, X polarized light is passed from laser 908 through modulators 910-3 and 910-4, polarization rotated to have a Y polarization and then output through polarization beam combiner (PBC) 914. Modulators 910-1 and 910-2, however, substantially block such light at such frequencies, such that no light or little light having an X polarization is input to PBC 914 for output onto fiber 916. Accordingly, at the frequencies associated with OOB-1, light having the Y polarization is output onto fiber 916.

On the other hand, when a '0', for example, is to be transmitted on signal OOB-1, the X-polarization component has a maximum amount of optical energy, while the Y polarization component has a minimal amount of optical energy, as further noted above. To generate such X and Y components, drive signals are provided such that over frequencies associated with signal OOB-1, X polarized light is passed from laser 908 through modulators 910-1 and 910-2 and then output through polarization beam combiner (PBC) 914. Modulators 910-3 and 910-4, however, substantially block such light at such frequencies, such that no light or little light having an Y polarization is input to PBC 914 for output onto fiber 916. Therefore, at the frequencies associated with OOB-1, light having the Y polarization is output onto fiber 916.

As noted above with respect to FIG. 8, OOB signals are received by a receiver along with the optical subcarriers and, therefore, are subject to polarization demultiplexing, optical mixing, with local oscillator light, photoelectric conversion to analog electrical signals, processing by TIA/AGC circuits, and analog-to-digital conversion prior to input to Rx DSP 1150. As discussed in greater detail below, however, Rx DSP 1150 may have separate blocks for respectively outputting user data associated with subcarriers SC1 to SC8 (block 1403 (FIG. 14)) and control data (block 1402 (FIG. 14)).

Figure 14:
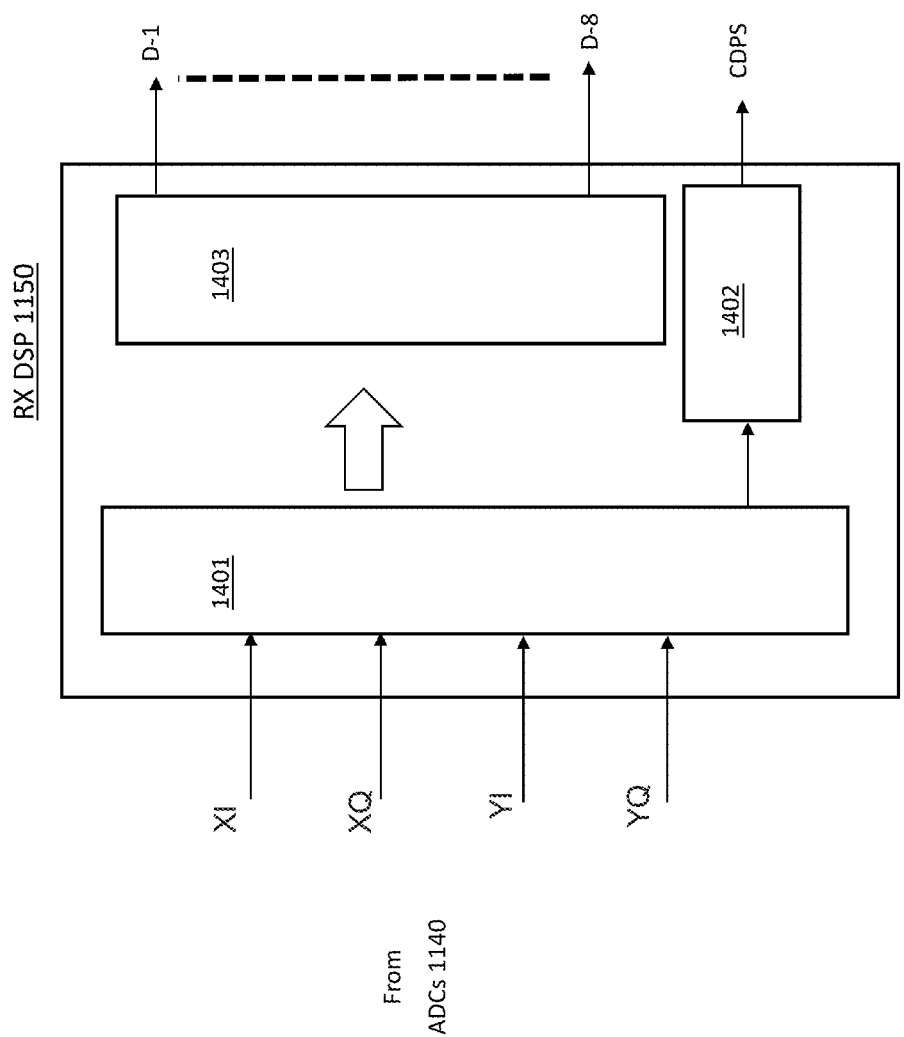
FIG. 14 is a diagram showing an example receiver component of an optical communication system.

As shown in FIG. 14, Rx DSP 1150 may include three blocks, two of which are noted above as blocks 1401 and 1402. DSP block 1401 includes circuitry that receives the outputs of analog-to-digital conversion circuits 1140-1 and 1140-2. As further shown in FIG. 14, DSP block 1401 supplies outputs which are processed by block 1403 to output data streams D1 to D8. Other outputs are processed by block 1402 and output as transceiver-to-transceiver control data CDPS.

Figure 15:
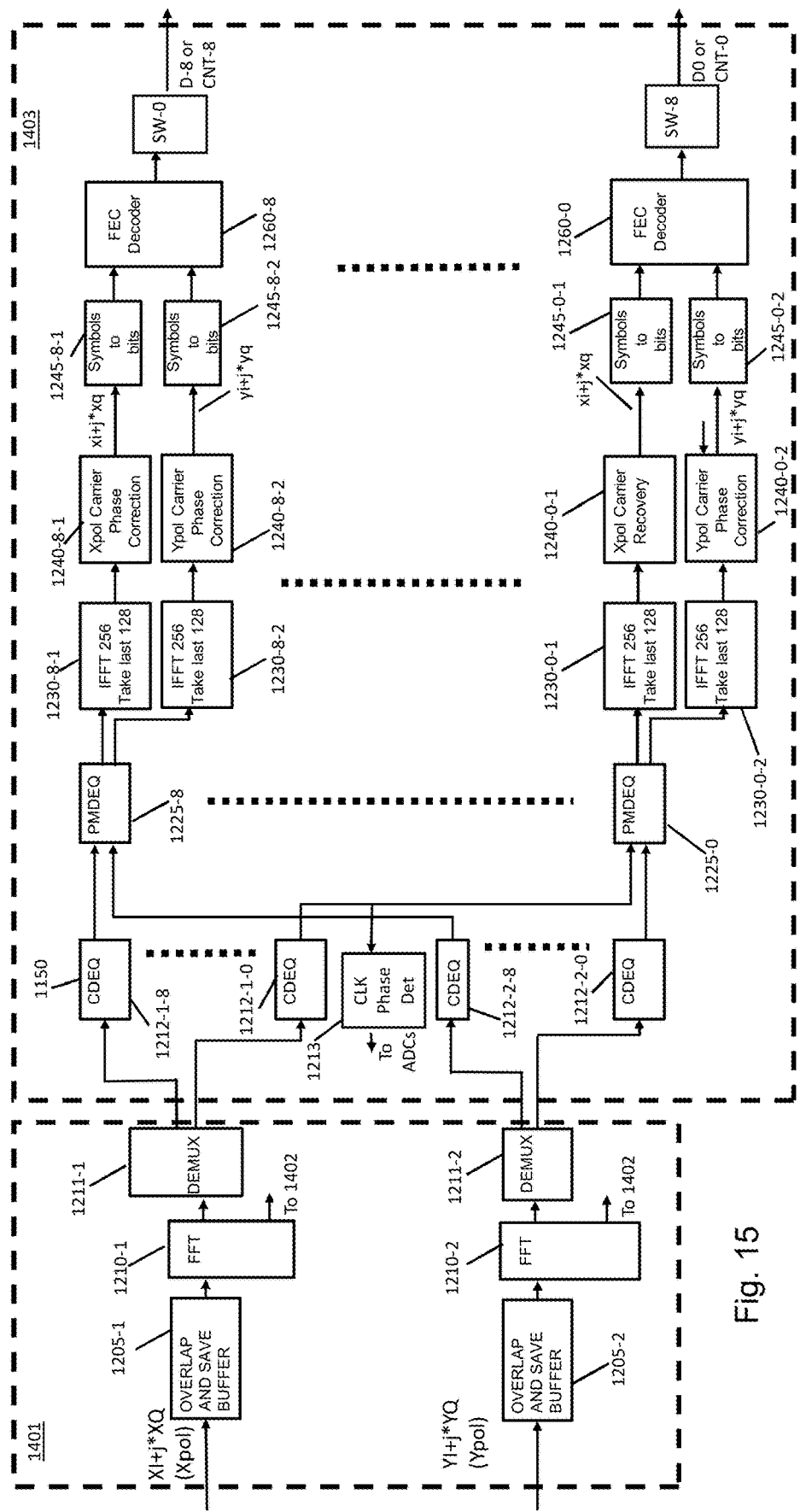
FIG. 15 and FIG. 16 are each example diagrams depicting devices of an example receiver component used to generate PolSK out-of-band communication signal.

FIG. 15 shows blocks 1401 and 1403 in greater detail. As noted above, analog-to-digital (A/D) circuits 1140-1 and 1140-2 output digital samples corresponding to the analog inputs supplied thereto. In one example, the samples may be supplied by each A/D circuit at a rate of 64 G Sample/s. The digital samples correspond to symbols carried by the X polarization the optical subcarriers and may be represented by the complex number XI+jXQ. The digital samples may be provided to a buffer or memory circuit, such as overlap and save buffers 1205-1 and 1205-2, as inputs to Rx DSP block 1401. FFT component or circuit 1210-1, also included in block 1401, may receive the 2048 vector elements, for example, from the overlap and save buffer 1005-1 and convert the vector elements to the frequency domain using, for example, a fast Fourier transform (FFT). The FFT component 1210-1 may convert the 2048 vector elements to 2048 frequency components, each of which may be stored in a register or "bin" or other memory, as a result of carry outing the FFT.

The frequency components may then then be demultiplexed, and groups of such components may be supplied to a respective one of chromatic dispersion equalizer circuits CDEQ 1212-1-0 to 1212-1-8 as inputs to block 1403. Each of the CDEQ circuits may include a finite impulse response (FIR) filter that corrects, offsets or reduces the effects of, or errors associated with chromatic dispersion of the transmitted optical subcarriers. Each of CDEQ circuits 1212-1-0 to 1212-1-8 supplies an output to a corresponding polarization mode dispersion (PMD) equalizer circuit 1225-0 to 1225-8.

It is noted that digital samples output from A/D circuits 1140-2 associated with Y polarization components of subcarrier SC1 may be processed in a similar manner to that of digital samples output from A/D circuits 1140-1 and associated with the X polarization component of each subcarrier. Namely, overlap and save buffer 1205-2, FFT 1210-2 and CDEQ circuits 1212-2-0 to 1212-2-8 may have a similar structure and operate in a similar fashion as buffer 1205-1, FFT 1210-1 and CDEQ circuits 1212-1-0 to 1212-1-8, respectively. For example, each of CDEQ circuits 1212-2-0 to 1212-8 may include an FIR filter that corrects, offsets, or reduces the effects of, or errors associated with chromatic dispersion of the transmitted optical subcarriers. In addition, each of CDEQ circuits 1212-2-0 to 1212-2-8 provide an output to a corresponding one of PMDEQ 1225-0 to 1225-8.

As further shown in FIG. 15, the output of one of the CDEQ circuits, such as CDEQ 1212-1-0 may be supplied to clock phase detector circuit 1213 to determine a clock phase or clock timing associated with the received subcarriers. Such phase or timing information or data may be supplied to ADCs 1140-1 and 1140-2 to adjust or control the timing of the digital samples output from ADCs 1140-1 and 1140-2.

Each of PMDEQ circuits 1225 may include another FIR filter that corrects, offsets or reduces the effects of, or errors associated with PMD of the transmitted optical subcarriers. Each of PMDEQ circuits 1225 may supply a first output to a respective one of IFFT components or circuits 1230-0-1 to 1230-8-1 and a second output to a respective one of IFFT components or circuits 1230-0-2 to 1230-8-2, each of which may convert a 256 element vector, in this example, back to the time domain as 256 samples in accordance with, for example, an inverse fast Fourier transform (IFFT).

Time domain signals or data output from IFFT 1230-0-1 to 1230-8-1 are supplied to a corresponding one of Xpol carrier phase correction circuits 1240-1-1 to 1240-8-1, which may apply carrier recovery techniques to compensate for X polarization transmitter (e.g., laser 908) and receiver (e.g., local oscillator laser 1110) linewidths. In some implementations, each carrier phase correction circuit 1240-1-1 to 1240-8-1 may compensate or correct for frequency and/or phase differences between the X polarization of the transmit signal and the X polarization of light from the local oscillator 1110 based on an output of Xpol carrier recovery circuit 1240-0-1, which performs carrier recovery in connection with one of the subcarrier based on the outputs of IFFT 1230-01. After such X polarization carrier phase correction, the data associated with the X polarization component may be represented as symbols having the complex representation $xi+j*xq$ in a constellation, such as a QPSK constellation or a constellation associated with another modulation formation, such as an m-quadrature amplitude modulation (QAM), m being an integer. In some implementations, the taps of the FIR filter included in one or more of PMDEQ circuits 1225 may be updated based on the output of at least one of carrier phase correction circuits 1240-0-1 to 1240-8-01.

In a similar manner, time domain signals or data output from IFFT 1230-0-2 to 1230-8-2 are supplied to a corresponding one of Ypol carrier phase correction circuits 1240-0-2 to 1240-8-2, which may compensate or correct for Y polarization transmitter (e.g., laser 908) and receiver (e.g., local oscillator laser 1110) linewidths. In some implementations, each carrier phase correction circuit 1240-0-2 to 1240-8-2 may also corrector or compensate or correct for frequency and/or phase differences between the Y polarization of the transmit signal and the Y polarization of light from the local oscillator laser 1110. After such Y polarization carrier phase correction, the data associated with the Y polarization component may be represented as symbols having the complex representation $yi+j*yq$ in a constellation, such as a QPSK constellation or a constellation associated with another modulation formation, such as an m-quadrature amplitude modulation (QAM), m being an integer. In some implementations, the output of one of circuits 1240-0-2 to 1240-8-2 may be used to update the taps of the FIR filter included in one or more of PMDEQ circuits 1225 instead of or in addition to the output of at least one of the carrier recovery circuits 1240-0-1 to 1240-8-1.

As further shown in FIG. 15, the output of carrier recovery circuits, e.g., carrier recovery circuit 1240-0-1, may also be supplied to carrier phase correction circuits 1240-1-1 to 1240-8-1 and 1240-0-2 to 1240-8-2 whereby the phase correction circuits may determine or calculate a corrected carrier phase associated with each of the received subcarriers based on one of the recovered carriers, instead of providing multiple carrier recovery circuits, each of which being associated with a corresponding subcarrier.

Each of the symbols to bits circuits or components 1245-0-1 to 1245-8-1 may receive the symbols output from a corresponding one of circuits 1240-0-1 to 1240-8-1 and map the symbols back to bits. For example, each of the symbol to bits components 1245-0-1 to 1245-8-1 may map one X polarization symbol, in a QPSK or m-QAM constellation, to Z bits, where Z is an integer. For dual-polarization QPSK modulated subcarriers, Z is four. Bits output from each of component 1245-0-1 to 1245-8-1 are provided to a corresponding one of FEC decoder circuits 1260-0 to 1260-8.

Y polarization symbols are output form a respective one of circuits 1240-0-2 to 1240-8-2, each of which having the complex representation yi+j*yq associated with data carried by the Y polarization component. Each Y polarization, like the X polarization symbols noted above, may be provided to symbols to a corresponding one of bit to symbol circuits or components 1245-0-2 to 1245-8-2, each of which having a similar structure and operating a similar manner as symbols to bits component 1245-0-1 to 1245-8-1. Each of circuits 1245-0-2 to 1245-8-2 may provide an output to a corresponding one of FEC decoder circuits 1260-0 to 1260-8.

Each of FEC decoder circuits 1260 may remove errors in the outputs of symbol to bit circuits 1245 using forward error correction. Such error corrected bits, which may include user data for output to or output from secondary node 108, may be supplied as a corresponding one of outputs D0 to D8 from block 1403.

Figure 16:
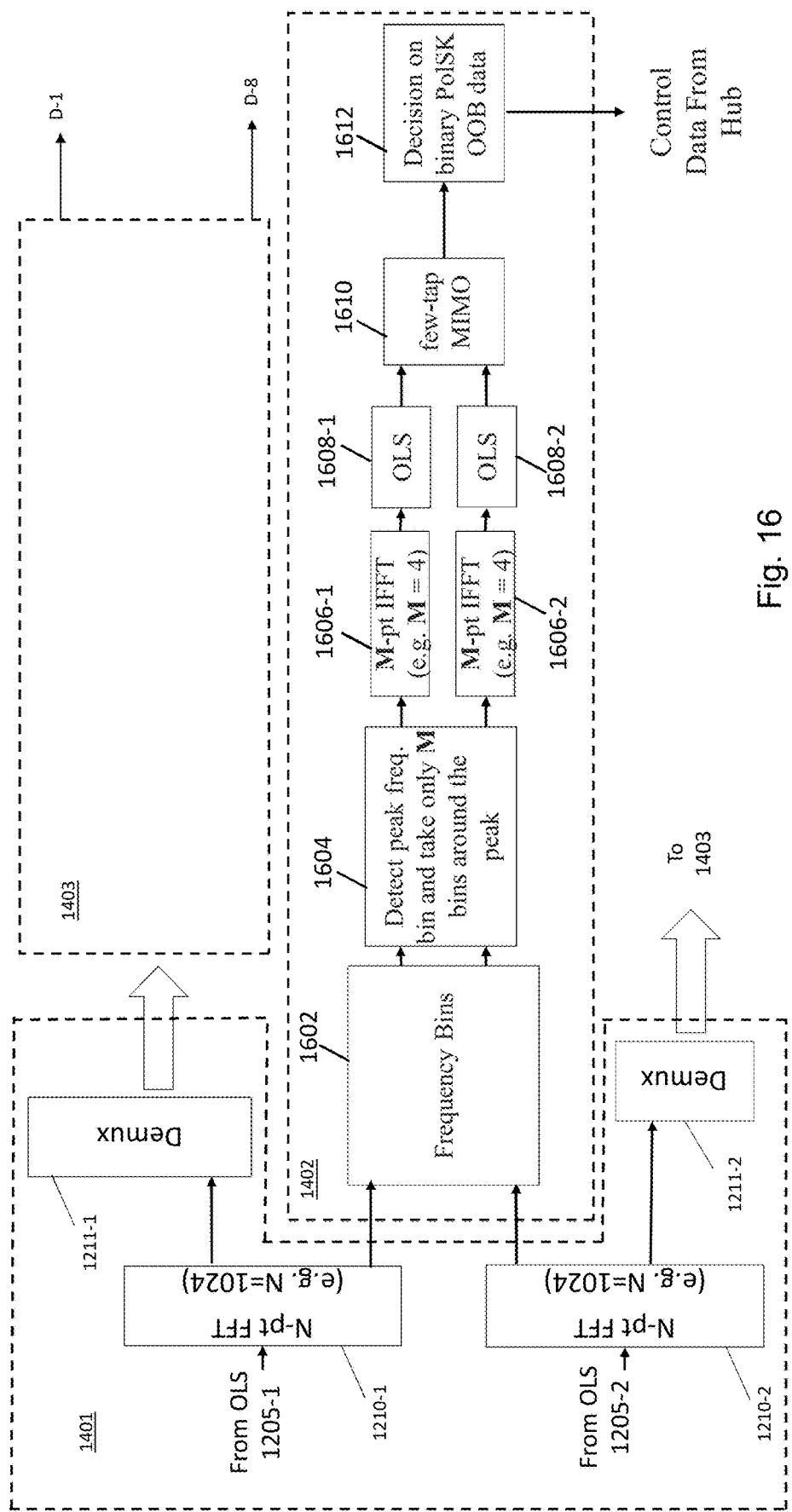
Figure 17:
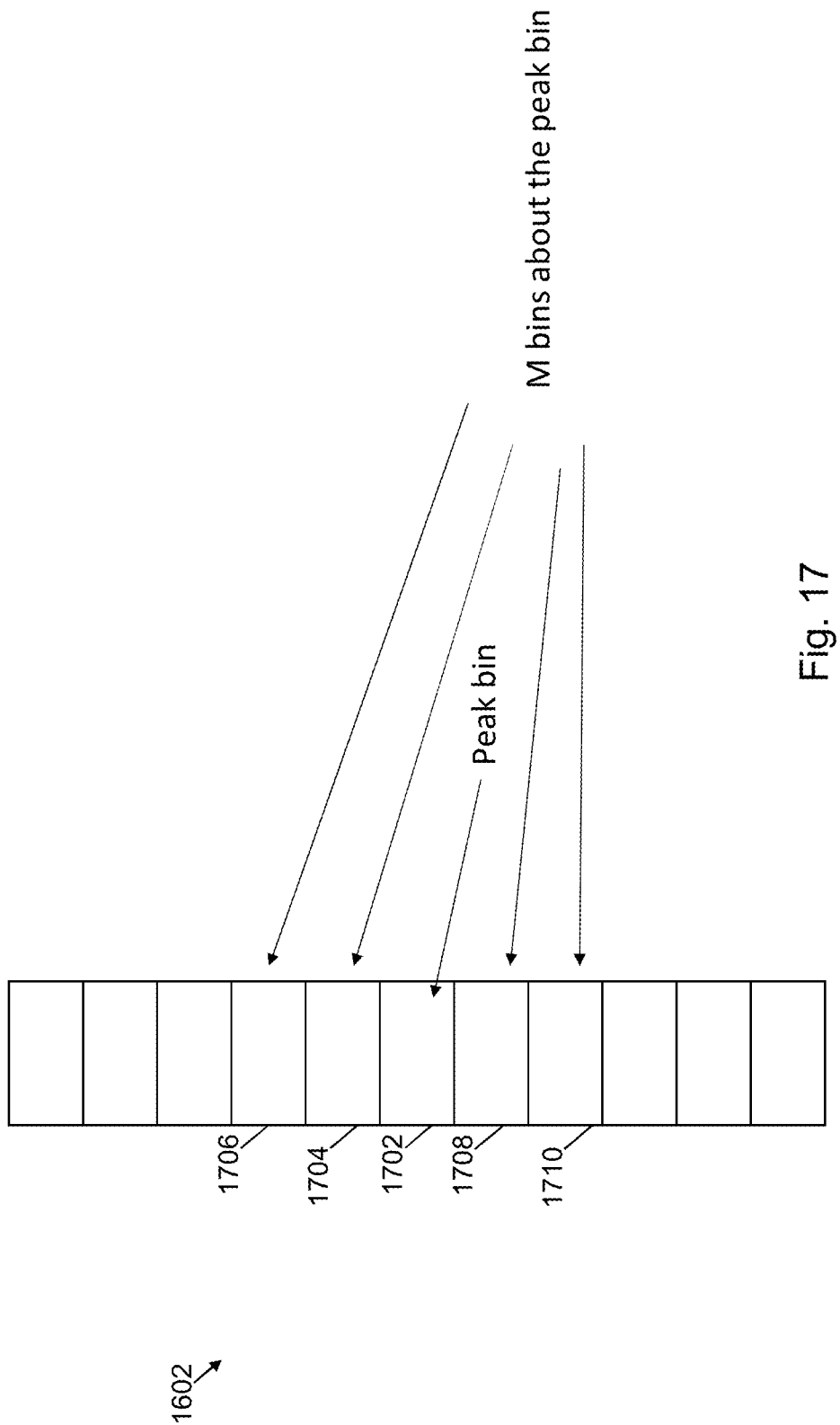
FIG. 17 depicts an example of frequency bins associated with an out-of-band communication signal.

FIG. 16 shows Rx DSP block with an emphasis on the details of block 1402. As noted above, block 1402 receives outputs from block 1401, and, based on such outputs, outputs control data carried by an OOB signal, such as signal OOB-1. Block 1402 includes frequency bins or memories 1602 which receives outputs from FFT 1210-1 and 1210-2. Such outputs are frequency domain data corresponding associated with data carried by signal OOB-1, for example. Turning to FIG. 17, such frequency bins that are associated with signal OOB-1. More specifically, each of the respective frequency bins 1602 can correspond to particular frequencies associated with OOB-1. Such bins store frequency domain data associated with OOB-1. Since signal OOB-1, for example, has a relatively narrow bandwidth, not all of bins 1602 will store data. Accordingly, circuitry 1604 detects a peak frequency bin and outputs the data stored in the bin, as well M bins adjacent to it (M may be an integer, such as 2 or 4). For example, as shown in FIG. 17, bin 1702 is the peak frequency bin, and the M=2 bins adjacent to bin 1702 are bins 1704, 1706, 1708, and 1710. The outputs of these bins are provided to an inverse Fast Fourier Transform (IFFT) circuits 1606-1 (associated with the X component of signal OOB-1) and 1606-2 (associated with the Y component of signal OOB-1). The IFFT circuits 1606 supply time domain data to buffers, such as overlap and save buffer circuits 1608-1 and 1608-2, and the buffered time domain data is supplied to a filter, including, for example, a multiple-input-multiple-output (MIMO) filter 1610 having a limited number of taps. Filter 1610 is provided to correct for distortions in the data output from buffer circuits 1608-1 and 1608-2 that may be attributable to a rotation of the X and Y polarization components of signal OOB-1, for example, during propagation along an optical fiber link.

As further shown in FIG. 16, filter 1610 provides an output to a decision circuit that outputs either '0' or '1' bits based on such output. These bits constitute control data (CDPS in FIG. 13) output from the hub or primary transceiver 106, for example. Similar circuitry may be provided in the receiver portion of transceiver 106 to detect and output control data output from one or more of secondary transceivers 108.

While FIGS. 15-17 show Rx DSP 1150 as including a particular quantity and arrangement of functional components, in some implementations, DSP 1150 may include additional functional components, fewer functional components, different functional components, or differently arranged functional components.

IV. Second Data Path Implementation Example—Communication Between Primary and Secondary Transceivers Based on Amplitude Modulation at a Plurality of Frequencies In the above First Data Path Implementation Example, the optical subcarriers output from a transceiver, such as primary transceiver 106, are subject to amplitude modulation to carry control information associated with a first data path, e.g., data path CC1 in FIG. 2a. Further, as noted above, polarization modulation may be employed on a spectrally narrow optical signal to carry addition control information associated with a second data path, e.g., data path CC3 in FIG. 2a. Consistent with a further aspect of the present disclosure, amplitude modulation may be employed to carry control information associated with different data paths. For example, as described in greater detail below, the optical subcarrier shown in FIG. 3 may be subject to a first, second, and third amplitude modulations in both the downstream and upstream directions. Each such amplitude modulation may be at a different frequency and may be associated with different control information, as well a different data path. In one example, the modulation frequencies are between 1 MHz and 2 MHz (band A), 3 MHz and 4 MHz (band B), and 6 MHz and 7 MHz (band C), although other bands or ranges may be employed. Accordingly, the amplitude modulation is at frequencies less than that associated with the transmitted user data, which is approximately in a range of 10 GHz to 100 GHz.

FIG. 18 shows optical system 100 of FIG. 1 further labeled with arrows indicating the direction and amplitude modulation employed to exchange control information between transceivers, optical gateways, and central software to thereby realize alternative data path implementations to those described above with references to FIGS. 3-17. As shown in FIG. 18, arrow 1802 indicates that the optical subcarriers, such as SC1 to SC8, output from a transmitter in primary transceiver 106 may be amplitude modulated at a first frequency or frequencies in band B, for example, to carry control information to OGW 103-1 and for further transmission to central software 111, as noted above. The optical subcarriers may be further amplitude modulated in the transmitter of primary transceiver 106 at a frequency or frequencies in band C, for example, to provide control information to one or more secondary transceivers 108 through OGW 103-1, sub-system 105, and OGW 103-2 (arrow 1812). In addition, OGW 103-2 may also amplitude modulate the optical subcarriers passing therethrough at a frequency in band A to provide control information, such as from central software 111, as further noted above, to one or more of secondary transceivers 108 (arrow 1810).

As further shown in FIG. 18, arrow 1808 indicates that one or more of optical subcarriers SC1 to SC8 output from a transmitter in one of secondary transceivers 108, for example, may be amplitude modulated at a frequency or frequencies in band B, for example, to carry control information to OGW 103-2 and for further transmission to central software 111, as noted above. The optical subcarriers may be further amplitude modulated in the transmitter of one of secondary transceivers 108 at a frequency or frequencies in band C, for example, to provide control information to primary transceiver 106 through OGW 103-2, sub-system 105, and OGW 103-1 (arrow 1806). Such amplitude modulation transmission is shared, in one example, among each transceiver 108. In that case, more than one of secondary transceivers 108 may transmit control information at a frequency in band C at the same time. Accordingly, control information transmission from the secondary transceivers 108 to primary transceiver 106 may be carried out in bursts of relatively short duration to reduce the likelihood that control information output from one of secondary transceivers 108 will interfere or collide with the control information output from another second transceiver. If a collision does occur, however, the control information is retransmitted, for example, followed by an acknowledgment sent by primary transceiver 106 back to the secondary transceiver 108 that sent the control information that such information was successfully received.

In addition, OGW 103-1 may also amplitude modulate the optical subcarriers passing therethrough at a frequency in band A to further provide control information, such as from central software 111, as further noted above, to primary transceiver 106 (arrow 1804).

Generation of multiple amplitude modulated data paths will next be described. As noted above, the optical subcarriers can be amplitude modulated, collectively, to carry control information associated with a particular data path (see FIG. 3). FIG. 19 shows example circuitry 1992 that may be included in AM signal generator 992 described above with respect to FIG. 4a instead of circuitry 992-1. Here, AM signal generator 992 is modified to include circuitry 1992 to amplitude modulate the subcarriers at different frequencies to carry first and second control information, instead of amplitude modulation at one frequency, as noted above with respect to FIG. 4b. As in the example noted above, AM signal generator 992 provides each of outputs AMO-1 to AMO-4 to a respective input of DACs 904-1 to 904-4 (see FIG. 4a). These signals are generated in such a way that DACs 904 output analog signals that include multiple amplitude modulated signals overlaying or superimposed on the data carrying DAC outputs. Based on such DAC outputs, Mach-Zehnder modulator driver circuits (MZMDs) 906, in turn, output drive signal to MZMs 910, as noted above. Accordingly, the combined MZM outputs supply optical subcarriers superimposed with multiple amplitude modulated signals at different frequencies based on the outputs of signal generator 992, whereby both the X and Y polarization components of each optical subcarrier are subject to such amplitude modulation.

Returning to FIG. 19, circuitry 1992 includes multiplier circuit 1902-1 that multiplies first control information CD1 by a cosine function, $\cos(\omega_B t)$, where $\omega_B$ is indicative of a frequency of the amplitude modulation and t is time. For example, $\omega_B$ may correspond to an amplitude modulation frequency within band B for transmission of control information to OGW 103-1 and further transmission to central software 111 (see arrow 1802 in FIG. 18). In a similar manner as that described above in regard to FIG. 4b, the output of multiplier 1902-1 is provided to adder 1903-1 which adds 1 to product supplied by multiplier 1902-1 to insure that a positive number is obtained. As further shown in FIG. 19, the resulting sum output from adder 1903-1 is provided to multiplier 1904-2, which multiplies such sum by a carrier frequency $\omega_{Carrier}$.

Circuitry 1992 also includes, for example, multiplier circuit 1902-2 that multiplies control information CD2 by a cosine function, $\cos(\omega_C t)$, where $\omega_C$ is indicative of a frequency of another amplitude modulation and t is time. For example, we may correspond to a frequency within band C for transmission of control information to transceivers 108 via OGW 103-1, sub-system 105, and OGW 103-2 (arrow 1812 in FIG. 18). Adder 1903-2 and multiplier 1904-2 operate in a similar manner as adder 1903-1 and multiplier 1904-1 (except multiplier 1904-1 multiplies the output of adder 1903-2 by $\cos(\omega'_{Carrier} t)$). As further shown in FIG. 19, the outputs of multiplier circuits 1904-1 and 1904-2 are provided to adder circuit 1906, which adds such outputs and the resulting sum (AMO-1 in FIG. 4a) is combined with a corresponding output from DSP 902 and input to DAC 904-1. Accordingly, amplitude modulation at different frequencies, a first amplitude modulation in band B and a second amplitude modulation in band C, are fed to DAC 904-1. As a result, both X and Y polarization components of each optical subcarrier are amplitude modulated at multiple frequencies to carry multiple control information streams.

It is understood that additional circuitry similar to that shown in FIG. 19 is also included in AM signal generator 992, in this example, to provide similar signals (AMO-2 to AMO-4) to the inputs of remaining DACs 904-2 to 904-4. As noted above, based on such inputs, the combined output of MZMs 910 supplies optical subcarriers that are collectively amplitude modulated, such that both the first and second amplitude modulation signals are superimposed onto the optical subcarriers to thereby carry first and second control information intended for OGW 103-1 and a secondary transceiver 108, respectively, for example.

OGW-1 and OGW-2 in FIG. 18 generate and amplitude modulated subcarriers in a manner similar to that described in connection with FIG. 7. In addition, OGW-1 and OGW-2 detect control information in a manner further discussed above in regard to FIG. 17. As noted with respect to FIG. 18, OGW-1 may provide amplitude modulated optical subcarriers supplied to primary transceiver 106 at a frequency within band A (see arrow 1804), and OGW-2 may modulate the optical subcarriers supplied to one or more of transceivers 108 also in band A (see arrow 1810).

Moreover, one or more of secondary transceivers 108 may include transmitter circuitry, similar to circuitry 1992, to amplitude modulate subcarrier(s) output therefrom with multiple amplitude modulation frequencies (see arrows 1806 and 1808), each corresponding to a respective control data stream or data path.

Detection of control information carried by amplitude modulated subcarriers at a receiver, such as module 1155, in primary node 106 will next be described with reference to FIGS. 8, 9a, and 20. As noted above, with respect to FIGS. 8 and 9a, control information or data may be determined based on outputs from either the TIA/AGCs circuits 1134 (FIG. 8) or the mean square detector 1160 (FIG. 9a), each of which supplies electrical signals based on electrical signals output from photodiode circuitry 1130. FIG. 9b shows additional circuitry for filtering the outputs of either circuits 1134 or 1160 in order to output control information associated with one control information stream. FIG. 20 shows circuitry 2002 that may replace the circuitry shown in FIG. 9b to provide first (CD1) and second (CD2) control information or control information streams associated with first and second amplitude modulation, respectively, of the optical subcarriers.

As shown in FIG. 20, the outputs of either TIA/AGC 1134 or mean square detector 1160 may be provided to first and second bandpass filters 1182 and 1183. First bandpass filter 1182 passes signals associated with a first amplitude modulation having a frequency or frequencies, for example, in band C associated with the transceiver-to-transceiver data paths (see arrows 1806 and 1812 in FIG. 12). Moreover, second bandpass filter 1183 passes signals associated with a second amplitude modulation having a frequency or frequencies, for example, in band A associated with the OGW (either OGW-1 or OGW-2) to transceiver data paths (see arrows 1802 and 1810). The output of bandpass filter 1182 is supplied to clock and data recovery circuit 1186 to thereby supply first control information CD1 associated with the first amplitude modulation of the subcarriers, and the output of bandpass filter 1183 is supplied to clock and data recovery 1187 to thereby provide second control information CD2 associated with the second amplitude modulation of the subcarriers.

Circuitry 2002 is provided to detect and output control information associated with the X polarization component of the optical subcarriers. As noted above, however, each optical subcarrier also has a Y polarization component, which is also amplitude modulated. It is understood, that circuitry similar to circuitry 2002 is provided, for example, to output control information associated with the amplitude modulation of the Y polarization component of each optical subcarrier.

An example implementation of the data path connections, CC3, CC4, CC1, CC5, and CC2 that facilitate control channel communication between secondary transceiver 108-n and network management system 109 (and central software 111) will next be described. As noted above, secondary transceivers 108, such as transceiver 108-n output optical subcarriers carrying data, such as one or more of optical subcarriers SC1 to SC8, and such subcarriers may be amplitude modulated at a first frequency, such as a frequency in band C, to carry first control information. In addition, the subcarriers may be further amplitude modulated at a second frequency, such as a frequency in band B, to carry second control information. Such amplitude modulated optical signals are generated by circuitry similar to that shown in FIGS. 4a and 20, for example. These signals are transmitted as part of upstream signal US along an optical communication path including OGW 103-2, subsystem 105, and OGW-1, optical fiber 115-2, to a receiver, such as module 1155 shown in FIG. 8, provided in primary transceiver 106, thereby implementing data path CC3. At OGW 103-2, the second control information may be detected and supplied to central software 111 and network management system 109, as described above with reference to FIG. 7. For example, a tapped portion of the incoming optical signal to OGW 103-2 is detected by photodiode, similar to photodiode 711, and the resulting electrical signal is processed by circuitry in a microprocessor or microcontroller, similar to that shown in FIG. 7, to output the second control data to central software 111 in network management system 109.

As noted above with respect to FIGS. 8 and 9a, and 20, the TIA/AGCs 1134 or mean square detector 1160 may output signals indicative of the first control information to bandpass filters 1182 and 1183. Bandpass filter 1182, however, passes signals associated frequencies in band C. Such signals are associated with the first control data. Upon processing of the output of bandpass filter 1182 by clock and data recovery circuit 1186 (see FIG. 20), the first control data is output. Such control information, in one example, may be provided to DSP 902 or control circuitry in the receiver or transmitter portions of the primary transceiver 106 to report status of the secondary transceiver 108-n or to adjust a parameter, parameter associated one or more optical subcarriers SC1 to SC8 output from transceiver 106.

Alternatively, control information CD1 may be input to AM signal generator 992, to amplitude modulate the optical subcarriers in a manner similar to that described with reference to FIGS. 4a, 4b, and 19, to thereby implement data path CC4. For example, the optical subcarrier may be amplitude modulated at a frequency in band B to thereby carry the control information CD1, which originated from transceiver 108-n. The optical subcarriers are transmitted on another optical communication path, including fiber 115-1, to OGW 103-1 (data path CC1). Again referring to FIG. 7, a portion of the amplitude modulated optical subcarriers is output from a tap, such as tap 711, converted to an electrical signal, which is then processed by a microprocessor or microcontroller (data path CC5) to provide the control information (originating from secondary node 108-n) to network management system 109 and central software 111 (data path CC2).

Thus, in the above example, control information is provided, along with user data carried by the optical subcarriers, without additional optical or electrical components, from a transceiver to the central software in a manner that bypasses the node equipment housing such transceiver. Moreover, by amplitude modulating the optical subcarriers to carry the control information, more capacity is made available for transmission of user data. In addition, although the above example employed amplitude modulation to carry the control information from secondary transceiver 108-n to primary transceiver 106, polarization modulation, such as polarization shift keying, as described above, may be employed to carry such control information, to implement data path CC3.

Similar data paths may be employed in the opposite direction as that described above to transmit control information from central software 111 to the transceiver. Alternatively, as described previously, control information may be provided to/from the central software via an optical gateway (OGW) nearest the transceiver intended for such control information.

It is noted that amplitude modulation at frequencies associated with control information intended for central software 111 may propagate from, for example, primary transceiver 106 to one or more of secondary transceivers 108. Since such control information is not intended for receipt at secondary transceivers 108, bandpass filters 1182 and 1183, for example, are configured to block or filter out frequencies associated with that control information. Accordingly, in the above example, control information for output to central software 111 is associated with amplitude modulation frequencies band B. Since, each OGW includes a tap to detect such amplitude modulation (see FIG. 7), such amplitude modulation is blocked by the OGWs 103-1 and 103-2 and is transmitted with the subcarriers to secondary transceivers 108. Accordingly, as noted above, bandpass filters 1182 and 1183 pass signals with frequencies associated with control information to be received by secondary transceivers 108, namely, in the above example, frequencies in bands A and C, such that signals associated with band B are blocked or not processed in transceivers 108.

Figure 21:
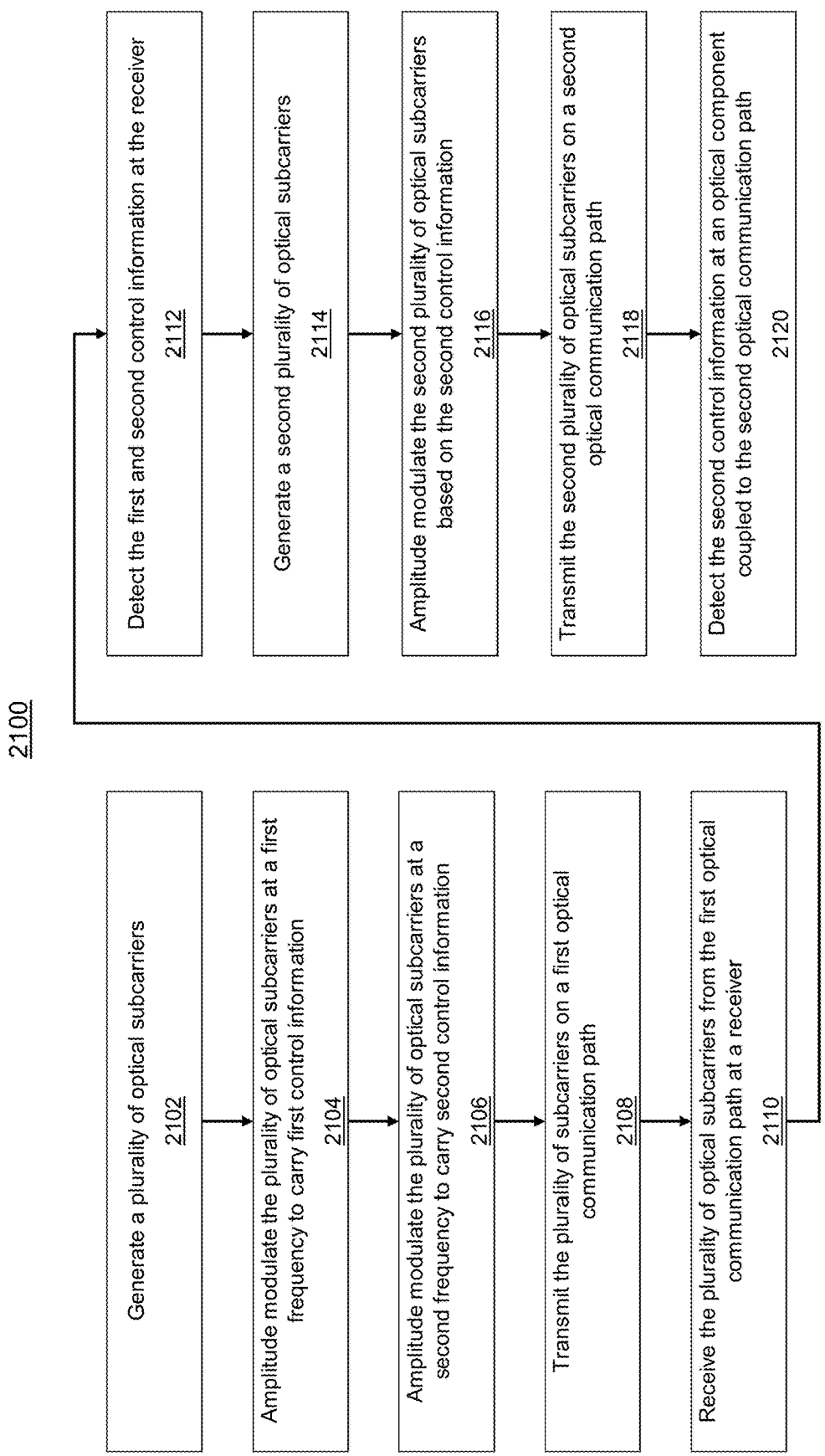
FIG. 21 shows a flow chart diagram of an example process that can be performed using one or more of the systems described herein.

FIG. 21 shows an example process 2100 that can be performed using one or more of the systems described herein. For instance, the process 2100 can be performed using an optical communication system including a primary transceiver and a plurality to secondary transceivers (e.g., as shown in FIGS. 1, 2a-2c, and 18).

According to the process 2100, a plurality of optical subcarriers are generated (step 2102). Example optical subcarriers are shown and described, for instance, with respect to FIG. 3.

Further, the plurality of optical subcarriers are amplitude modulated at a first frequency to carry first control information (step 2104). Further, the plurality of optical subcarriers are amplitude modulated at a second frequency to carry second control information (step 2106). Example systems and techniques for amplitude modulating the plurality of optical subcarriers according to two different respective frequencies are shown and described, for instance, with respect to FIGS. 18 and 19.

Further, the plurality of subcarriers are transmitted on a first optical communication path (step 2108). The plurality of optical subcarriers are received from the first optical communication path at a receiver (step 2110). As an example, the plurality of subcarriers can be transmitted on an optical communication path from a primary node (e.g., having a primary transceiver or transmitter) to one or more secondary nodes (e.g., each having a respective secondary transceiver or receiver). As another example, the plurality of subcarriers can be transmitted on an optical communication path from a secondary node (e.g., having a secondary transceiver or transmitter) to a primary node (e.g., having a primary transceiver or receiver).

Further, the first and second control information are detected at the receiver (step 2112). Example systems and techniques for detecting control information amplitude encoded according to two different respective frequencies are shown and described, for instance, with respect to FIGS. 18 and 20.

Further, a second plurality of optical subcarriers is generated (step 2114). Example optical sub-carriers are shown and described, for instance, with respect to FIG. 3.

Further, the second plurality of optical subcarriers is amplitude modulated based on the second control information (step 2116). Example systems and techniques for amplitude modulating the second plurality of optical subcarriers are shown and described, for instance, with respect to FIGS. 18 and 19.

Further, the second plurality of optical subcarriers is transmitted on a second optical communication path (step 2118). As an example, the plurality of subcarriers can be transmitted on an optical communication path from the secondary node (e.g., having a secondary transceiver or transmitter) back to the primary node (e.g., having a primary transceiver or receiver). As another example, the plurality of subcarriers can be transmitted on an optical communication path from the primary node (e.g., having a primary transceiver or transmitter) back to a second node nodes (e.g., having a second transceiver or receiver).

Further, the second control information is detected at an optical component coupled to the second optical communication path (step 2120). Example systems and techniques for detecting amplitude encoded control information are shown and described, for instance, with respect to FIGS. 7, 18, and 20.

In some implementations, the process 2100 can also include forwarding the second control information from the optical component to a network management system.

In some implementations, the process 2100 can also include providing a portion of each of the second plurality of optical subcarriers with an optical tap (e.g., as shown and described with respect to FIG. 7). The second control information at the optical component can be detected based on the portion of the second plurality of optical subcarriers.

In some implementations, the process 2100 can include amplitude modulating the first plurality of optical subcarriers at a third frequency.

In some implementations, the process 2100 can include filtering signals, at the receiver, associated with the third frequency.

In some implementations, each of the first plurality of optical subcarriers can be a Nyquist subcarrier.

In some implementations, third control information can be associated with the third frequency and the optical component is a first optical component. Further, the process 2100 can include transmitting the first plurality of subcarriers to a second optical component, and detecting the third control information at the third optical component.

In some implementations, the process 2100 can include transmitting the third control information to a network management system.

Various aspects of the disclosure and the functional operations described in this specification may be implemented in digital electronic circuitry, or in computer software, firmware, or hardware, including the structures disclosed in this specification and their structural equivalents, or in combinations of one or more of them. Likewise, various aspects of the disclosure may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

In some instances, various processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

Although a few implementations have been described in detail above, other modifications are possible. For example, the logic flows depicted in the figures do not necessarily require the particular order shown, or sequential order, to achieve desirable results. In addition, other actions may be provided, or actions may be eliminated, from the described flows, and other components may be added to, or removed from, the described systems.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In some cases, various features described in connection with different embodiments may be combined in the same implementation. Further, as the foregoing implementations are intended as examples, various features may be omitted in some cases, and/or additional features may be present in some cases.

Thus, although particular examples of the subject matter have been described, other implementations are within the scope of the claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A transmitter, comprising:
a laser operable to supply an optical signal;
a digital signal processor operable to supply first electrical signals based on first data input to the digital signal processor and second data input to the digital signal processor;
digital-to-analog conversion circuitry operable to output second electrical signals based on the first electrical signals;
modulator driver circuitry operable to output third electrical signals based on the second electrical signals; and
an optical modulator operable to receive the optical signal and modulate the optical signal to supply first and second modulated optical signals based on the third electrical signals and the received optical signal from the laser, the first modulated optical signal including a plurality of optical subcarriers carrying user data, and the second modulated optical signal being polarization modulated based on the second data, wherein the second modulated optical signal is an out-of-band signal having a frequency between first and second frequencies of first and second ones of the plurality of optical subcarriers, respectively, the first and second ones of the plurality of optical subcarriers not being polarization modulated.

2. The transmitter of claim 1, wherein the second data is control data including information associated with at least one of the transmitter or a receiver operable to receive the second modulated optical signal.

3. The transmitter of claim 1, wherein each of the plurality of subcarriers has a corresponding one of a plurality of first frequencies, the second modulated optical signal having a second frequency different than each of said plurality of first frequencies.

4. The transmitter of claim 3, wherein the second frequency of the second modulated optical signal is between adjacent ones of the plurality of first frequencies.

5. The transmitter of claim 2, wherein the second modulated optical is modulated to be in a first polarization state corresponding to a first portion of the control data or a second polarization state corresponding to a second portion of the control data.

6. The transmitter of claim 5, wherein the first portion of the data is a '1' bit and the second portion of the data is a '0' bit.

7. The transmitter of claim 2, wherein the control data is first control data, the digital signal processor being operable to receive second control data, and the modulator being further operable to amplitude modulate the first and second modulated optical signals based on the second control data.

8. The transmitter of claim 7, wherein the transmitter is operable such that the first and second modulated optical signals are supplied to an optical communication path, an optical component being coupled to the optical communication path, the second control data being associated with a parameter of the optical component.

9. The transmitter of claim 7, wherein the transmitter is disposed in a first node, and the first and second modulated optical signals are supplied to an optical communication path, a second node being optically coupled to the optical communication path, the first control data being associated with a parameter of the second node.

10. The transmitter of claim 9, wherein the second control data is associated with an optical component optically coupled to the optical communication path between the first and second nodes.

11. The transmitter of claim 2, wherein the control data is first control data, the modulator driver circuitry operable to receive second control data, and the modulator further operable to amplitude modulate the first and second modulated optical signals based on the second control data.

12. An apparatus, comprising:
a polarization beam splitter having an input and first and second outputs, the input configured to receive first and second modulated optical signals, the first modulated optical signal carrying information indicative of user data and including a first plurality of optical subcarriers, and the second modulated optical signal being polarization modulated based on control data, wherein the second modulated optical signal is an out-of-band signal having a frequency between first and second frequencies of first and second ones of the plurality of optical subcarriers, respectively, the first and second ones of the plurality of optical subcarriers not being polarization modulated, such that the first output supplies a first portion of the first and second modulated optical signals and the second output supplies a second portion of the first and second modulated optical signals;

an optical hybrid circuit operable to provide optical mixing products based on the first portion of the first and second modulated optical signals, the second portion of the first and second modulated optical signals, and a local oscillator signal;

photodiode circuitry operable to provide first electrical signals based on the optical mixing products;

analog-to-digital conversion circuitry operable to provide second electrical signals based on the first electrical signals;

a digital signal processor operable to provide the user data and the control data based on the second electrical signals; and a transmitter including:
  a laser operable to supply an optical signal, and
  a modulator operable to receive the optical signal from the laser and a plurality of drive signals, the modulator being operable to modulate the optical signal from the laser to provide a third modulated optical signal including a second plurality of optical subcarriers based on the drive signal.

13. The apparatus of claim 12, further including a local oscillator laser operable to supply the local oscillator signal.

14. The apparatus of claim 12, wherein each of
the plurality of subcarriers has a corresponding one of a plurality of first frequencies, the second modulated optical signal having a second frequency different than each of said plurality of first frequencies.

15. The receiver apparatus of claim 14, wherein the
second frequency of the second modulated optical signal is between adjacent ones of the plurality of first frequencies.

16. The apparatus of claim 14, wherein the
second modulated optical is modulated to be in a first polarization state corresponding to first portion of the control data or a second polarization state signal corresponding to a second portion of the control data.

17. The apparatus of claim 16, wherein the first portion of the data is a '1' bit and a second portion of the data is a '0' bit.

18. The apparatus of claim 17, wherein the user data is associated with a subset of the first plurality of optical subcarriers.

19. The apparatus of claim 12, wherein the control data is first control data, and the first and second modulated optical signals are further amplitude modulated based on second control data.

20. The apparatus of claim 19, further including a mean square detector circuit operable to output a signal indicative of the second control data.

21. The apparatus of claim 20, wherein the mean square detector is coupled to the analog-to-digital conversion circuitry.

22. The receiver apparatus of claim 19, further including trans-impedance amplifier circuitry coupled to the photodiode circuitry, the trans-impedance amplifier circuitry operable to supply a signal indicative of the second control data.

23. The receiver apparatus of claim 19, wherein the
receiver is disposed in a first node, and the first and second modulated optical signals are received from an optical communication path, a second node being optically coupled to the optical communication path to supply the first and second modulated optical signals, the first control data being associated with a parameter of the second node.

24. The receiver apparatus of claim 23, wherein the second control data is associated with an optical component optically coupled to the optical communication path between the first and second nodes.

25. A transceiver including:
  a laser operable to supply an optical signal;
  a first digital signal processor operable to supply first electrical signals;
  a modulator operable to supply a first optical signal based on the first electrical signals and at least a portion of the optical signal, the first optical signal including a first plurality of optical subcarriers, the first plurality of optical subcarriers not overlapping one another in frequency, and a second optical signal that carries first control information, selected ones of the plurality of optical subcarriers being polarization modulated out-of-band signals carrying second control information and remaining ones of the plurality of optical subcarriers carry user data and are not polarization modulated, the first control information being associated with another transceiver remote from the modulator, and the second control information being associated with an optical component connected to an optical communication path that optically couples the transceiver to said another transceiver;
  a photodiode circuit operable to receive a third optical signal including a second plurality of optical subcarriers, the second plurality of optical subcarriers not overlapping one another in frequency, and a fourth optical signal that carries third control information, the third optical signal being modulated to carry fourth control information, the photodiode circuit supplying a second electrical signal based on the third optical signal; and a second digital processor operable to supply data indicative of the control third and fourth control information based on the second electrical signal, the third control information being associated with said another transceiver remote, and the fourth control information being associated with the optical component connected to the optical communication path.

* * * * *